US012143704B2

(12) United States Patent
Stevens et al.

(10) Patent No.: US 12,143,704 B2
(45) Date of Patent: Nov. 12, 2024

(54) FLIGHT-CAPABLE RAIL-BASED SYSTEM

(71) Applicant: Ostrich Air Inc., San Jose, CA (US)

(72) Inventors: Derek Reid Stevens, Sunnyvale, CA (US); Jonathan Collazo, San Jose, CA (US)

(73) Assignee: Ostrich Air Inc., San Jose, CA (US)

( * ) Notice: Subject to any disclaimer, the term of this patent is extended or adjusted under 35 U.S.C. 154(b) by 113 days.

(21) Appl. No.: 17/811,646

(22) Filed: Jul. 11, 2022

(65) Prior Publication Data

US 2023/0009190 A1    Jan. 12, 2023

Related U.S. Application Data

(60) Provisional application No. 63/220,698, filed on Jul. 12, 2021.

(51) Int. Cl.
*H04N 23/57* (2023.01)
*B64C 19/00* (2006.01)
(Continued)

(52) U.S. Cl.
CPC ............ *H04N 23/57* (2023.01); *B64C 19/00* (2013.01); *B64C 39/024* (2013.01); *B64D 47/00* (2013.01); *G05D 1/102* (2013.01); *H04N 23/54* (2023.01); *H04N 23/61* (2023.01); *H04N 23/66* (2023.01); *H04N 23/695* (2023.01); *B64U 30/20* (2023.01);
(Continued)

(58) Field of Classification Search
CPC ........ H04N 23/57; H04N 23/54; H04N 23/61; H04N 23/66; H04N 23/695; H04N 23/65; H04N 23/50; B64C 19/00; B64C 39/024; B64D 47/00; G05D 1/102; G05D 1/0094; B64U 30/20; B64U 2101/30; B64U 20/65; B64U 50/23; B64U 10/14; B64U 20/40; B64U 20/87; G03B 5/00; G03B 17/561; G03B 15/006
See application file for complete search history.

(56) References Cited

U.S. PATENT DOCUMENTS

2020/0036873 A1 *  1/2020  Shukla ................ H04N 23/682
2020/0207462 A1 *  7/2020  Kim ..................... B64C 39/024
(Continued)

OTHER PUBLICATIONS

Myburgh (vol. 17 No. 9 (2020): Palarch's Journal of Archaeology of Egypt/Egyptology / Articles Development of a Drive Unit for a Cost-effective Follow-focus Control System Authors JJ Myburgh, AJ Swart, L van Heerden https://archives.palarch.nl/index.php/jae/article/view/5185 published Nov. 2, 2020) (Year: 2020).*

*Primary Examiner* — Nasim N Nirjhar
(74) *Attorney, Agent, or Firm* — Garlick & Markison; Katherine C. Stuckman

(57) ABSTRACT

A flight-capable imaging system includes a set of parallel rails, a power source mounted to the set of parallel rails, an imaging device mounted to the set of parallel rails, an aerial vehicle body mounted to the set of parallel rails, a set of aerial vehicle arms attached to the aerial vehicle body that each include a set of propellers and a motor configured to turn the set of propellers to enable flight of the flight-capable imaging system, and at least one processing module configured to control the flight of the of the flight-capable imaging system based on controlling a motor speed of the motor of each of the set of aerial vehicle arms.

17 Claims, 40 Drawing Sheets flight-capable rail-based system 100

(51) Int. Cl.
    *B64C 39/02*     (2023.01)
    *B64D 47/00*     (2006.01)
    *B64U 30/20*     (2023.01)
    *B64U 101/30*    (2023.01)
    *G05D 1/00*      (2024.01)
    *H04N 23/54*     (2023.01)
    *H04N 23/61*     (2023.01)
    *H04N 23/66*     (2023.01)
    *H04N 23/695*    (2023.01)

(52) U.S. Cl.
    CPC ....... *B64U 2101/30* (2023.01); *G05D 1/0094* (2013.01)

(56) References Cited

U.S. PATENT DOCUMENTS

| | | | |
|---|---|---|---|
| 2022/0067968 A1* | 3/2022 | Momcilovich | G06T 7/74 |
| 2022/0197278 A1* | 6/2022 | Yamamoto | H04N 5/222 |
| 2023/0084439 A1* | 3/2023 | Oshima | B66F 19/00 244/17.23 |

\* cited by examiner flight-capable rail-based system 100 flight-capable rail-based system 100 flight-capable rail-based system 100 aerial vehicle 110 vehicle-mounted rail system 150 vehicle-mounted rail system 150 vehicle-mounted rail system 150 vehicle-mounted rail system 150 vehicle-mounted rail system 150 vehicle-mounted rail system 150 flight-capable imaging system 101 flight-capable imaging system 101 vehicle-mounted rail system 150 vehicle-mounted rail system 150 vehicle-mounted rail system 150

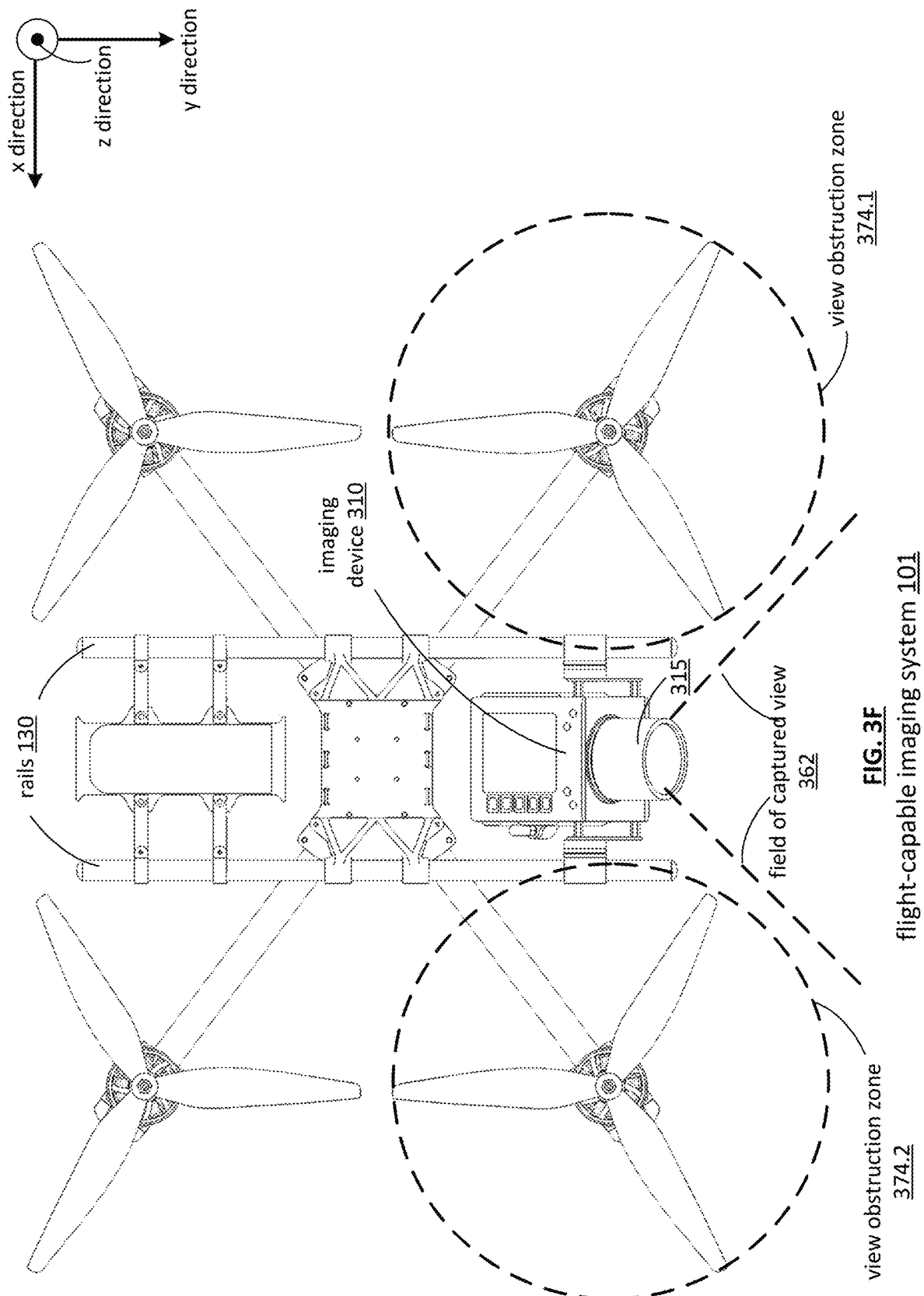

flight-capable imaging system 101 flight-capable imaging system 101 flight-capable imaging system 101 flight-capable rail-based system 100 arm 124

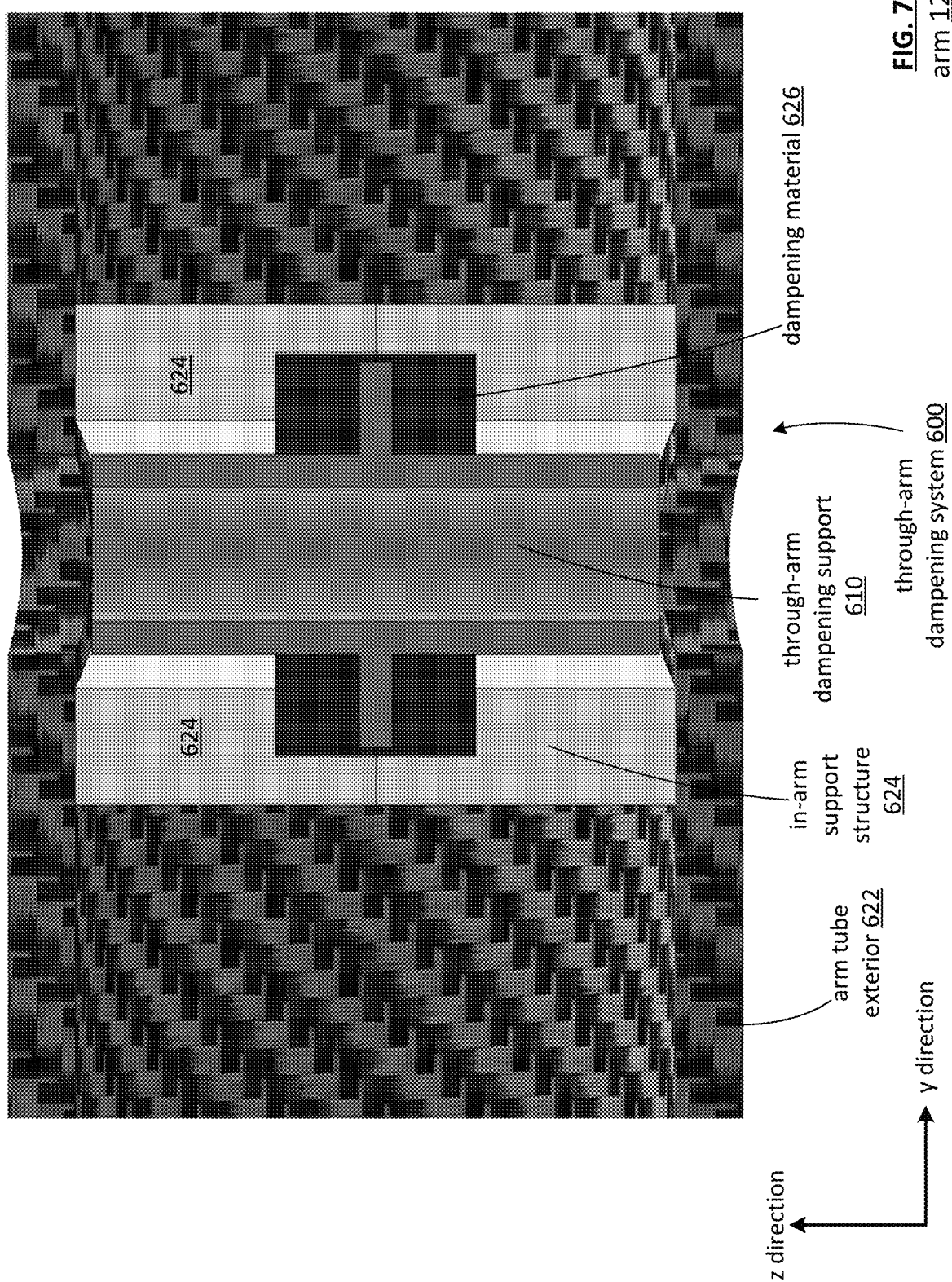

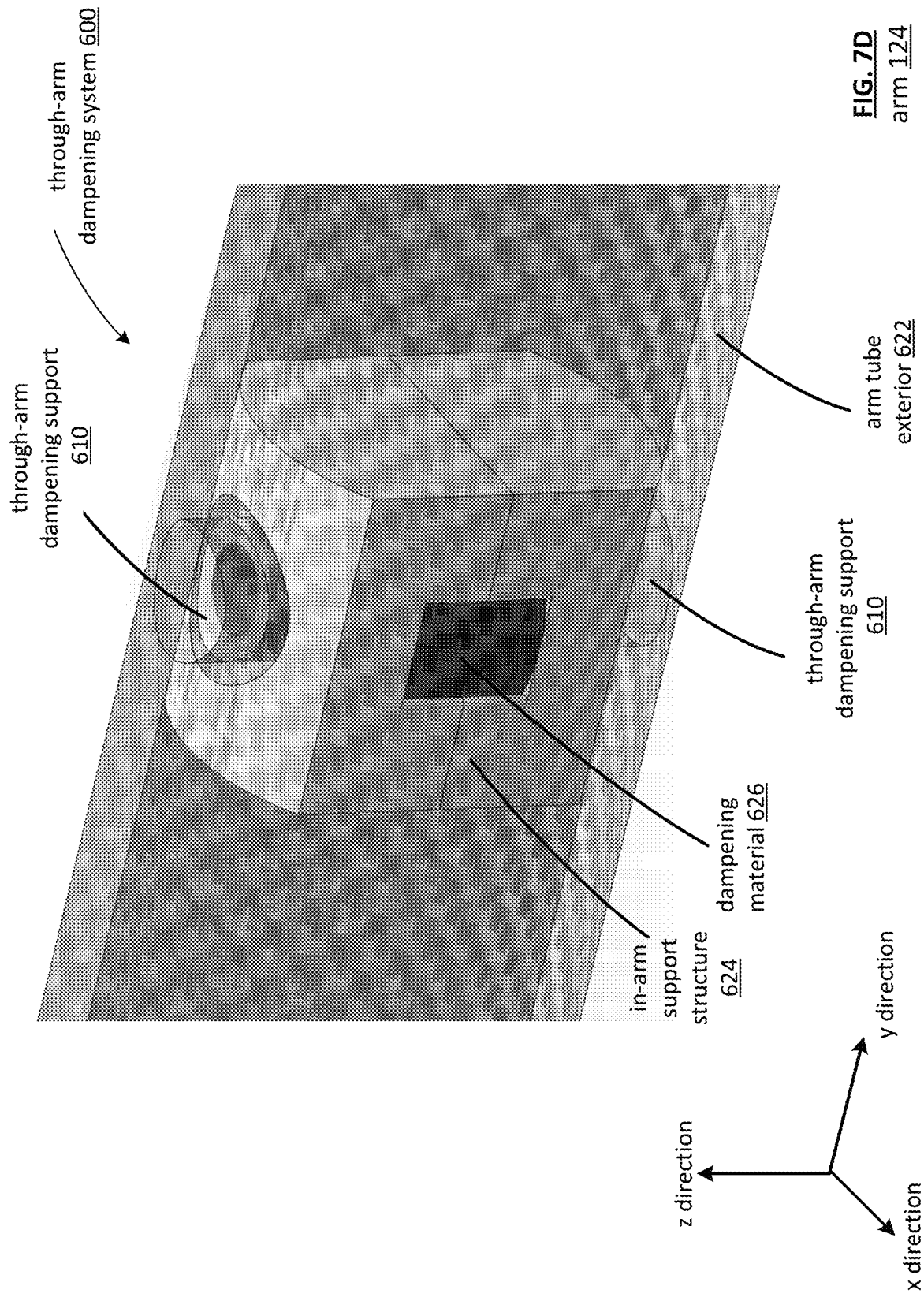

arm 124 flight-capable rail-based system 100 flight-capable rail-based system 100 flight-capable rail-based system 100 flight-capable rail-based system 100

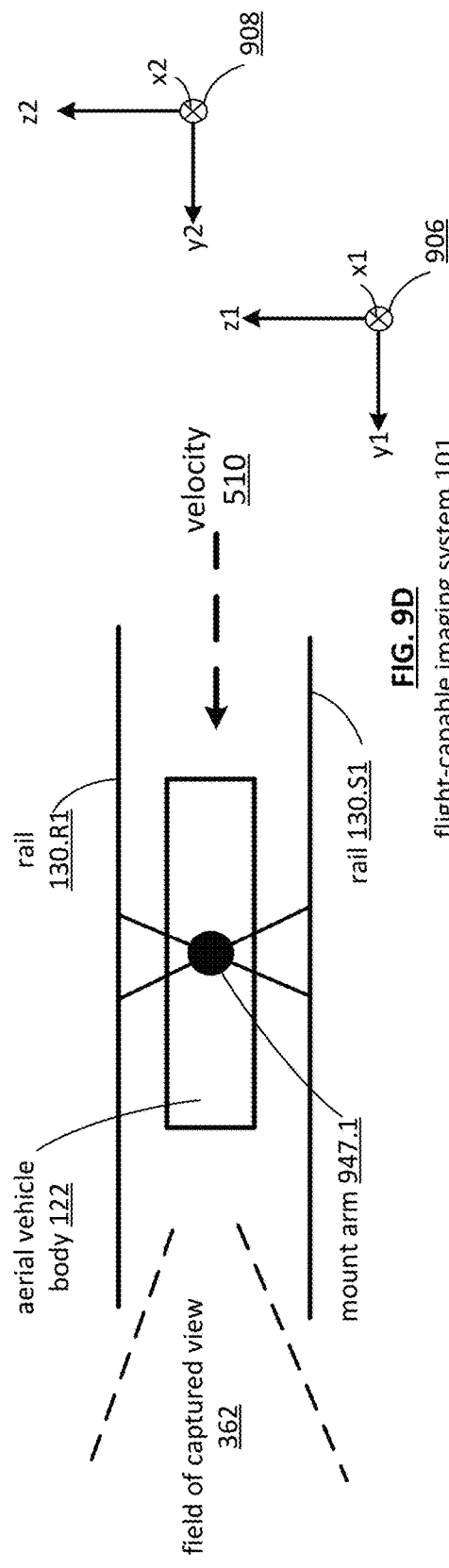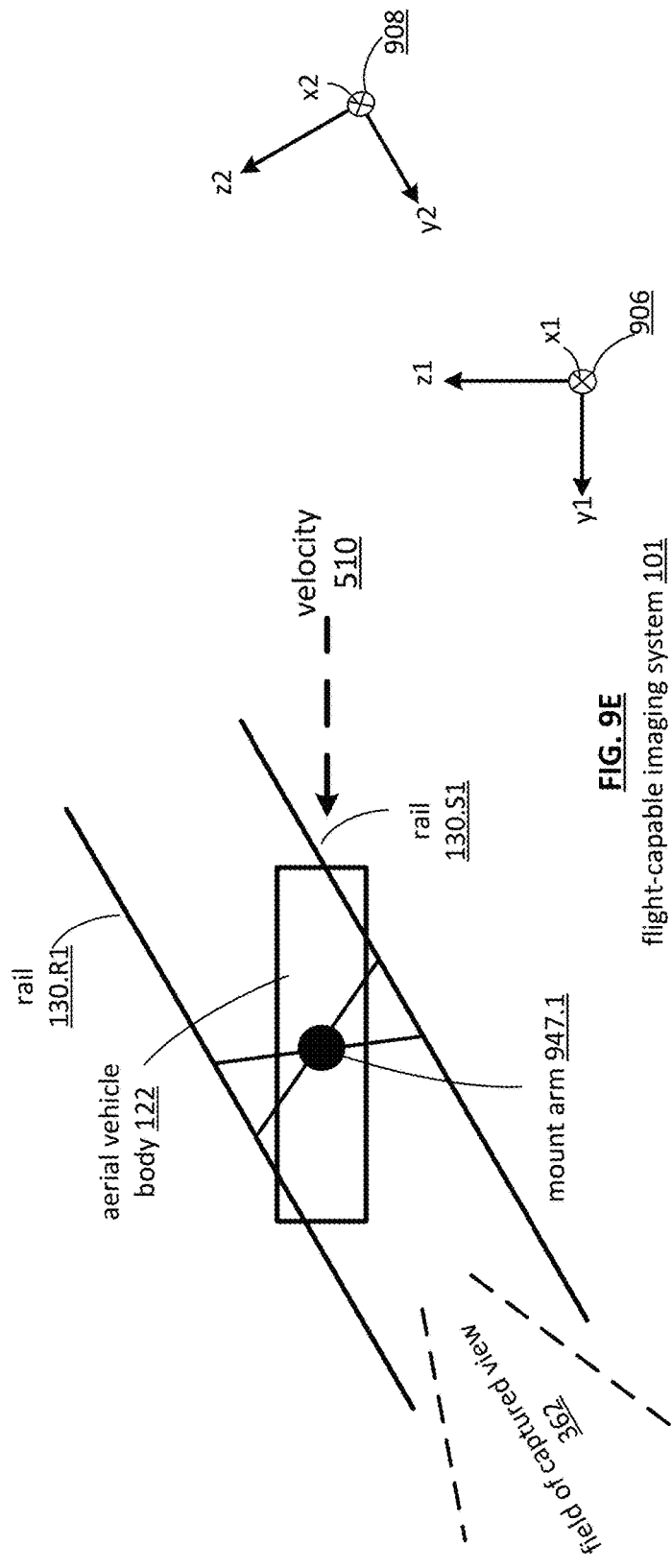

FLIGHT-CAPABLE RAIL-BASED SYSTEM

CROSS REFERENCE TO RELATED APPLICATIONS

The present U.S. Utility patent application claims priority pursuant to 35 U.S.C. § 119(e) to U.S. Provisional Application No. 63/220,698, entitled "FLIGHT-CAPABLE RAIL-BASED SYSTEM", filed Jul. 12, 2021, which is hereby incorporated herein by reference in its entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This disclosure relates generally to aerial vehicle systems and imaging systems.

BRIEF DESCRIPTION OF THE SEVERAL VIEWS OF THE DRAWING(S)

FIG. 3F is a top view illustration of a flight-capable imaging system with an imaging device having a field of captured view that is unobstructed by view obstruction zones induced by propellers of the flight-capable imaging system in accordance with various embodiments;

FIG. 7C is a shaded two-dimensional cross-sectional illustration of an arm of a flight-capable rail-based system implementing a through-arm dampening system in accordance with various embodiments;

FIG. 7D is a three-dimensional illustration of the interior of an arm of a flight-capable rail-based system implementing a through-arm dampening system in accordance with various embodiments;

Figure 9A:
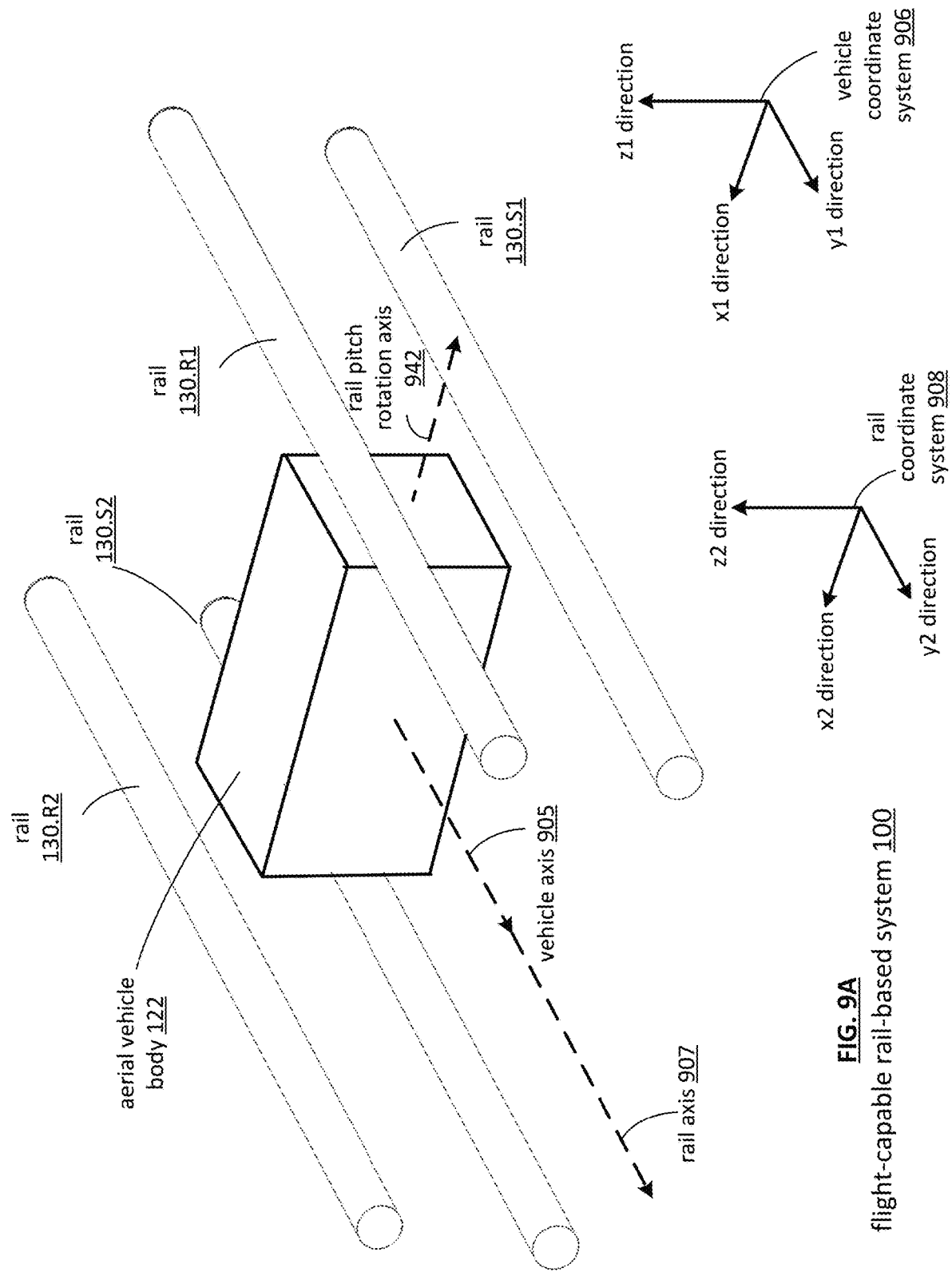
FIGS. 9A and 9B are three-dimensional illustrations of a flight-capable rail-based system having a vehicle-mounted rail system that can move independently of a corresponding aerial vehicle in accordance with various embodiments.
Figure 9B:
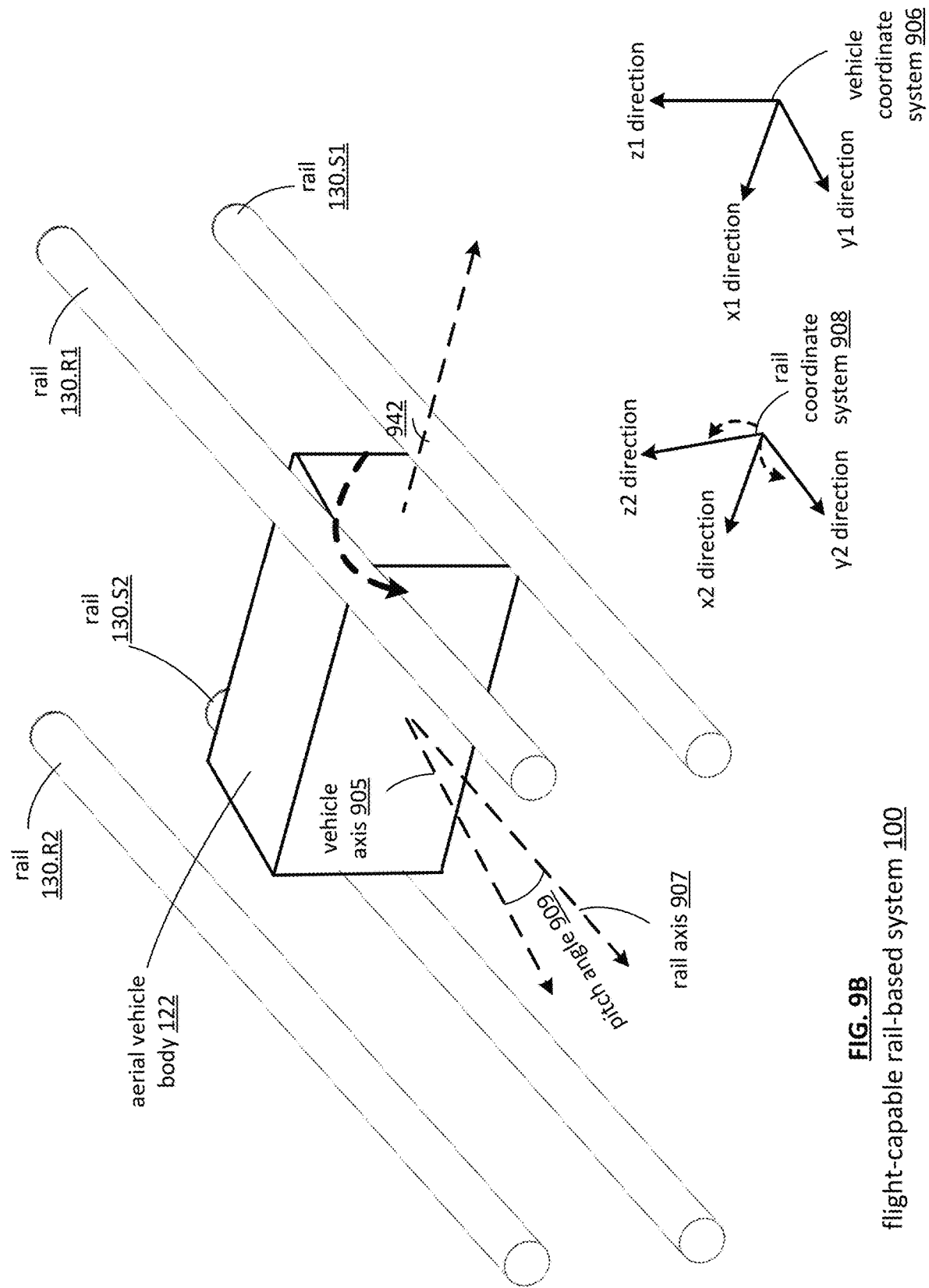
Figure 9C:
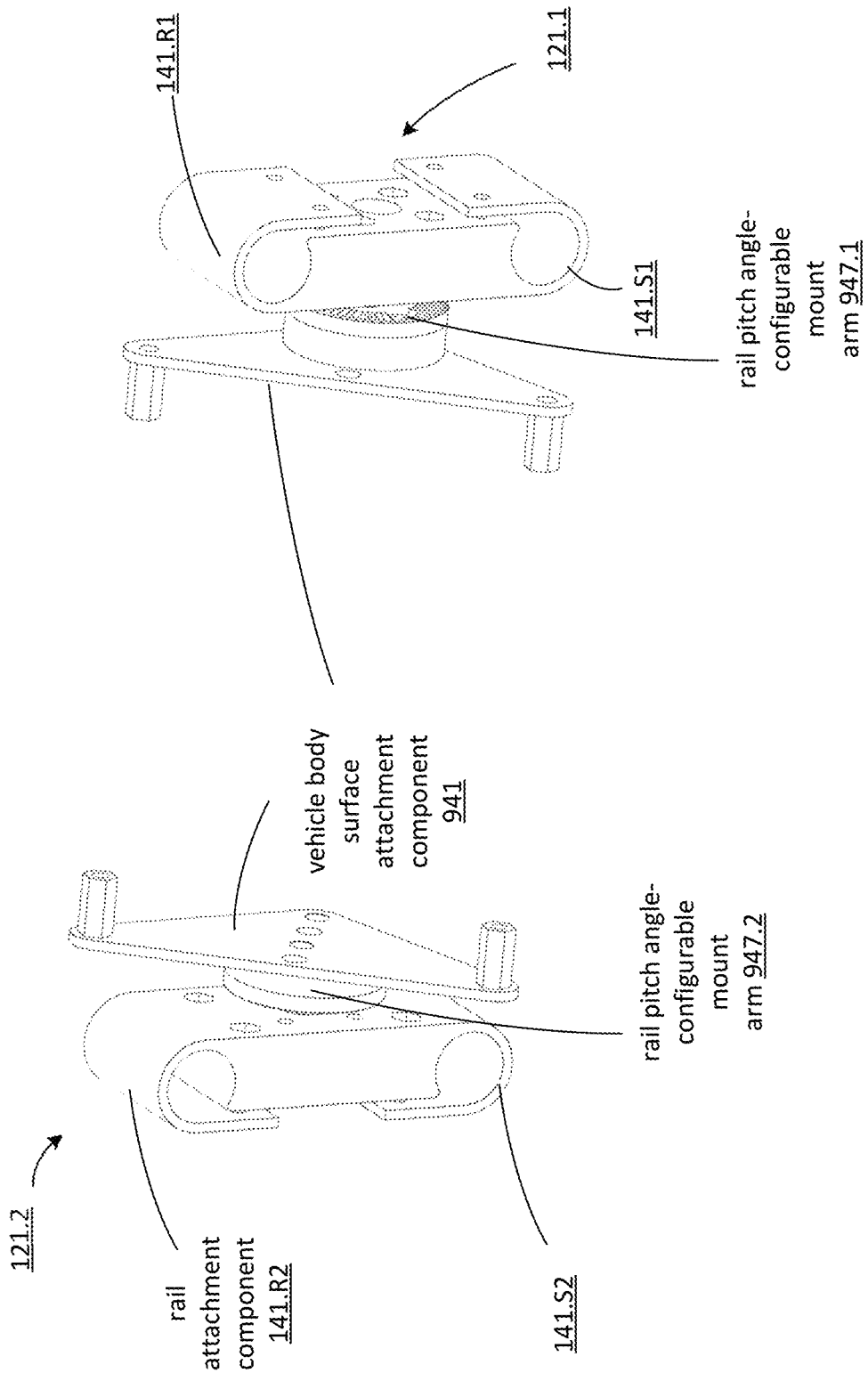

FIG. 9C is a three-dimensional illustration of a pair of rail system to vehicle mounts that implement rail pitch angle-configurable mounts in accordance with various embodiments; and FIGS. 9D and 9E are three-dimensional illustrations of a flight-capable imaging system operable to change a field of captured view during flight based on rotation of a vehicle-mounted rail system relative to a corresponding aerial vehicle body during flight.

DETAILED DESCRIPTION OF THE INVENTION

Figure 1A:
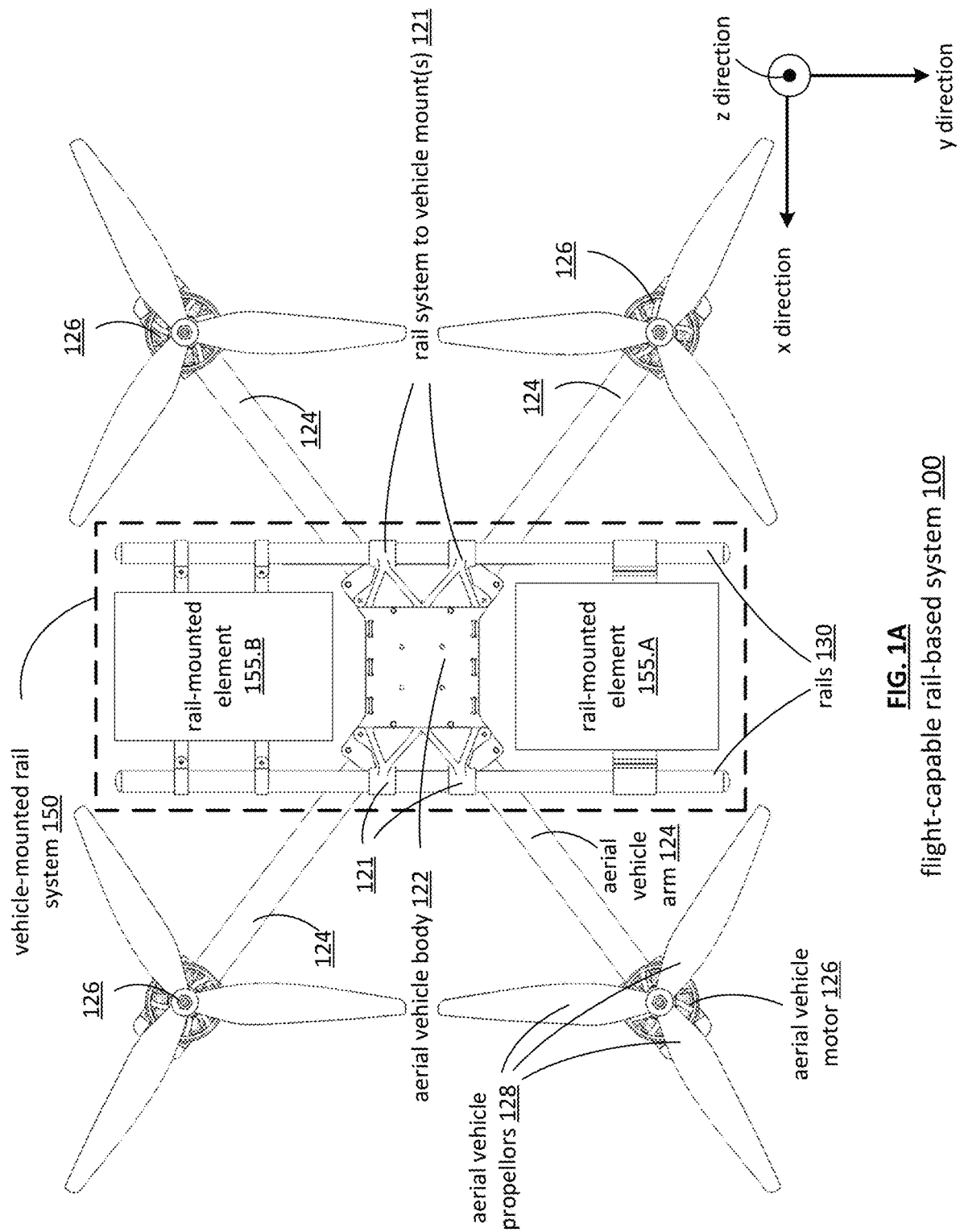
FIG. 1A is a top view illustration of a flight-capable rail-based system in accordance with various embodiments.
Figure 1B:
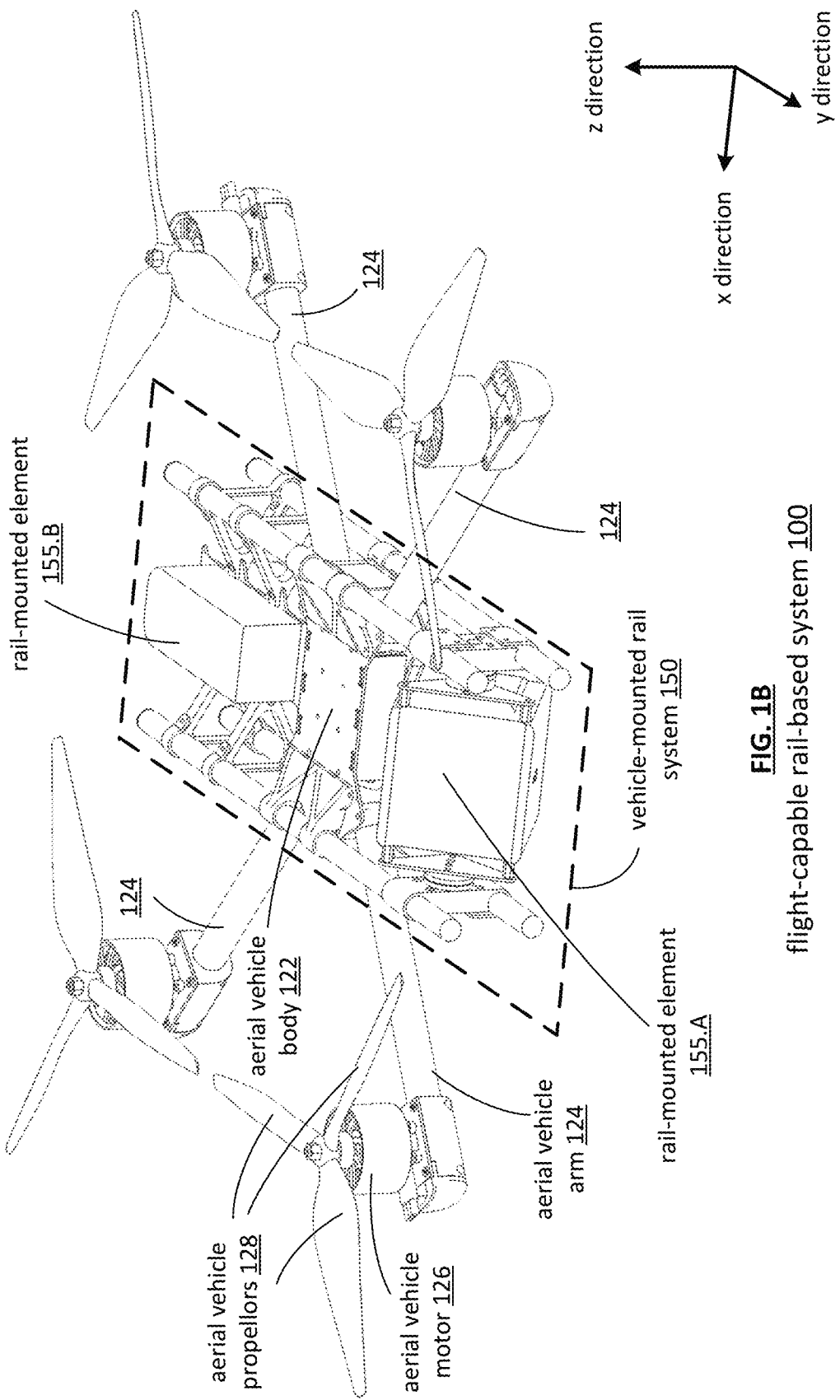
FIG. 1B is a three-dimensional illustration of a flight-capable rail-based system in accordance with various embodiments.
Figure 1C:
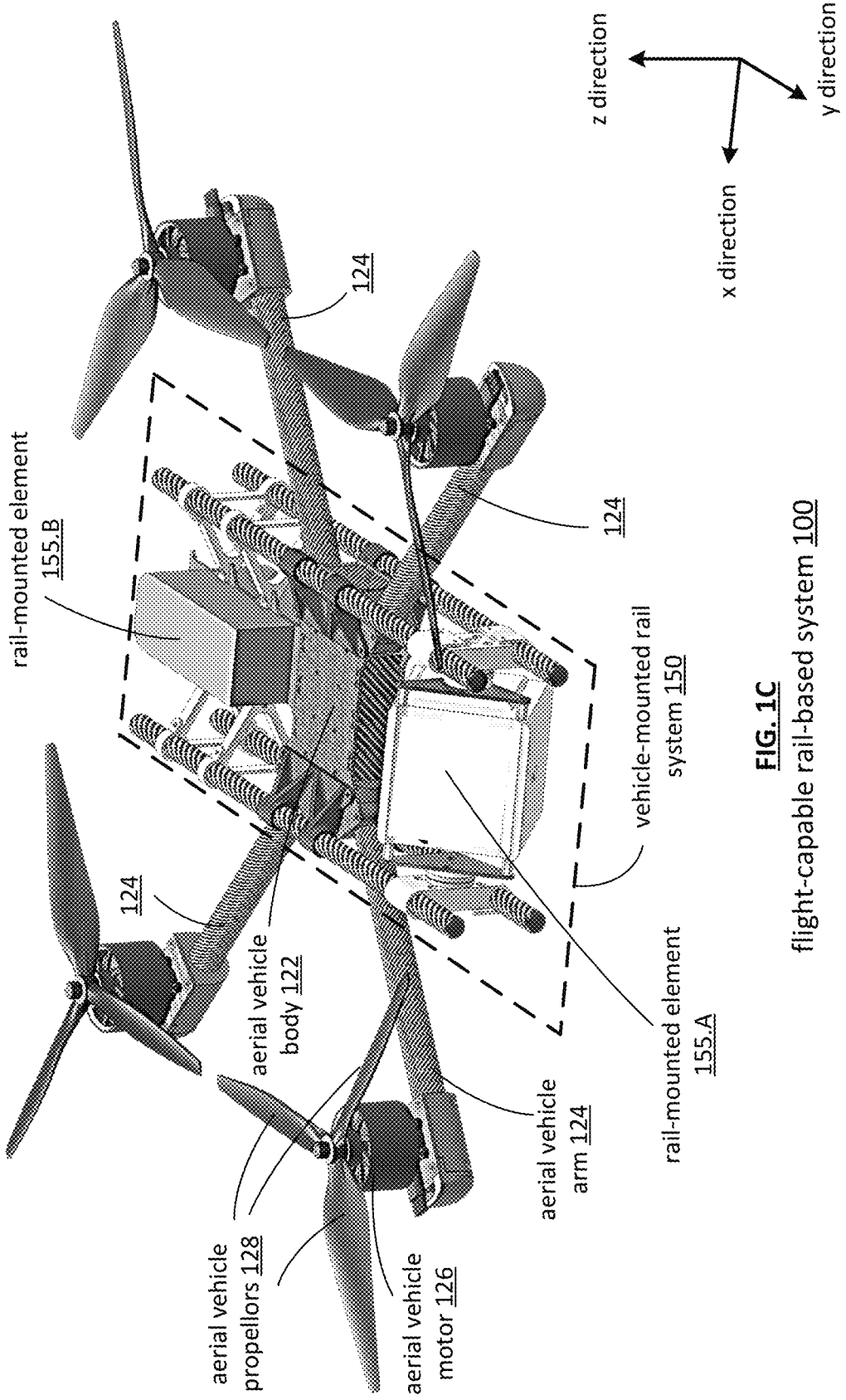
FIG. 1C is a three-dimensional shaded illustration of a flight-capable rail-based system in accordance with various embodiments.

FIGS. 1A-1C present an embodiments of a flight-capable rail-based system 100. The body of a vehicle of the flight-capable rail-based system 100, such as an aerial vehicle body 122 of an aerial vehicle capable of flight, can be mounted to a vehicle-mounted rail system 150 of the flight-capable rail-based system 100 via attachment of the body of the vehicle to a set of parallel rails 130 of the vehicle-mounted rail system 150. One or more rail-mounted elements 155 can also be attached to the vehicle-mounted rail system 150 via attachment of one or more rail-mounted elements 155 to the set of parallel rails 130.

The flight-capable rail-based system 100 of FIGS. 1A-1C is illustrated in accordance with an x direction, y direction, and z direction. The x direction, y direction, and z direction can be fixed with respect to a given orientation of the flight-capable rail-based system 100.

As used herein, "top" components and/or components "above" other components can be relative to the z direction, for example, where components that are above other components have positions with greater z-coordinate values in the z direction than the other components. The z direction can correspond to an upwards direction of travel of the flight-capable rail-based system 100, where a projected component of upward direction of the flight-capable rail-based system 100 is in the z direction and/or is opposite the direction of gravity.

As used herein, "bottom" components and/or components "below" other components can be relative to the opposite direction of the z direction, where components that are below other components have positions with lower z-coordinate values in the z direction than the other components. The direction opposite the z direction can correspond to a direction opposite the upward direction of travel of the flight-capable rail-based system 100 and/or a downward direction of travel of the flight-capable rail-based system 100, where a projected component of downward direction of the flight-capable rail-based system 100 is opposite the z direction and/or is in the direction of gravity.

As used herein, "front" components and/or components "in front of" other components can be relative to the y direction, where components that are in front of other components have positions with higher y-coordinate values in the y direction than the other components. The y direction can correspond to a forward direction of travel of the flight-capable rail-based system 100, where a projected component of a forward direction of travel of the flight-capable rail-based system 100 is in the y direction.

As used herein, "rear" components and/or components "behind" other components can be relative to a direction opposite the y direction, where components that are behind other components have positions with lower y-coordinate values in the y direction than the other components. The direction opposite the y direction can correspond to a direction opposite the forward direction of travel of the flight-capable rail-based system 100 and/or a backward direction of travel of the flight-capable rail-based system 100, where a projected component of backward direction of the aerial vehicle is opposite the y direction. In some embodiments, the flight-capable rail-based system 100 is operable to fly in accordance with the forward direction of travel, and not the backwards direction of travel, always and/or in most cases. Alternatively, the flight-capable rail-based system 100 is operable to fly in either the backward and/or forward direction.

As used herein, "right" components and/or components to the "right of" other components can be relative to the x direction, where components that are to the right of other components have positions with higher x-coordinate values in the x direction than the other components. The x direction can correspond to a right direction of travel of the flight-capable rail-based system 100, where a projected component of a right direction of travel of the flight-capable rail-based system 100 is in the x direction.

As used herein, "left" components and/or components to the "left of" other components can be relative to a direction opposite the x direction, where components that are to the left of other components have positions with lower x-coordinate values in the x direction than the other components. The direction opposite the x direction can correspond to a left direction of travel of the flight-capable rail-based system 100, where a projected component of a left direction of travel of the flight-capable rail-based system 100 is opposite the x direction.

FIG. 1A illustrates a two-dimensional top view of an embodiment of flight-capable rail-based system 100, FIG. 1B illustrates a three-dimensional top-right view of the embodiment of the flight-capable rail-based system 100, and FIG. 1C illustrates a three-dimensional top-right shaded view of the embodiment of the flight-capable rail-based system 100. Some or all features and/or functionality of the flight-capable rail-based system 100 as illustrated and/or described in conjunction with FIGS. 1A and/or 1B can be utilized to implement any other embodiment of flight-capable rail-based system 100 described herein.

As illustrated in FIGS. 1A-1C, aerial vehicle of the flight-capable rail-based system 100 can include an aerial vehicle body 122. Each of a plurality of aerial vehicle arms 124 can be attached to and can extend from aerial vehicle body 122. For example, the plurality of aerial vehicle arms 124 includes exactly four aerial vehicle arms 124, where the aerial vehicle is implemented as a quadrotor unmanned aerial vehicle. In other embodiments, the plurality of aerial vehicle arms 124 can include six, eight, or another number of aerial vehicle arms 124. In other embodiments, the aerial vehicle does not include any aerial vehicle arms 124, for example, where the aerial vehicle is operable to fly via one or more propellers attached to the aerial vehicle body 122, and/or via another mechanism enabling flight of the aerial vehicle.

Each aerial vehicle arm 124 can include a motor 126 that powers a corresponding plurality of propellers 128 that enable flight of the flight-capable rail-based system 100. For example, an electronic speed control (ESC) circuit is implemented via each aerial vehicle arm 124 to control and/or regulate the speed of each respective motor 126 based on flight control signals generated by and/or received from a flight control module of the aerial vehicle.

The flight-capable rail-based system 100 can further include a vehicle-mounted rail system 150 that is attached to the aerial vehicle body 122. The vehicle-mounted rail system 150 can include a plurality of parallel rails 130 that are all parallel to an axis in the y direction. The vehicle-mounted rail system 150 can include exactly four parallel rails 130 as depicted in FIGS. 1A and 1B. In other embodiments, the vehicle-mounted rail system 150 can include two, six, eight, or another number of parallel rails 130. Each of the plurality of parallel rails 130 can have some or all of the same dimensions, such as same length dimension in the y direction and/or a same diameter. Each of the plurality of parallel rails can be cylindrical as depicted in FIGS. 1A and 1B, can have a prism shape with corresponding polygonal shaped ends, and/or can have a different shape.

The plurality of rails can extend past the length of the aerial vehicle body 122 in the y direction. The plurality of rails can extend past and/or fall short of the length of the y direction component of the front and/or rear aerial vehicle arms 124. In some embodiments, the length of the rails in the y direction are less than a meter in length. For example, the length of the rails in the y direction can be equal to and/or similar to 450 mm in length, and/or can be another length.

The plurality of aerial vehicle arms can each extend past respective rails 130 in the x direction and/or opposite the x direction, where the front right and back right aerial vehicle arms 124 each extend further right than the top right and bottom right rails 130 in the x direction and/or where the front left and back left vehicle arms 124 each extend further left than the top left and bottom left rails 130 opposite the x direction. For example, the front right and back right aerial vehicle arms 124 each intersect a first plane defined by axes of the top right and bottom right rails in the y direction, and the front left and back left aerial vehicle arms 124 each intersect a second plane defined by axes of the top left and bottom left rails in the y direction, where the second plane is parallel to the first plane and/or where the first plane and second plane are orthogonal to the x direction. In particular, the front right and back right aerial vehicle arms 124 can each intersect the first plane at a point in the z direction that is below the top right rail and above the bottom right rail, while front left and back left aerial vehicle arms 124 can each intersect the second plane at a point in the z direction that is below the top left rail and above the bottom left rail. Each of the aerial vehicle arms can extend from a first end attached to the vehicle body to a second end attached to the motor and propellers along a corresponding axis that is orthogonal to the z direction.

The vehicle-mounted rail system 150 can be attached to the aerial vehicle body 122 via a plurality of rail system to vehicle mounts 121. Each rail system to vehicle mount 121 can attach to a portion of the aerial vehicle body 122 and can further attach to one or more rails 130 of the vehicle-mounted rail system 150. Each rail 130 of the vehicle-mounted rail system 150 can be connected to the aerial vehicle body 122 via one or more of the rail system to vehicle mounts 121. In other embodiments, rather than attaching to an aerial vehicle body 122, the rail system to vehicle mounts 121 can instead attach to other portions of a corresponding aerial vehicle, such as its arms 124 and/or a non-central portion of the vehicle. Example embodiments of rail system to vehicle mounts 121 are illustrated and discussed in conjunction with FIGS. 6A-6B and FIG. 9C. The aerial vehicle body 122 can alternatively be mounted to vehicle-mounted rail system 150 via a different type of mounting, such as any mounting of FIGS. 6A-6H, and/or another means of mounting aerial vehicle body 122 to the set of rails 130.

The vehicle-mounted rail system 150 can further include one or more rail-mounted elements 155 mounted to some or all of the rails 130 of the rail system 150. For example, as illustrated in FIGS. 1A and 1B, the vehicle-mounted rail system 150 includes at least one front rail-mounted element 155.A attached to the plurality of rails in front of the aerial vehicle body 122 relative to the y direction, and further includes at least one rear rail-mounted element 155. B attached to the plurality of rails behind the aerial vehicle body 122 relative to the y direction. In other embodiments, a different number of rail mounted elements 155 are mounted to the rails 130 of the rail system, and/or the rail mounted elements 155.A and 155.B are mounted in a different configuration relative to the aerial vehicle body and/or the y direction.

As the aerial vehicle body 122 is also mounted to the vehicle-mounted rail system 150 via the rail system to vehicle mounts 121, the aerial vehicle body 122 can be considered a further rail-mounted element 155. The aerial vehicle body 122 can be mounted to the vehicle-mounted rail system 150 at and/or near a mid-point of the plurality of parallel rails 130 relative to the y direction. The aerial vehicle body 122 can be mounted to the vehicle-mounted rail system 150 in accordance with some or all features and/or functionality of one or more embodiments of rail-mounted elements 155 as illustrated and/or described herein.

Figure 1D:
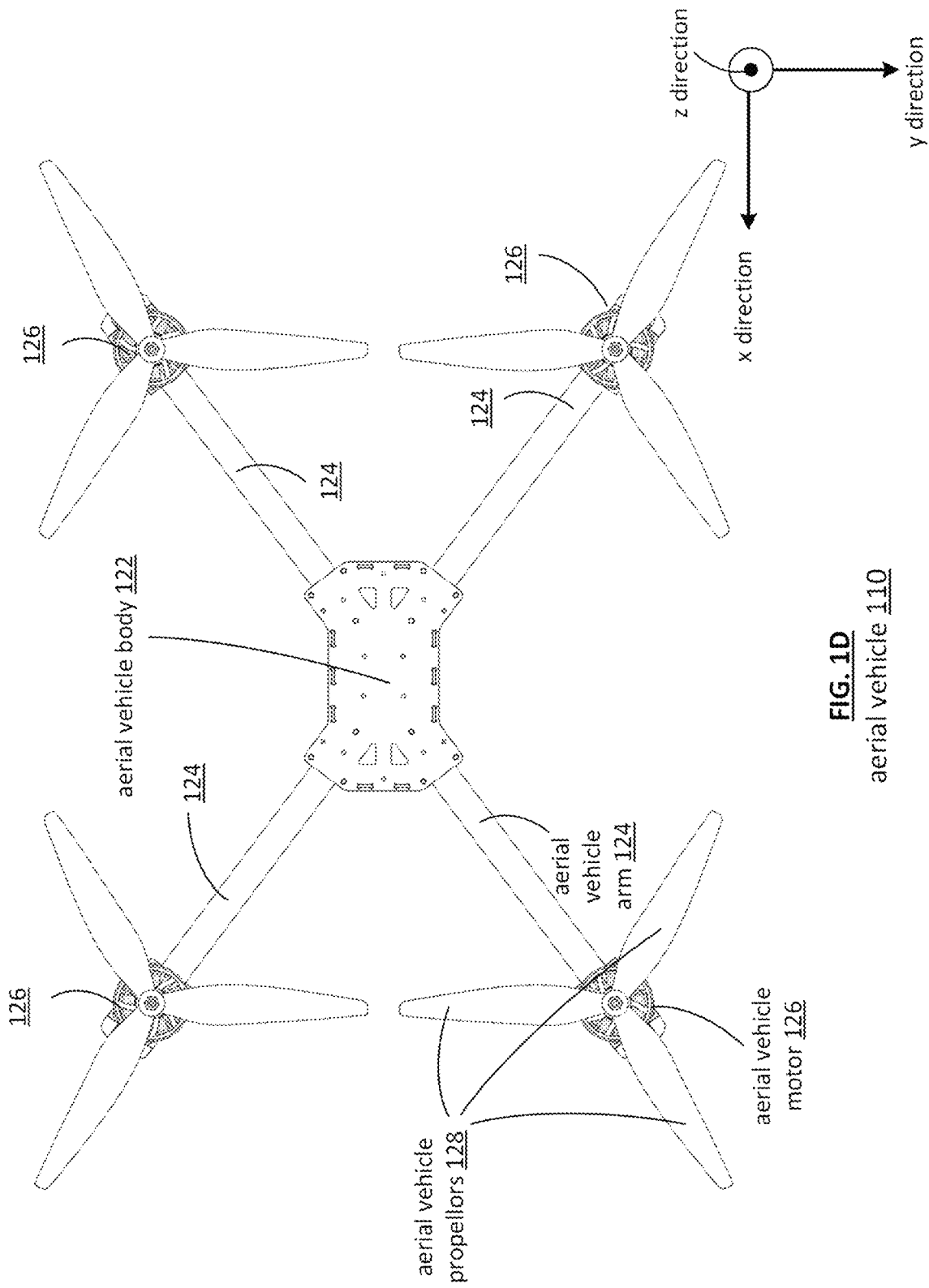
FIG. 1D is a top view illustration of an aerial vehicle of a flight-capable rail-based system in accordance with various embodiments.

FIG. 1D illustrates an embodiment of an aerial vehicle 110, for example, of a corresponding flight-capable rail-based system 100, such as the flight-capable rail-based system 100 of FIGS. 1A-1C. In particular, the aerial vehicle 110 of FIG. 1D can correspond to the aerial vehicle upon which the vehicle-mounted rail system 150 is mounted, where the vehicle-mounted rail system 150 is not depicted in FIG. 1D to illustrate the components of the aerial vehicle of the flight-capable rail-based system 100. Mounting of a vehicle-mounted rail system 150, such as an embodiment of vehicle-mounted rail system 150 of FIGS. 2A-2F, upon the aerial vehicle 110 can render the flight-capable rail-based system 100 of FIGS. 1A-1C.

The aerial vehicle 110 can include the aerial vehicle arms 124, aerial vehicle body 122, motors 126, and/or propellers 128 as illustrated in FIGS. 1A-1C. In other embodiments, the aerial vehicle 110 can correspond another type of aerial vehicle 110 that does not include aerial vehicle arms 124, an aerial vehicle body 122, motors 126, and/or propellers 128, but is still capable of flight. In other embodiments, the vehicle 110 can be a non-aerial vehicle, such as a ground-based vehicle or water-based vehicle that has different types of components to enable its respective means of motion.

The aerial vehicle 110 can be a custom or commercially available aerial vehicle. The aerial vehicle 110 can be an unmanned aerial vehicle, such as a quadrotor unmanned aerial vehicle. The aerial vehicle can be implemented as a racing drone and/or other aerial vehicle capable of traveling at high velocities such as speeds reaching and/or exceeding 99 miles per hour, and/or via complex maneuvers, for example, requiring precise movements and/or dramatic changes in acceleration, speed, orientation, and/or direction.

The aerial vehicle 110 can optionally include its own integrated processing module that implements a flight control module and/or can receive flight control data generated by another processing module of the flight-capable rail-based system, such as processing module mounted as another rail-mounted element 155. The aerial vehicle 110 can be implemented as an autonomous system and/or a remote-controlled system. Flight control of the aerial vehicle 110 of vehicle-mounted rail system 150 is discussed in further detail in conjunction with FIGS. 4A-4D.

In some embodiments, the vehicle-mounted rail system 150 is configured to be detachable from the flight-capable rail-based system 100. For example, the aerial vehicle 110 of FIG. 1C can correspond to a configuration of the flight-capable rail-based system 100 prior to mounting of the vehicle-mounted rail system 150 and/or a configuration where the vehicle-mounted rail system 150 is detached.

The vehicle-mounted rail system 150 can configured to be detachable from the flight-capable rail-based system 100 based on detachment of the rail system to vehicle mounts 121 from aerial vehicle body 122. Alternatively or in addition, the vehicle-mounted rail system 150 can configured to be detachable from the flight-capable rail-based system 100 based on detachment of the rail system to vehicle mounts 121 from rails 130, for example, based on sliding of rails 130 through and out of rail system to vehicle mounts 121 by hand after detachment of the rail mounted element 155.A and/or 155.B, based on detaching via a screwdriver or specialized tool, and/or by otherwise detaching vehicle mounts 121 from rails 130.

FIGS. 2A-2F illustrate embodiments of a vehicle-mounted rail system 150. Some or all features and/or functionality of the vehicle-mounted rail system 150 illustrated and/or described in conjunction with FIGS. 2A-2F can be utilized to implement the vehicle-mounted rail system 150 of FIGS. 1A-1C, and/or any other embodiment of the vehicle-mounted rail system 150 described herein.

One or more embodiments of vehicle-mounted rail system 150 described herein can be attached to an aerial vehicle 110 of FIG. 1D, and/or can be configured for attachment to and/or detachment from the aerial vehicle 110 of FIG. 1D. One or more embodiments of vehicle-mounted rail system 150 described herein can be attached to, and/or can be configured for attachment to and/or detachment from, any other type of aerial vehicle, ground vehicle, water-based vehicle, and/or other vehicle. One or more embodiments of vehicle-mounted rail system 150 of FIGS. 2A-2F can be configured to be in motion when attached to any other object in motion, and/or can be configured to be attached to and/or detached from one or more different types of vehicles and/or objects that assume and/or enable the motion.

Figure 2A:
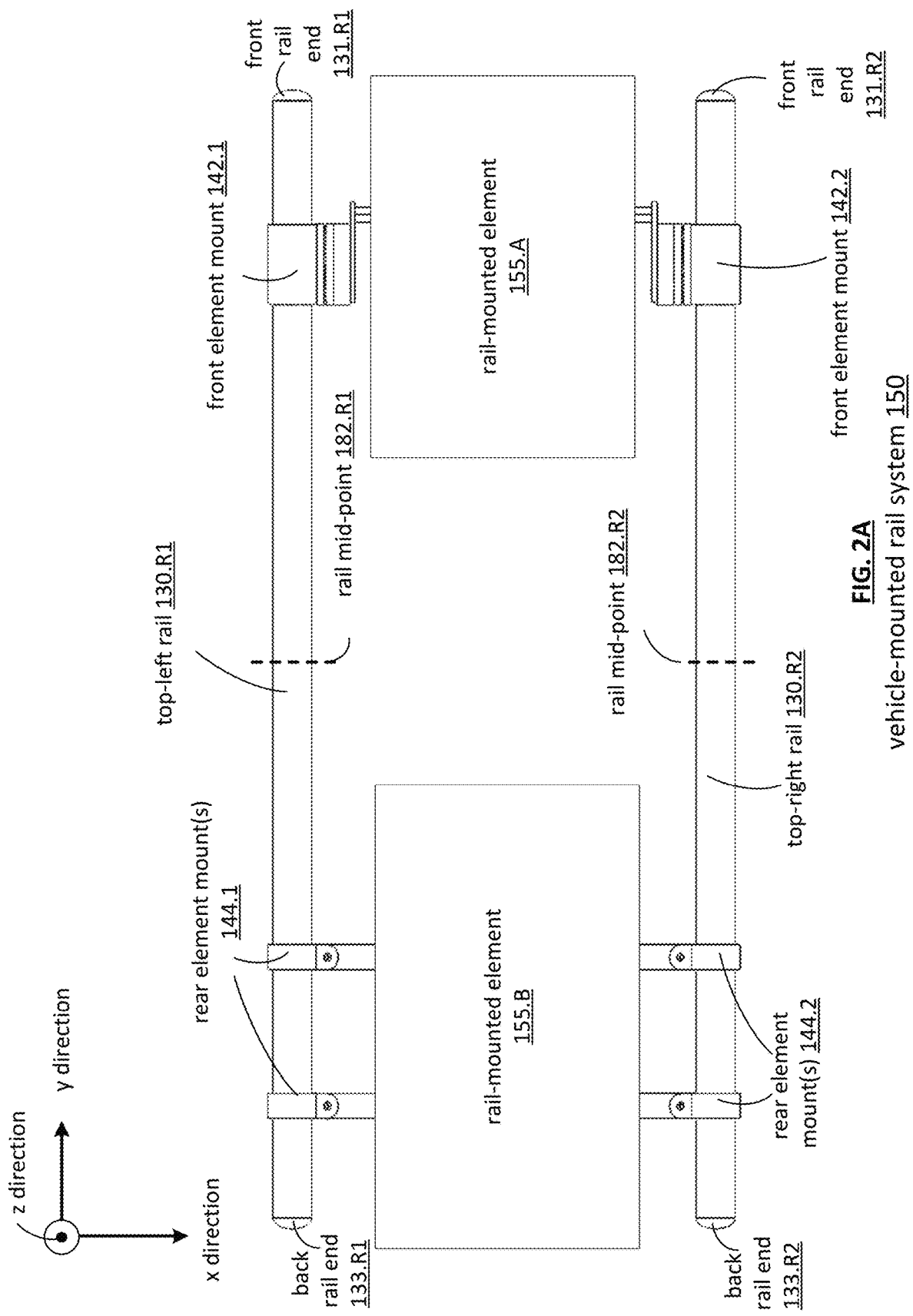
FIG. 2A is a top view illustration of a vehicle-mounted rail system in accordance with various embodiments.

FIG. 2A illustrates a top-view of an embodiment of vehicle-mounted rail system 150. As illustrated in FIG. 2A, a top-left rail 130.R1 and top-right rail 130.R2 can include: front rail ends 131.R1 and 131.R2, respectively; back rail ends 133.R1 and 133.R2, respectively; and rail mid-points 182.R1 and 182.R2, respectively, centered upon the corresponding rail 130 between its front rail end 131 and back rail end 133 with respect to the y direction. As illustrated in FIG. 2A, the front rail ends 131.R1 and 131.R2 can be aligned at a same position with respect to the y direction and the back rail ends 133.R1 and 133.R2 can be aligned at a same position with respect to the y direction, where rail mid-points 182.R1 and 182.R2, are thus aligned at a same position with respect to the y direction.

As illustrated in FIG. 2A, the front rail-mounted element 155.A can be mounted to rail 130.R1 via at least one first front element mount 142.1, and can be mounted to rail 130.R2 via at least one second front element mount 142.2. The first front element mount 142.1 and the second front element mount 142.2 can be positioned between respective front rails ends 131 and rail mid-points 182 of rail 130.R1 and rail 130.R2. The first front element mount 142.1 and the second front element mount 142.2 can be positioned upon each respective rail in a same one or more positions with respect to the y direction.

As illustrated in FIG. 2A, the rear rail-mounted element 155.B can be mounted to rail 130.R1 via at least one first rear element mount 144.1, and can be mounted to rail 130.R2 via at least one second rear element mount 144.2. The first rear element mount 144.1 and the second rear element mount 144.2 can be positioned between respective back rails ends 133 and rail mid-points 182 of the first rail 130.R1 and the second rail 130.R2, respectively. The first rear element mount 144.1 and the second rear element mount 144.2 can be positioned upon each respective rail in a same one or more positions with respect to the y direction.

Figure 2B:
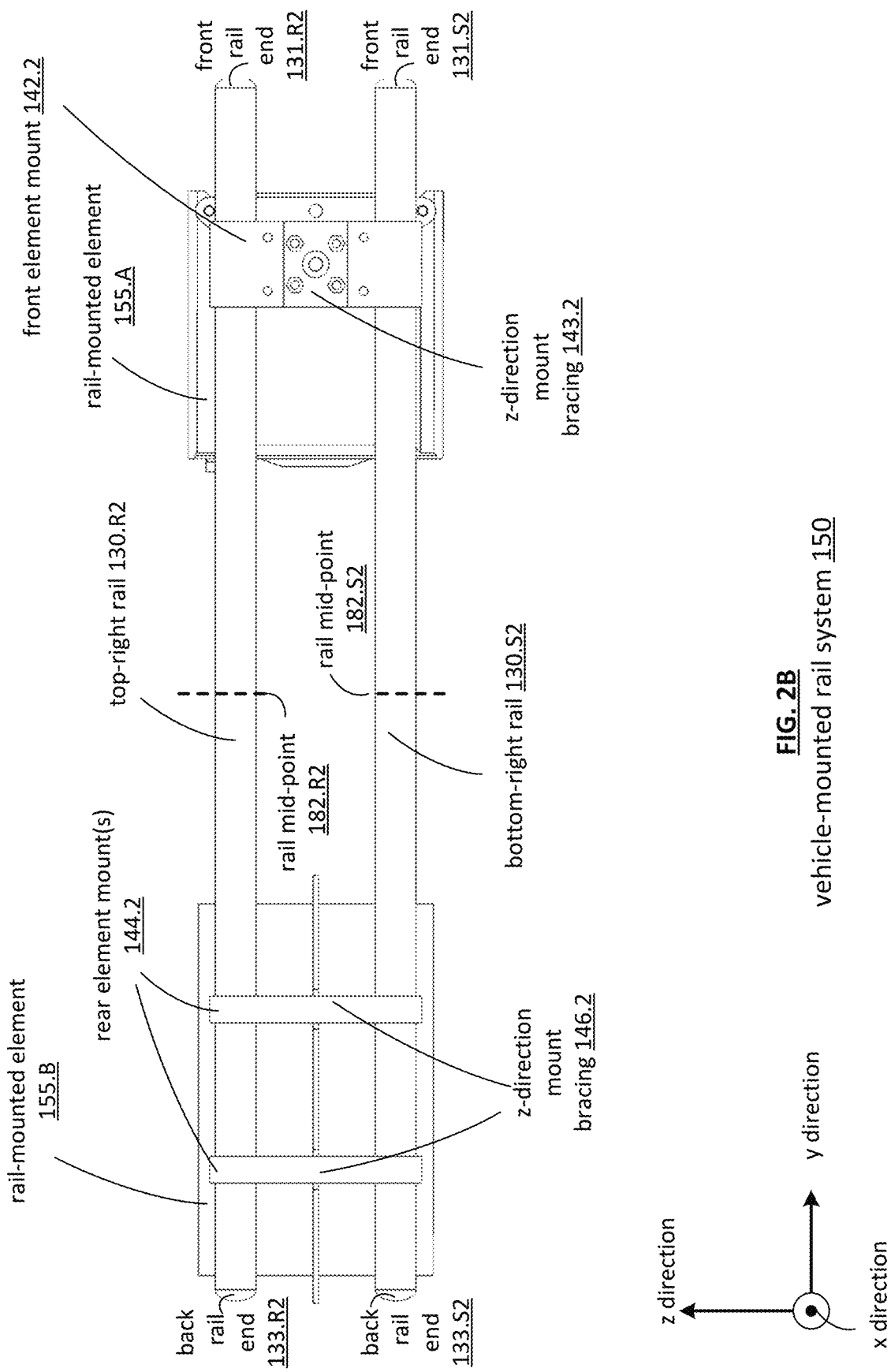
FIG. 2B is a side view illustration of a vehicle-mounted rail system in accordance with various embodiments.

FIG. 2B illustrates a side-view of an embodiment of vehicle-mounted rail system 150. As illustrated in FIG. 2B, a top-right rail 130.R2 and bottom-right rail 130.S2 can include: front rail ends 131.R2 and 131.S2, respectively; back rail ends 133.R2 and 133.S2, respectively; and rail mid-points 182.R2 and 182.S2, respectively, centered upon the corresponding rail 130 between its front rail end 131 and back rail end 133 with respect to the y direction. As illustrated in FIG. 2B, the front rail ends 131.R2 and 131.S2 can be aligned at a same position with respect to the y direction and the back rail ends 133.R2 and 133.S2 can be aligned at a same position with respect to the y direction, where rail mid-points 182.R1 and 182.S1, are thus aligned at a same position with respect to the y direction.

Figure 2C:
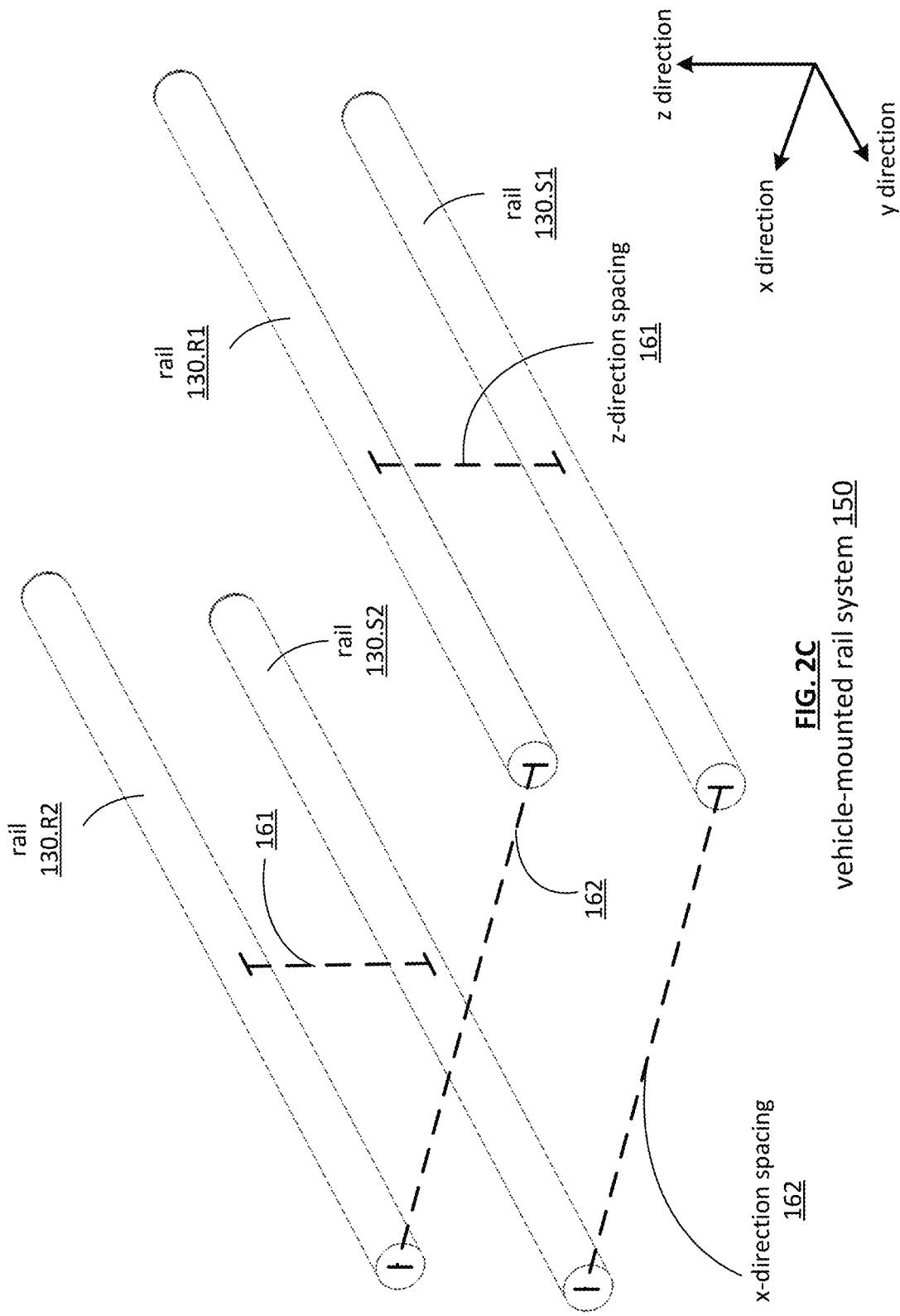
FIG. 2C is a three-dimensional illustration of a rail configuration of a vehicle-mounted rail system in accordance with various embodiments.

While not depicted in the views of FIG. 2A or 2B, a bottom-left rail 130.S1 can similarly include a front rail end 131.S1, a back rail end 133.S1, and a rail mid-point 182.S1 centered upon the corresponding rail 130.S1 between its front rail end 131 and back rail end 133 with respect to the y direction. Front rail ends 131.R1 and 131.S1 can be aligned at a same position with respect to the y direction and the back rail ends 133.R1 and 133.S1 can be aligned at a same position with respect to the y direction, where rail mid-points 182.R1 and 182.S1, are thus aligned at a same position with respect to the y direction. Front rail ends 131.S1 and 131.S2 can be aligned at a same position with respect to the y direction and the back rail ends 133.S1 and 133.S2 can be aligned at a same position with respect to the y direction, where rail mid-points 182.S1 and 182.S2, are thus aligned at a same position with respect to the y direction. An illustration of the spatial relationship between all four rails is illustrated in FIG. 2C.

As illustrated in FIG. 2B, the second front element mount 142.2 can further mount the front rail-mounted element 155.A to the bottom-right rail 130.S2, in addition to mounting the front rail-mounted element 155.A to the top-right rail 130.R2 as illustrated in FIG. 2A. While not depicted in FIG. 2B, the first front element mount 142.1 can similarly further mount the front rail-mounted element 155.A to the bottom-left rail 130.S1, in addition to mounting the front rail-mounted element 155.A to the top-left rail 130.R1 as illustrated in FIG. 2A.

As illustrated in FIG. 2B, the second rear element mount 144.2 can similarly further mount the back rail-mounted element 155.B to the bottom-right rail 130.S2, in addition to mounting the back rail-mounted element 155.B to the top-right rail 130.R2 as illustrated in FIG. 2A. While not depicted in FIG. 2B, the first rear element mount 144.1 can similarly further mount the back rail-mounted element 155.B to the bottom-left rail 130.S1, in addition to mounting the back rail-mounted element 155.B to the top-left rail 130.R1 as illustrated in FIG. 2A.

Each front element mount 142 and rear element mount 144 can attach to the respective top and bottom rail via two corresponding rail attachment components. The rail attachment components of the front element mount 142 can connect the front element mount 142 to same points of the top and bottom rail with respect to the y direction, as illustrated in FIG. 2B. The rail attachment components of the rear element mount 144 can similarly connect the rear element mount 144 to same points of the top and bottom rail with respect to the y direction, as illustrated in FIG. 2B.

Each front element mount 142 can include z-direction mount bracing attaching both rail attachment components of the front element mount 142 to each other along the z direction, as illustrated in FIG. 2B. Each rear element mount 144 can similarly include z-direction mount bracing attaching both rail attachment components of the rear element mount 144 to each other along the z direction, as illustrated in FIG. 2B. The z-direction mount bracing and rail attachment components of mounts 142 and 144 are illustrated and discussed in further detail in conjunction with FIGS. 2D and 2E.

In other embodiments, one or more front element mounts 142 and/or rear element mounts 144 can be configured to attach the front rail-mounted element 155.A to a left and right rail via corresponding rail attachment points, and can include x direction bracing attaching both rail attachment points of the front element mount 142 and/or rear element mount 144 to each other along the x direction.

In some embodiments, front element mounts 142.1 and 142.2 can optionally be detachable from the respective pair of parallel rails 130, for example, by hand via sliding the front element mounts 142.1 and 142.2 on and off their respective rails 130 along and/or opposite the y direction, for example, from their respective front rail ends 131. Alternatively or in addition, the rear element mounts 144.1 and 144.2 can optionally be detachable from the respective pair of parallel rails 130, for example, by hand via sliding the back element mounts 144.1 and 144.2 on and off their respective rails 130 along and/or opposite they direction, for example, from their respective back rail ends 133. Such embodiments be ideal in enabling the configuration of rail-mounted elements upon the vehicle-mounted rail system 150 to be easily changed between flights and/or in enabling simple replacement of various rail-mounted elements 155 with other rail-mounted elements between flights. Alternatively, front element mounts 142.1 and 142.2, and/or rear element mounts 144.1 and 144.2 are permanently attached to their respective pair of parallel rails 130 and/or are only removable via screwdrivers and/or specialized tools.

In some embodiments, one or more front rail-mounted elements 155 can be configured to counter-balance one or more rear rail-mounted elements 155 with respect to the y-direction, for example, to enable greater stability of the flight-capable rail-based system 100 while in flight. For example, a set of one or more front rail-mounted elements 155 that are mounted in front of the mid-point of the set of rails and/or that are mounted in front of the aerial vehicle body 122 have a first combined weight, and a set of one or more rear rail-mounted elements 155 that are mounted behind the mid-point of the set of rails and/or that are mounted in front of the aerial vehicle body 122 have a second combined weight. In some embodiments, the first combined weight can be configured to be substantially the same as the second combined weight.

As another example, the mass and/or mounted position upon the set of parallel rails 130 relative to they direction of: each of a set of one or more front rail-mounted elements 155, each of a set of one or more rear rail-mounted elements, and/or the aerial vehicle body 122, can be configured to induce a center of mass of the vehicle-mounted rail system 150 that is at a mid-point of the set of parallel rails relative to they direction and/or at a mid-point of the aerial vehicle body 122 with respect to the y direction.

In such embodiments, a front-rail mounted element 155.A may be mounted at a first distance from a mid-point of the set of parallel rails 130, while a rear-rail mounted element 155.B may be mounted at a second distance from a mid-point of the set of parallel rails 130. A magnitude of the first distance can be smaller than a magnitude of the second distance based on the front rail-mounted element 155.A having a greater mass than the rear rail-mounted element 155.B. A magnitude of the second distance can be smaller than a magnitude of the first distance based on the rear rail-mounted element 155.B having a greater mass than the front rail-mounted element 155.A. A magnitude of the second distance can be substantially equivalent to a magnitude of the first distance based on the rear rail-mounted element 155.B having a substantially equivalent mass than the front rail-mounted element 155.A.

FIG. 2C presents a top right three-dimensional view illustrating an embodiment of the configuration of the rails 130 of vehicle-mounted rail system 150. The top-left rail 130.R1 and top-right rail 130.R2 can be spaced in accordance with an x-direction spacing 162, and the bottom-left rail 130.S1 and bottom-right rail 130.S2 can be spaced in accordance with this same x-direction spacing 162. The x-direction spacing between two rails can be defined as a distance from a center of each corresponding rail in the x direction, where the spacing is measured along an axis orthogonal to the direction of the rails, such as an axis parallel with the x-direction.

The top-left rail 130.R1 and bottom-left rail 130.S1 can be spaced in accordance with a z-direction spacing 161, and the top-right rail 130.R2 and bottom-right rail 130.S2 can be spaced in accordance with this same z-direction spacing 161. The z-direction spacing can be defined as a distance from a center of each corresponding rail in the z direction, where the spacing is measured along an axis orthogonal to the direction of the rails, such as an axis parallel with the z-direction.

In some embodiments, two axes along the center of rails 130.R1 and 130.R2 in the y direction can define a first plane that is orthogonal to the z direction, and two axes along the center of rails 130.S1 and 130.S2 in they direction can define a second plane that is orthogonal to the z direction, where the first plane and the second plane are thus parallel. In some embodiments, two axes along the center of rails 130.R1 and 130.S1 in they direction can define a third plane that is orthogonal to the x direction, and two axes along the center of rails 130.R2 and 130.S2 in the y direction can define a fourth plane that is orthogonal to the z direction, where the third plane and the fourth plane are thus parallel, and are orthogonal with the first plane and the second plane. The first plane, second plane, third plane, and fourth plane can thus intersect along lines corresponding to the axes along the center of rails 130.R1, 130.R2, 130.S1, and 130.S2. A rectangular prism can be defined based on having edges along these lines and a set of surfaces falling upon these four planes, where the rectangular prism has a height dimension corresponding to the z-direction spacing; a width dimension corresponding to the x-direction spacing; and a length dimension corresponding to a length of the rails 130.

In some embodiments, the x-direction spacing and/or the z-direction spacing are in accordance with a rod support protocol, such as a protocol dictated by dimensions of some or all rail-mounted elements 155 in the x direction and/or the z direction, and/or such as a protocol dictated by dimensions of mounts 142 and/or 144 in the x direction and/or the z direction. For example, the x-direction spacing and/or the z-direction spacing are in accordance with a rod standard for professional motion picture camera equipment and/or other types of camera equipment, where rail-mounted elements 155.A and/or 155.B is implemented as a camera or other imaging device, for example, as illustrated FIG. 2F and as discussed in further detail herein.

The rails 130 can be implemented as cylindrical rods and/or other shaped rods, for example, that are straight and/or substantially straight along the y direction. The rails 130 can have a solid or hollow interior. The rails 130 can be made of a carbon fiber material, an aluminum material, a magnesium material, and/or a metal, alloy, or any other material, for example, enabling the rails 130 to hold their shape and/or structurally support rail-mounted elements 155 during flight. The rails can optionally be 450 mm in length and/or 15 mm in diameter, and/or can have different dimensions.

Figure 2D:
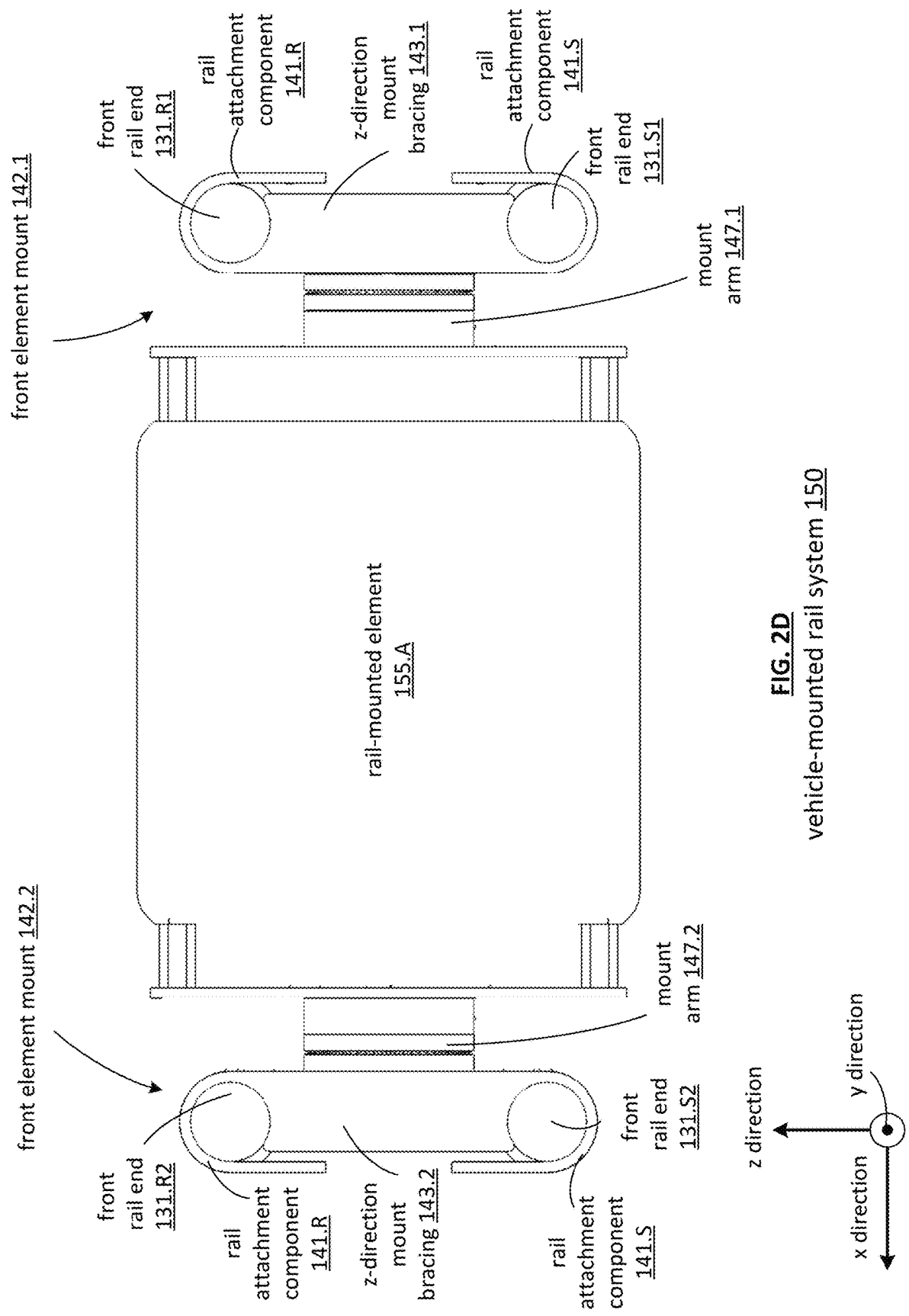
FIG. 2D is a front view illustration of a rail-mounted element of a vehicle-mounted rail system in accordance with various embodiments.

FIG. 2D illustrates a front view of vehicle-mounted rail system 150, illustrating example mounting of rail mounted element 155.A to the set of parallel rails 130. Each of the front element mounts 142.1 and 142.2 can optionally include z-direction mount bracing 143.1 and 143.2, respectively, where the respective front element mount 142 connects the rail-mounted element 155.A to both a respective top and bottom rail 130. Each front element mount 142 can include rail attachment components 141.R and 141.S that each partially and/or fully surround the cylindrical surface of, or otherwise attach to, the corresponding top and bottom rails 130. Each of the front element mounts 142.1 and 142.2 can optionally include one or more mount arms 147.1 and 147.2, respectively. Each mount arm 147 can extend with components along and/or opposite the x direction to connect from a corresponding surface of the rail-mounted element 155.A to the z-direction mount bracing 146 and/or to rail attachment component 141.R and/or 141.S. Example embodiments of the front element mounts 142 are illustrated and discussed in further detail in conjunction with FIGS. 6E-6H. The rail mounted element 155.A can alternatively be mounted via a different type of mounting, such as the mounting of FIG. 2D, any mounting of FIGS. 6A-6H, and/or another means of mounting rail mounted element 155.A to the set of rails 130.

Figure 2E:
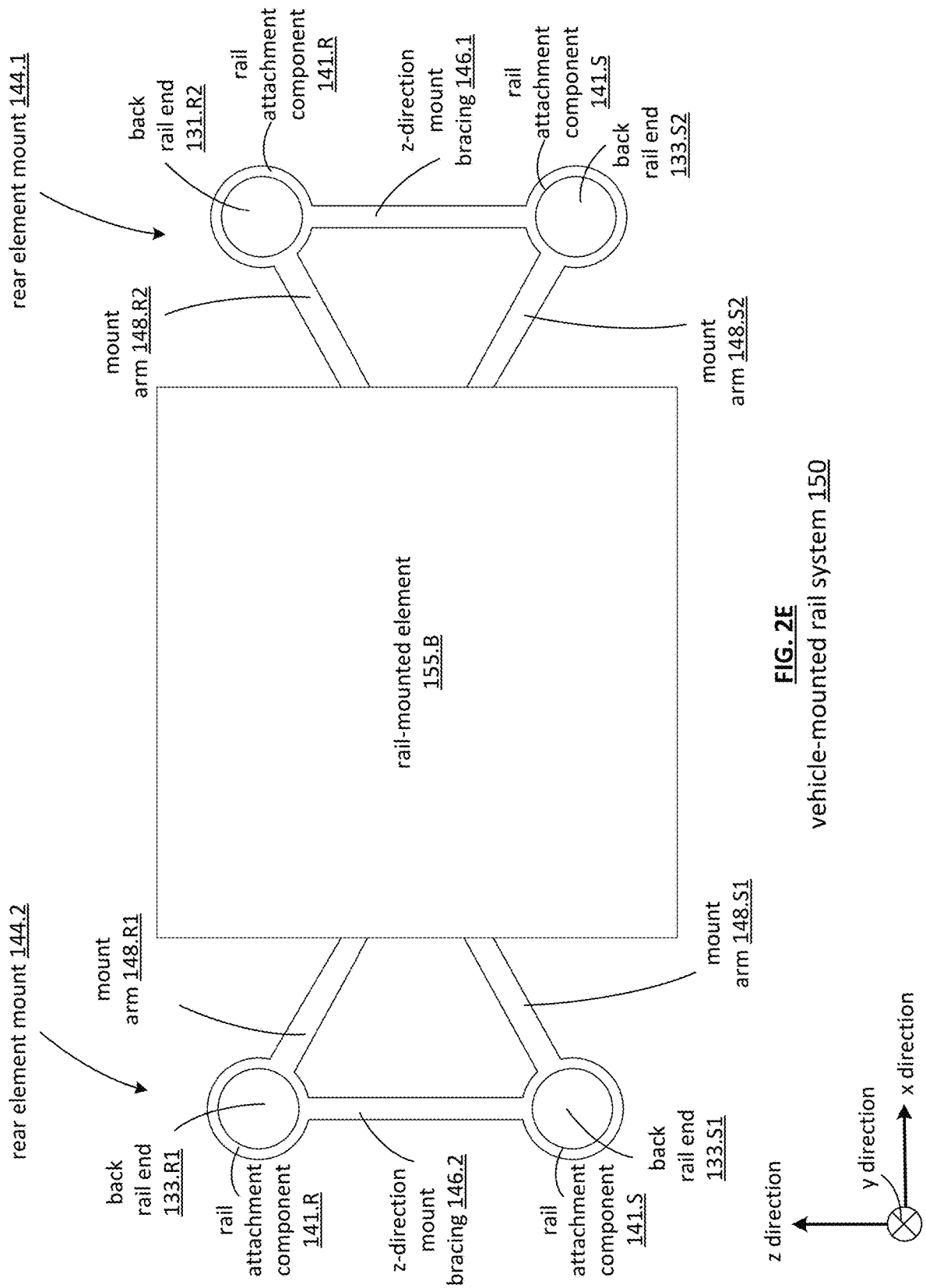
FIG. 2E is a back view illustration of a rail-mounted element of a vehicle-mounted rail system in accordance with various embodiments.

FIG. 2E illustrates a rear view of vehicle-mounted rail system 150, illustrating example mounting of rail mounted element 155.B to the set of parallel rails 130. Each of the rear element mounts 144.1 and 144.2 can optionally include z-direction mount bracing 146.1 and 146.2, respectively, where the respective rear element mount 144 connects the rail-mounted element 155.B to both a respective top and bottom rail 130. Each of the rear element mounts 144.1 and 144.2 can optionally include one or more mount arms 148.1 and 148.2, respectively Each rear element mount 144 can include rail attachment components 141.R and 141.S that each partially and/or fully surround the cylindrical surface of, or otherwise attach to, the corresponding top and bottom rails 130. Each mount arm 148 can extend with components along and/or opposite the x direction to connect from a corresponding surface of the rail-mounted element 155.B to the z-direction mount bracing 146 and/or to rail attachment component 141.R and/or 141.S. Each mount arm 148 can further extend with components along and/or opposite the z direction. Example embodiments of the rear element mounts 144 are illustrated and discussed in further detail in conjunction with FIGS. 6C and 6D. The rail mounted element 155.B can alternatively be mounted via a different type of mounting, such as the mounting of FIG. 2C, any mounting of FIGS. 6A-6H, and/or another means of mounting rail mounted element 155.B to the set of rails 130.

Figure 2F:
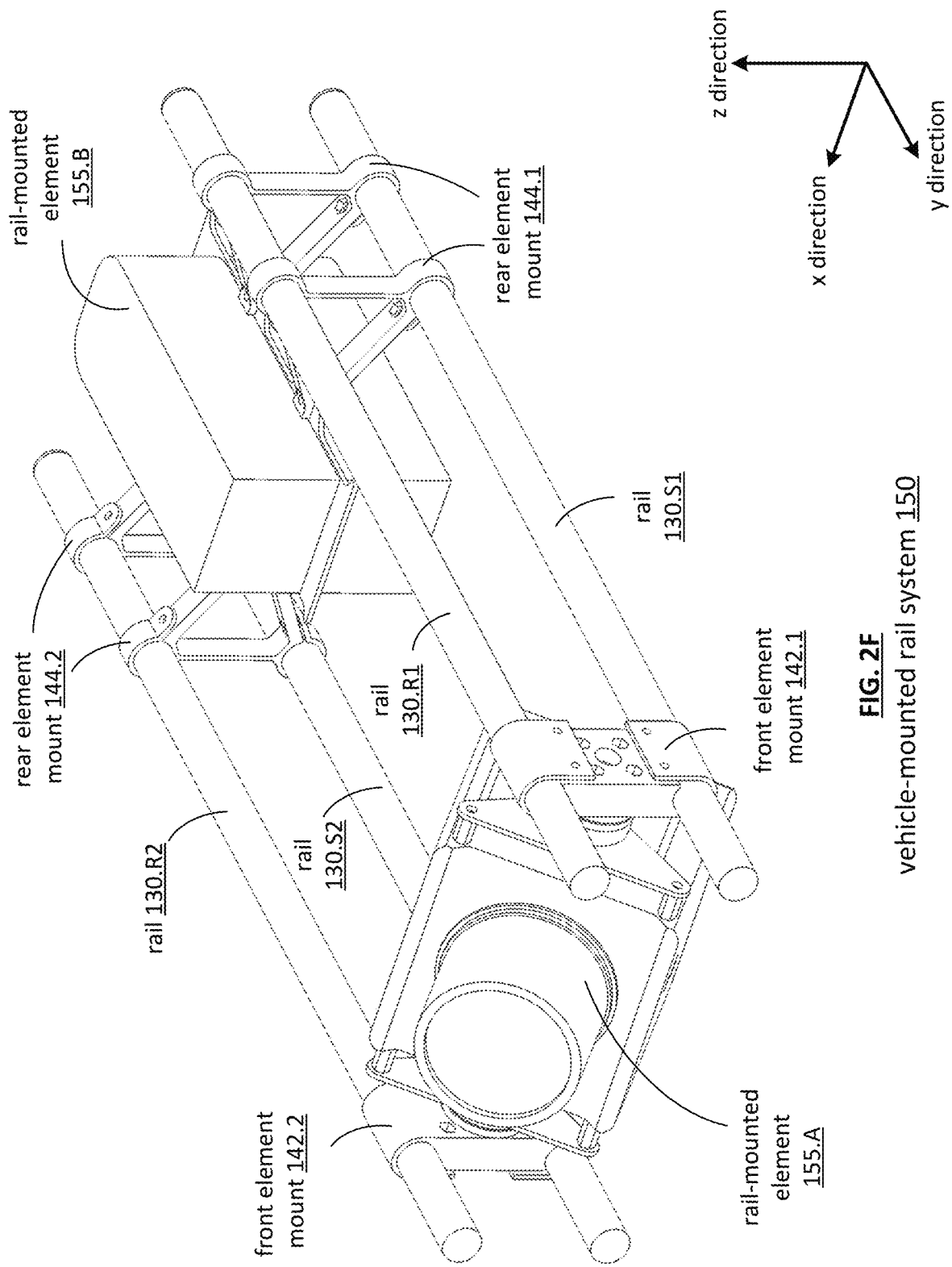
FIG. 2F is a three-dimensional illustration of a vehicle-mounted rail system in accordance with various embodiments.

FIG. 2F illustrates a three-dimensional illustration of vehicle-mounted rail system 150. As illustrated in FIG. 2F, the front rail-mounted element 155.A can be optionally implemented as an imaging device such as a camera. Such embodiments where a rail-mounted element 155 is implemented as an imaging device discussed in further detail in conjunction with FIGS. 3A-3F.

FIGS. 3A-3F illustrate embodiments of a flight-capable imaging system 101. The flight-capable imaging system 101 can correspond to a type of flight-capable rail-based system 100. In particular, the flight-capable rail-based system 100 can be implemented as a flight-capable imaging system 101 based on including a rail-mounted element 155 is implemented as an imaging device 310 that is configured to capture imaging data while in flight, such as photograph data, video data, or other imaging data. Some or all features and/or functionality of the flight-capable imaging system 101 illustrated and/or described in conjunction with FIGS. 3A-3F can be utilized to implement the flight-capable rail-based system 100 of FIGS. 1A-1C and/or any other embodiment of the flight-capable imaging system 101 and/or the flight-capable rail-based system 100 described herein.

Figure 3A:
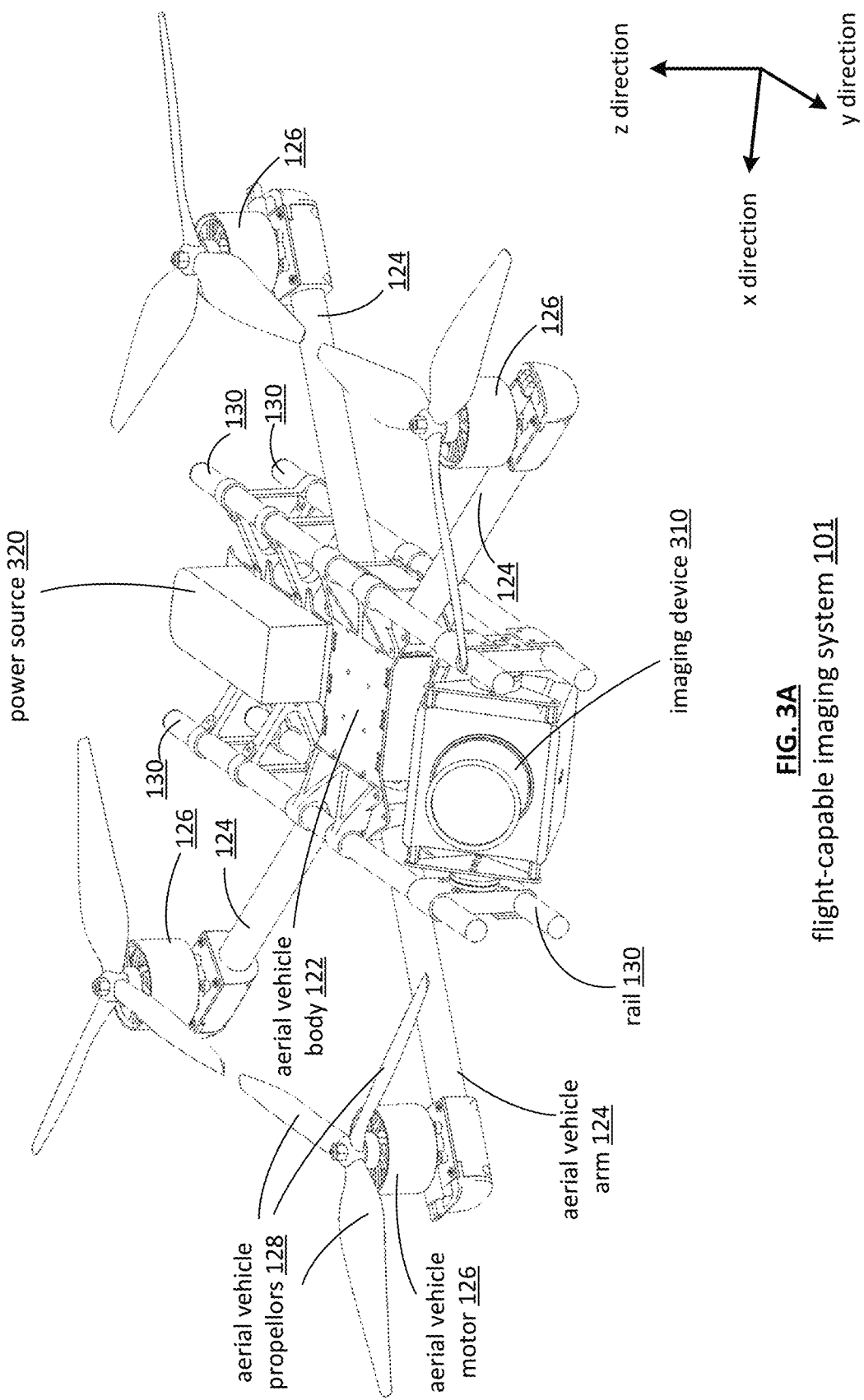
FIG. 3A is a three-dimensional illustration of a flight-capable imaging system in accordance with various embodiments.
Figure 3B:
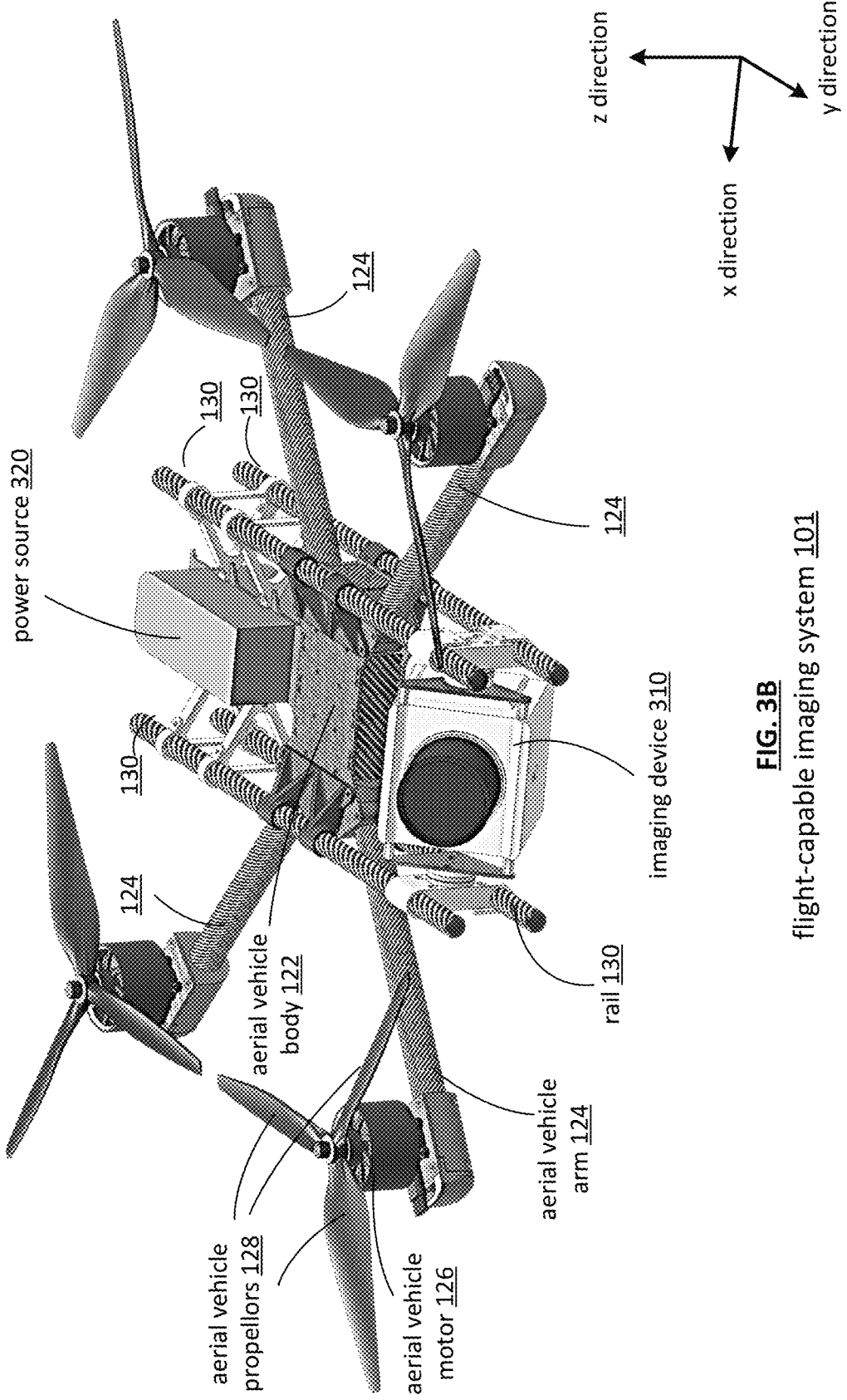
FIG. 3B is a shaded three-dimensional illustration of a flight-capable imaging system in accordance with various embodiments.

FIG. 3A is a three-dimensional view of a flight-capable imaging system 101 FIG. 3B is a shaded three-dimensional illustration of the flight-capable imaging system 101 of FIG. 3A.

As illustrated in FIGS. 3A and 3B, the front rail-mounted element 155.A of a flight-capable rail-based system 100 implemented as a flight-capable imaging system 101 can be implemented as an imaging device 310 and/or the rear rail-mounted element 155.B of a flight-capable rail-based system 100 implemented as a flight-capable imaging system 101 can be implemented as a power source 320. In other embodiments, the front rail-mounted element 155.A of a flight-capable rail-based system 100 implemented as a flight-capable imaging system 101 can be implemented as power source 320 and/or the rear rail-mounted element 155.B of a flight-capable rail-based system 100 implemented as a flight-capable imaging system 101 can be implemented as imaging device 310.

The power source 320 can be configured to provide power to the aerial vehicle 110, for example, to power its processing resources such as its flight control system, ESC circuitry, motors 126, and/or other components of aerial vehicle 110 that require power to operate and/or that operate electronically. The power source 320 can alternatively or additionally be configured to provide power to imaging device 310 and/or a controller of imaging device 310, and/or to otherwise enable imaging device to capture photograph and/or video data. The power source 320 can alternatively or additionally be configured to power one or more receivers of the flight-capable imaging system 101, one or more onboard sensors of the flight-capable imaging system 101, and/or other components of flight-capable imaging system 101 that require power to operate and/or that operate electronically.

Powering of electronic components via power source 320 is discussed in further detail in conjunction with FIGS. 4A-4D.

The power source 320 can be implemented as one or more rechargeable batteries, such as one or more lithium-ion polymer batteries and/or other types of batteries. The power source 320 can alternatively or additionally be implemented via: solar power based on power source 320 including at least one solar panel; a hydrogen fuel cell; a combustion engine; or other type of power source 320 configured to deliver power to various components of the flight-capable imaging system 101.

The imaging device 310 can be configured to capture imaging data while the flight-capable imaging system 101 is in flight. The imaging data can include one or more still photographs and/or video data that includes a plurality of consecutive frames. The imaging data can be in accordance with the visible spectrum, where the still photographs and/or video data are color and/or greyscale photographs capturing features visible to the human eye. As a particular example, imaging device 310 is implemented via at least one camera, such as at least one film cameras, such as a professional digital movie camera and/or cinema camera. The imaging device 310 can be implemented via at least one digital single-lens reflex (DSLR) camera, hybrid digital single-lens reflex (HDSLR) camera, and/or at least one other type of camera. Alternatively or in addition, the imaging device 310 is implemented to capture imaging data that includes imaging in one or more non-visible light spectrums such as thermal imaging data, multispectral imaging data.

Figure 3C:
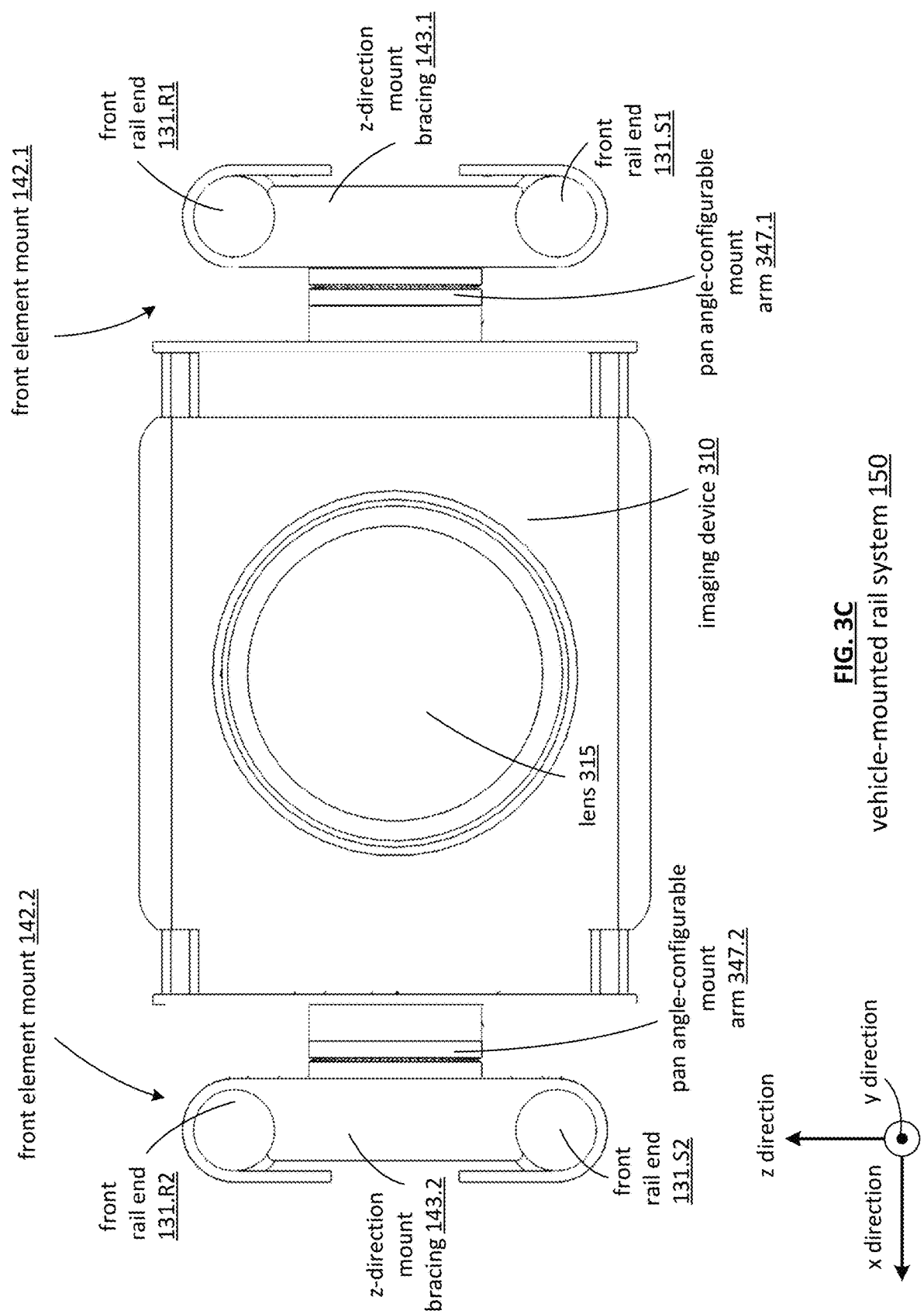
FIG. 3C is a front view illustration of an imaging device of a vehicle-mounted rail system in accordance with various embodiments.

FIG. 3C presents a front view of a vehicle-mounted rail system 150 of flight-capable imaging system 101 that includes an imaging device 310 mounted via pan angle-configurable mount arms 347. In particular, the front element mounts 142.1 and 142.2 can optionally include mount arms 147 implemented as pan angle-configurable mount arms 347 that enable rotation of the imaging device 310 about an axis parallel to the x direction, which can be utilized to configure a corresponding pan angle of the imaging device for capture of image data while in flight. The "pan angle" described herein can correspond to an angle at which the lens of the imaging device is panned, tilted, and/or otherwise rotated about a corresponding axis parallel to the x direction to enable capturing of imaging data from the respective angle accordingly.

In some embodiments, the pan angle-configurable mount arms 347 can be configured by hand and/or one or more tools, for example, prior to flight, where the imaging device 310 assumes a fixed angle while in flight in accordance with a pre-flight configuration of the pan angle-configurable mount arms 347. Alternatively or in addition, the pan angle-configurable mount arms 347 can be configured for control during flight via an actuator to changes the corresponding pan angle during flight. Such embodiments where the flight-capable imaging system implements at least one actuator to change the orientation of imaging device 310 during flight is discussed in further detail in conjunction with FIGS. 4C and 4D.

Figure 3D:
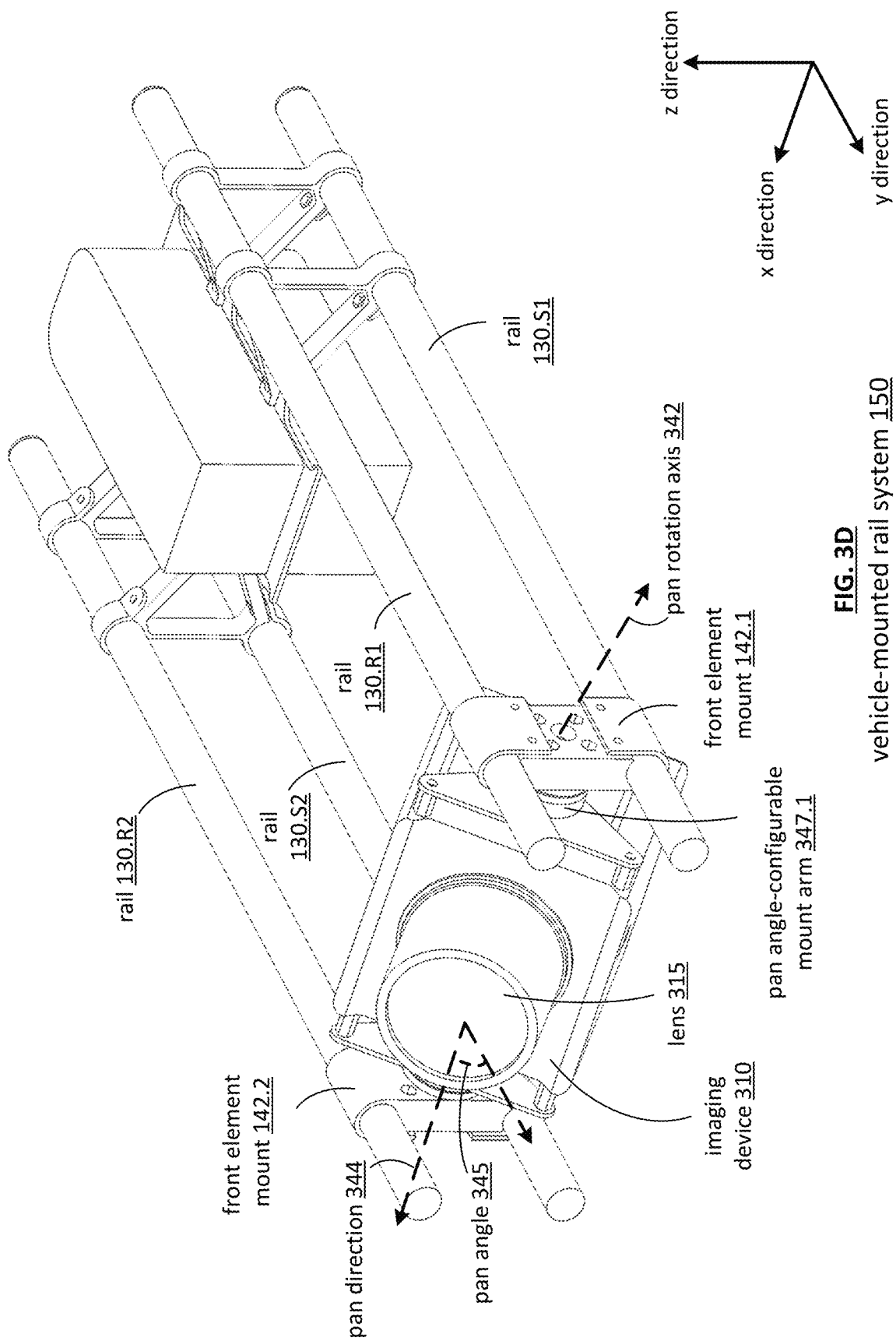
FIG. 3D is a three-dimensional illustration of an example pan angle configuration of an imaging device of a vehicle-mounted rail system in accordance with various embodiments.

FIG. 3D presents a three dimensional front angled view of a vehicle-mounted rail system 150 of flight-capable imaging system 101 that includes an imaging device 310 mounted via the pan angle-configurable mount arms 347 of FIG. 3C. The configuration of the pan angle-configurable mount arms 347 causes the imaging device 310 to assume a pan direction 344 based on having a corresponding pan angle 345 relative to the y direction, due to rotation of the pan angle-configurable mount arms 347 about the pan rotation axis 342.

In this example, the pan direction is configured via pan angle-configurable mount arms 347 to have an upwards direction based on the pan direction 344 having a non-zero positive component in the z direction and a non-zero positive component in the y direction, causing the lens 315 to capture image data in an upward-forward view relative to the flight-capable imaging system 101. The upward-forward view can be further configured via corresponding changes in magnitude to a non-zero positive component in the z direction and/or the non-zero positive component in the y direction induced by changed in pan angle 345.

In other embodiments, the pan direction can be configured via pan angle-configurable mount arms 347 to have a non-zero negative component in the z direction and a non-zero positive component in the y direction, causing the lens 315 to capture image data in a downward-forward view relative to the flight-capable imaging system 101. Alternatively or in addition, the pan direction can be configured via pan angle-configurable mount arms 347 to have a non-zero negative component in the z direction and a non-zero negative component in the y direction, causing the lens 315 to capture image data in a downward-backward view relative to the flight-capable imaging system 101. Alternatively or in addition, the pan direction can be configured via pan angle-configurable mount arms 347 to have a non-zero positive component in the z direction and a non-zero negative component in the y direction, causing the lens 315 to capture image data in an upward-backward view relative to the flight-capable imaging system 101. Alternatively or in addition, the pan direction can be configured via pan angle-configurable mount arms 347 to have a zero component in the z direction, causing the lens 315 to capture image data in a directly forward view, or directly backwards view, relative to the flight-capable imaging system 101. Alternatively or in addition, the pan direction can be configured via pan angle-configurable mount arms 347 to have a zero component in the y direction, causing the lens 315 to capture image data in a directly upward view or directly downward view relative to the flight-capable imaging system 101. For example, the pan angle 345 can have a 360 degree range and/or a near-360 degree range. The pan angle 345 can be configured as one of a discrete and/or continuous set of options within the corresponding range.

While not illustrated, the flight-capable imaging system 101 can alternatively or additionally be operable to mount imaging device 310 in accordance with a configured pan angle with respect to a different axis, such as an axis parallel to the y direction, where the lens 315 is configured to pan left and right alternatively or in addition to up and down. This can include fixing a fixed orientation of the camera in accordance with a configurable pan angle about a different axis prior to flight alternatively or in addition to fixing pan angle 345 prior to flight. This can include control of the different pan angle about the different axis via one or more actuators to enable change of the other pan angle during flight.

In some embodiments, the change in pan direction of the imaging device 310 can be facilitated based on pitching of the vehicle-mounted rail system 150 as a whole relative to the aerial vehicle body, for example, as discussed in further detail in conjunction with FIGS. 9A-9E. In such embodiments the imaging device 310 is optionally fixed relative to the vehicle-mounted rail system 150, where change in pan angle is facilitated entirely by the pitching of the vehicle-mounted rail system 150 as a whole. Alternatively, the imaging device 310 can also further change its pan angle via one or more axes relative to the set of parallel rails of the vehicle-mounted rail system 150, enabling independent rotation of the imaging device 310 that is distinct from rotation of the vehicle-mounted rail system 150 as a whole.

Figure 3E:
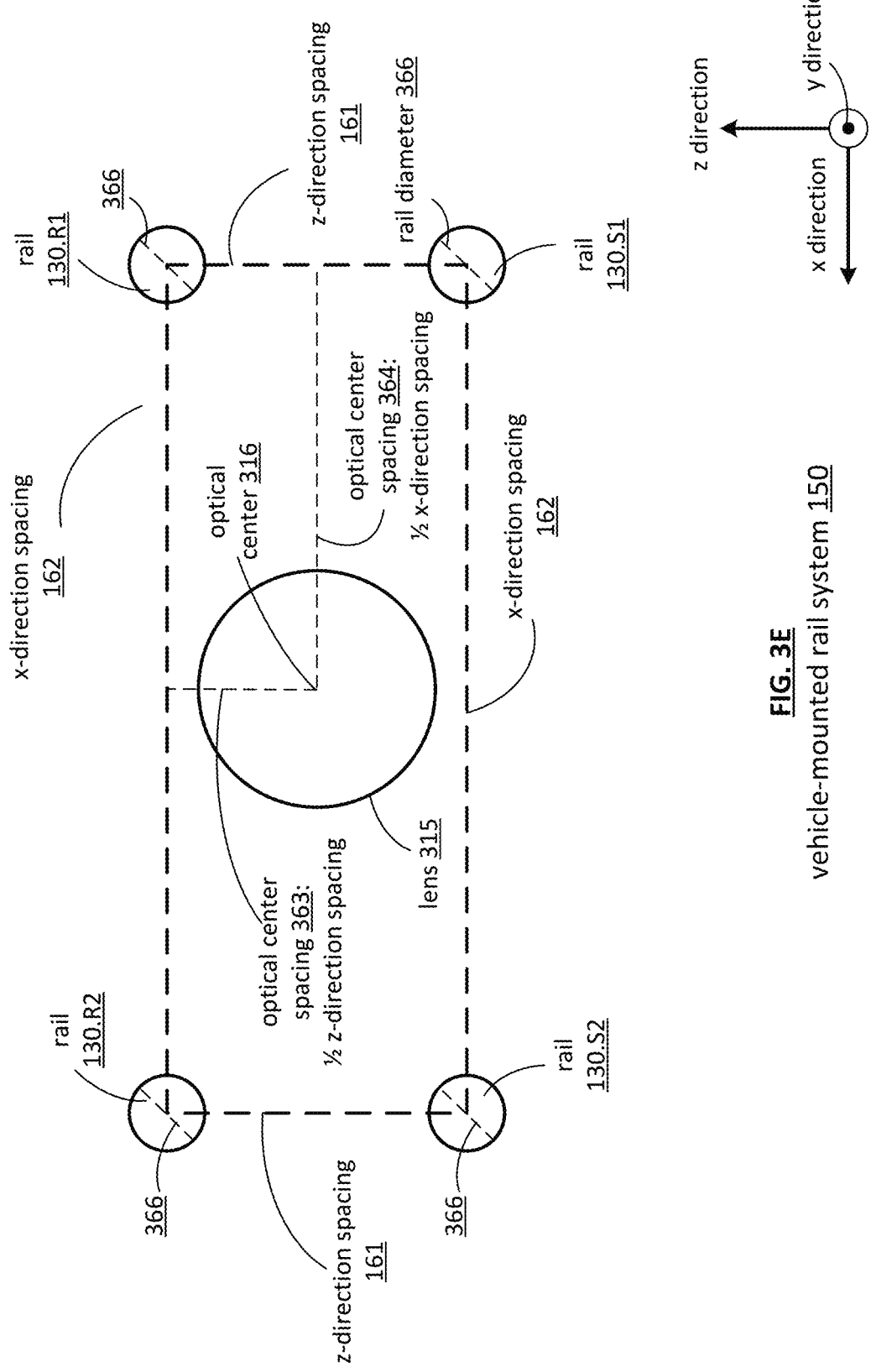
FIG. 3E is a front view illustration of rail spacing between rails of a vehicle-mounted rail system in accordance with various embodiments.

FIG. 3E presents a front view of a vehicle-mounted rail system 150 to illustrate rail spacing of rails 130 relative to an optical center 316 captured by a lens 315 of imaging device 310. For example, the optical center 316 corresponds to the center of lens 315, and can have an optical center spacing 363 in the z direction from an axis defined by the top rails, and can have an optical center spacing 364 in the x direction from an axis defined by the left rails.

In this illustration, optical center 316 is configured based on pan angle 345 being configured to zero degrees, where pan direction 344 has no z component and corresponds to a directly forward-facing direction. In such configurations, optical center 316 can be directly centered with respect to the four rails a plane orthogonal to the y direction, where the optical center spacing 363 is half the z-direction spacing 161 and/or where the optical center spacing 364 is half the x-direction spacing 162. Optical center 316 can alternatively be spaced with different optical center spacing 363 that is higher or lower relative to the z direction based on pan direction 344 having a non-zero z component, and/or can otherwise be centered only with respect to the x-direction, and not necessarily the z-direction.

In some embodiments, the centering of the optical center is based on utilizing a professional motion picture camera, or other camera, configured to be mounted via standardized rod standards. For example, the x-direction spacing and/or the z-direction spacing are in accordance with the 15 mm Light Weight Support (15 mm LWS) rod standard, the 15 mm Studio Support rod standard, or the 19 mm studio support rod standard. In particular, in embodiments where the rails 130 are spaced in accordance with the 15 mm LWS rod standard: the z-direction spacing 161 is 60 mm, where the left pair of rails 130.R1 and 130.S1 can be spaced 60 mm apart when measured center to center and the right pair of rails 130.R2 and 130.S2 can also be spaced 60 mm apart when measured center to center; the x-direction spacing 162 can be 170 mm such that the optical center spacing 364 is 85 mm, where the top pair of rails 130.R1 and 130.R2 can be spaced 170 mm apart when measured center to center and the bottom pair of rails 130.S1 and 130.S2 can also be spaced 170 mm apart when measured center to center.

Furthermore, the rail diameter 366 of the rails 130 can be configured based on the standardized rod standards of the camera implementing imaging device 310. For example, the diameter of rails 130 is in accordance with the 15 mm LWS rod standard, the 15 mm Studio Support rod standard, or the 19 mm studio support rod standard, where the rail diameter 366 is thus 15 mm or 19 mm, respectively. In particular, in embodiments where the rails 130 are spaced in accordance with the 15 mm LWS rod standard, the rail diameter 366 can be 15 mm.

The 15 mm LWS rod standard can be a preferred rod standard for rail 130 to enable configuration of mounting of corresponding lighter weight camera equipment than other motion picture camera equipment rod standards. The lighter weight camera can enable lower power usage and/or greater maneuverability of flight-capable imaging system 101 while in flight, for example, to enable capture of high-velocity subjects via cinema-quality filming via imaging device 310 implemented as a light weight motion picture camera and/or DSLR camera configured for mounting via the 15 mm LWS rod standard. As a particular example, the imaging device 310 can be implemented as the RED KOMODO camera, or another camera configured to adhere to the 15 mm LWS rod standard.

Utilizing the 15 mm LWS rod standard, or another standardized rod standard for camera equipment, can further be ideal to enable easy mounting of camera accessories for use in conjunction with imaging device 310. In particular, rather than mounting various accessories via specialized custom mounts, the camera accessories can optionally be mounted by utilizing their own mounts and/or commercially available mounts that adhere to the corresponding rod standard. In such embodiments, additional rail-mounted elements 155 corresponding to camera accessories can be attached to the set of rails 130 in front of or in conjunction with imaging device 310.

These additional rail-mounted elements 155 can include at least one matte box and/or at least one corresponding filter, at least one follow focus, at least one lens support, at least one microphone, a wireless video module, at least one processing module operable to perform signal and/or metadata I/O, lens control integration, image processing, color processing, timecode/genlock, audio processing, and/or other custom or commercially available camera accessories for imaging device 310 mounted to rails 130, for example, based on the rails being spaced and having diameters in accordance with a given standardized rod standard and based on these camera accessories being configured for mounting upon rails spaced and having diameters in accordance with this given standardized rod standard.

FIG. 3F presents a top-view of flight-capable imaging system 101, illustrating that the position of imaging device 310 upon the flight-capable imaging system 101 can be configured such that the field of captured view 362 of imaging device 310 not intersect view obstruction zones 374 imposed by propellers during flight, where the field of captured view 362 is thus unobstructed by propellers during flight. In particular, the field of captured view 362 of imaging device 310 and/or view obstruction zones 374 can be configured such that they do not intersect based on corresponding configuration of: the placement of the camera upon the rail system along the y-axis towards the front end and away from the aerial vehicle body, the length of the propellers 128, the length of the aerial vehicle arms 124, a type of imaging device 310 and/or type of lens of imaging device 310, and/or other properties of flight-capable imaging system 101. In other embodiments where imaging device 310 is instead mounted at the back of the vehicle-mounted rail system 150 behind the aerial vehicle body, for example, in embodiments where a backward facing field of captured view 362 is preferred, the field of captured view 362 can be similarly configured to be unobstructed, where the back propellers have view obstruction zones 374 that similarly do not overlap this field of captured view 362.

Implementing the flight-capable imaging system 101 for capturing of imaging data via mounting of an imaging device at the front or back of a vehicle-mounted rail system 150 mounted to an aerial vehicle 110 can induce more favorable and/or less obstructed field of view than imaging systems implemented via simple mounting of a camera to the top of or the bottom of an aerial vehicle body. In particular, a downward-forward view of imaging device 310 can be favorable for capturing image data of ground features while in flight, and the flight-capable imaging system 101 renders an unobstructed downward-forward view, where aerial vehicles having a camera mounted atop their aerial vehicle body often renders propeller-obstructed image data that must be post-processed to remove the captured propellers.

FIGS. 4A-4D present schematic block diagrams of flight-capable imaging system 101 illustrating onboard components that are operable based on being powered, for example, via power source 320 mounted upon the rails of vehicle-mounted rail system 150 as illustrated in FIG. 3A and/or via one or more other power sources. Some or all features and/or functionality of embodiments of the flight-capable imaging system 101 illustrated and/or described in conjunction with FIGS. 4A-4D can be utilized to implement the flight-capable imaging system 101 of FIGS. 3A-3F and/or any other embodiment of the flight-capable imaging system 101 and/or the flight-capable rail-based system 100 described herein.

Figure 4A:
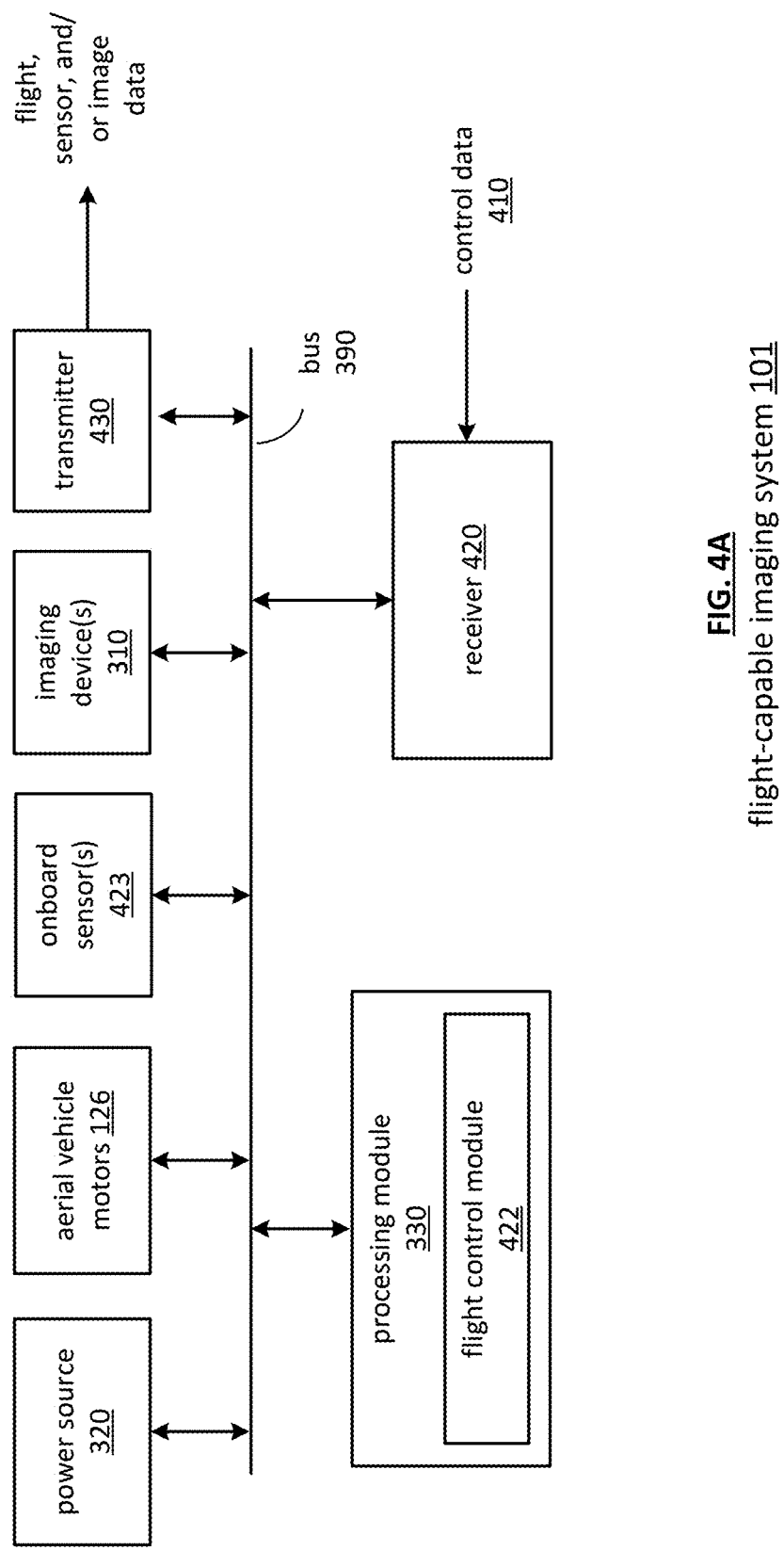
FIG. 4A is a schematic block diagram of a flight-capable imaging system in accordance with various embodiments.

As illustrated in FIG. 4A, at least one bus 390 can be implemented via one or more wired and/or wireless mediums, where power and/or data signals are passed to and/or from various components illustrated in FIG. 4A via the one or more wired and/or wireless mediums of bus 390. In particular, power produced by power source 320 can be delivered to various components via bus 390 to power the various components, enabling the various components to perform their respective functionality due to receiving power. Data generated by various components can be sent to and/or processed by other components via bus 390, where corresponding data signals can be generated via electric current delivered via power source 320.

For example, the flight-capable imaging system 101 include physical hardware, physical wires, physical circuitry, and/or other physical components implementing some or all of bus 390 that are electrically conductive and/or otherwise operable to receive and/or send the various power and/or data signals between some or all components. Alternatively or in addition, some or all power and/or data signals can be transferred wirelessly, for example, via at least one short-range wireless communication protocol and/or at least one short-range wireless power delivery protocol utilized to implement some or all of bus 390.

The flight-capable imaging system 101 can include a processing module 330. The processing module 330 can be implemented via at least one processing device and/or at least one memory device. For example, hardware of processing module 330 is included in a rail-mounted element 155 mounted to at least one rail 130 and/or all rails 130, and/or is included in and/or mounted upon the aerial vehicle body 122. The processing module 330 can be configured to perform some or all of its functionality based on being powered by the power source 320.

The aerial vehicle motors 126 can be implemented as DC and/or AC motors upon each aerial vehicle arm 124, as illustrated in FIGS. 1A-1D and as discussed previously, for example, that rotate their corresponding propellers 128 based on drawing power from power source 320. The aerial vehicle motors 126 can each be coupled to corresponding ESC circuitry operable to control the speed of their corresponding aerial vehicle motors 126, for example, based on control data generated by and received from the processing module 330. The ESC circuitry can be operable to control the speed of their corresponding aerial vehicle motors based on being powered via power source 320.

In particular, the processing module 330 can implement a flight control module 422 operable to generate and send control data that controls the aerial vehicle motors 126 to control the direction and/or speed of flight accordingly. This can include sending control data to the ESC circuitry coupled to each aerial vehicle motor 126 to control the speed of propeller rotation of each aerial vehicle motor 126.

Some or all of processing module 330 utilized to implement flight control module 422 can be implemented via processing resources of aerial vehicle 110, where some or all hardware of processing module 330 utilized to implement the flight control module 422 is integrated within the aerial vehicle body 122 and/or one or more aerial vehicle arms 124. Alternatively or in addition, some or all hardware of processing module 330 utilized to implement the flight control module 422 is mounted to at least one rail 130 and/or all rails 130 as one or more rail-mounted elements 155 and/or is attached to and/or integrated within other portions of the flight-capable imaging system 101.

The flight-capable imaging system 101 can further include at least one onboard sensor 423. For example, data collected via these onboard sensors 423 can be sent to the flight control module 422 for processing, where the flight control module 422 processes captured data measured by these sensors to generate some or all flight control data utilized to control the aerial vehicle motors 126. These onboard sensors can be operable to collect sensor measurements based on being powered by power source 320 and/or other power sources of the flight-capable imaging system 101. Hardware of these onboard sensors can optionally be controlled via control data generated by processing module 330. Some or all onboard sensors 423 can be: mounted to at least one rail 130 and/or all rails 130 as one or more additional rail-mounted elements 155; can be mounted to the aerial vehicle body 122; and/or can be mounted to one or more vehicle arms 124.

The at least one onboard sensor 423 can include: accelerometers, gyroscopes, Internal Measurement Units (IMUs) or other motion sensors operable to measure motion data utilized by flight control module 422 to determine, and/or correct for deviations in, acceleration, velocity, position, and/or orientation of the flight-capable imaging system 101; Global Positioning System (GPS) receivers and/or other positioning sensors operable to measure positioning data utilized by flight control module 422 to determine and/or correct for deviations in, flight path of the flight-capable imaging system 101; battery sensors and/or health sensors measuring power consumption and/or health levels utilized by flight control module 422 to determine power and/or health levels, and/or facilitate automatic landing of the vehicle when the power and/or health levels are low and/or otherwise unfavorable; Radar, Lidar, camera, and/or other obstacle detection sensors that generate imaging data or other data detecting obstructions in the vicinity of the flight-capable imaging system 101, utilized by flight control module 422 to facilitate obstacle avoidance in flight control of the flight-capable imaging system 101; and/or other onboard sensors.

In some embodiments, the flight control module 422 operates based on a predetermined flight path and/or autonomous flight. Alternatively or in addition, the flight control module 422 operates based on control data 410 received during flight, for example, where the control data 410 is generated via a remote control device that generates control data 410 based on user input to the remote control device.

In such embodiments, the flight-capable imaging system 101 can include at least one receiver 420 that is operable to receive control data 410 as wireless communication signals, for example, in accordance with a predetermined radio frequency band. The control data 410 can include flight speed, direction, orientation, and/or other flight path and/or maneuver control data, and can be sent to the processing module for processing via the flight control module 422, where the flight control module 422 generates its control data to control the aerial vehicle propellers based on the control data 410.

The receiver 420 can be operable to receive control data 410 based on being powered by power source 320 and/or other power sources of the flight-capable imaging system 101. The receiver 420 can optionally be controlled via control data generated by processing module 330. Hardware of receiver 420 can be: mounted to at least one rail 130 and/or all rails 130 as one or more additional rail-mounted elements 155; can be mounted to the aerial vehicle body 122; and/or can be mounted to one or more vehicle arms 124.

The flight-capable imaging system 101 can include at least one imaging device 310, such as the imaging device 310 of FIGS. 3A-3F mounted upon vehicle-mounted rail system 150 as a rail-mounted element 155. The imaging device 310 can be operable to capture and/or process image data based on being powered by power source 320 and/or other power sources of the flight-capable imaging system 101. The functionality of imaging device 310 can optionally be controlled via control data generated by processing module 330. Some or all of processing module 330 can include processing resources of the imaging device 310 mounted upon vehicle-mounted rail system 150, where the processing resources of imaging device 310 generate control data causing the imaging device 310 to capture and/or process image data accordingly.

The captured image data generated by imaging device 310 can optionally be utilized as additional sensor data sent to and utilized by flight control module 422 to control flight, for example, based on detected obstructions to facilitate obstacle avoidance. In such cases, the imaging device 310 can be implemented as an onboard sensor 423.

The captured image data generated by imaging device 310 can optionally be stored in memory, such as a memory card of imaging device 310, at least one memory device of processing module 330, and/or other memory resources of flight-capable imaging system 101. In some embodiments, hardware of one or more memory devices operable to receive and store image data collected by imaging device 310 during flight can be of receiver 420 can be: mounted to at least one rail 130 and/or all rails 130 as one or more additional rail-mounted elements 155; can be mounted to and/or included in imaging device 310; can be mounted to the aerial vehicle body 122; and/or can be mounted to one or more vehicle arms 124. These memory resources can be operable to store imaging data based on being powered by power source 320 and/or other power sources of the flight-capable imaging system 101. These memory resources can optionally be controlled via control data generated by processing module 330.

The captured image data can be stored in such memory resources, for example, during flight, where some or all image data captured during flight is stored in the memory resources, and is accessible for viewing and/or other use once the flight-capable imaging system 101 completes its flight and lands. Alternatively or in addition to storing the captured image data via such memory resources, some or all image data captured during flight can be transmitted to at least one device on the ground.

In such embodiments, the flight-capable imaging system 101 can include at least one transmitter 430 that is operable to transmit image data as wireless communication signals, for example, in accordance with a predetermined radio frequency band and/or via a wireless communication network, such as a LAN network, WAN network, satellite communication network, and/or the Internet. The image data can be transmitted for receipt by the remote control device that generates and transmits control data 410, and/or to one or more other devices, such as a personal computing device, storage device, and/or storage system. For example, the image data is transmitted as discrete photographs and/or as a real-time video stream for viewing via a display device and/or for download in memory resources for later viewing and/or processing.

The transmitter 430 can alternatively or additionally transmit other data to the ground, such as various sensor data collected by one or more onboard sensors 423, and/or flight data such as information regarding flight path, flight status, flight control data, and/or other information corresponding to the flight of the flight-capable imaging system 101.

The transmitter 430 can be operable to transmit image data, sensor data, and/or flight data based on being powered by power source 320 and/or other power sources of the flight-capable imaging system 101. The transmitter 430 can optionally be controlled via control data generated by processing module 330. Hardware of transmitter 430 can be: mounted to at least one rail 130 and/or all rails 130 as one or more additional rail-mounted elements 155; can be mounted to the aerial vehicle body 122; and/or can be mounted to one or more vehicle arms 124. The transmitter 430 can optionally be coupled to receiver 420, where receiver 420 is implemented as a transceiver that also implements transmitter 430.

Figure 4B:
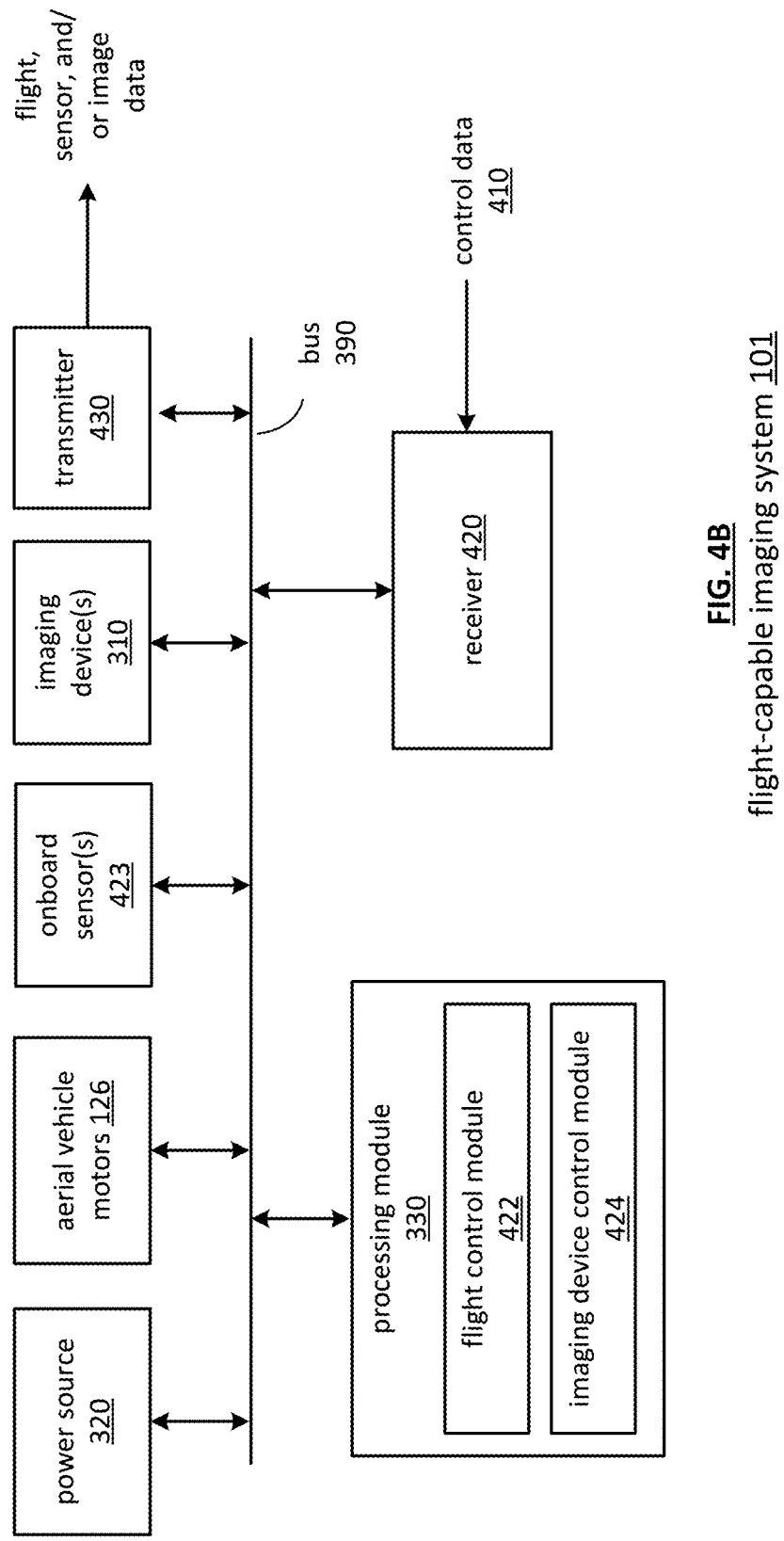
FIG. 4B is a schematic block diagram of a flight-capable imaging system that implements an imaging device control module in accordance with various embodiments.

FIG. 4B illustrates an embodiment of flight-capable imaging system 101 with a processing module 330 that further implements an imaging device control module 424. For example, the same or different control data 410 received via receiver 420 and/or predetermined imaging control data can be utilized to control the functionality of imaging device 310. The imaging device control module 424 can utilize this information, and/or measurements collected via one or more onboard sensors 423, to generate and/or send control data to the imaging device 310 to cause the imaging device 310 to performing corresponding functionality. This can include controlling: when photographs and/or videos are captured, configuring physical and/or digital zoom of the image device 310, and/or other physical and/or digital configuration of the imaging device 310.

Some or all of processing module 330 utilized to implement imaging device control module 424 can be implemented via processing resources of imaging device 310, where some or all hardware of processing module 330 utilized to implement the imaging device control module 424 is integrated within the imaging device 310. Some or all of processing module 330 utilized to implement imaging device control module 424 can be implemented via processing resources of aerial vehicle 110, where some or all hardware of processing module 330 utilized to implement the imaging device control module 424 is integrated within the aerial vehicle body 122 and/or one or more aerial vehicle arms 124. Alternatively or in addition, some or all hardware of processing module 330 utilized to implement the imaging device control module 424 is mounted to at least one rail 130 and/or all rails 130 as one or more rail-mounted elements 155 and/or is attached to and/or integrated within other portions of the flight-capable imaging system 101. The hardware of processing module 330 utilized to implement the imaging device control module 424 can be shared with and/or distinct from the processing module 330 utilized to implement the flight control module 422.

Figure 4C:
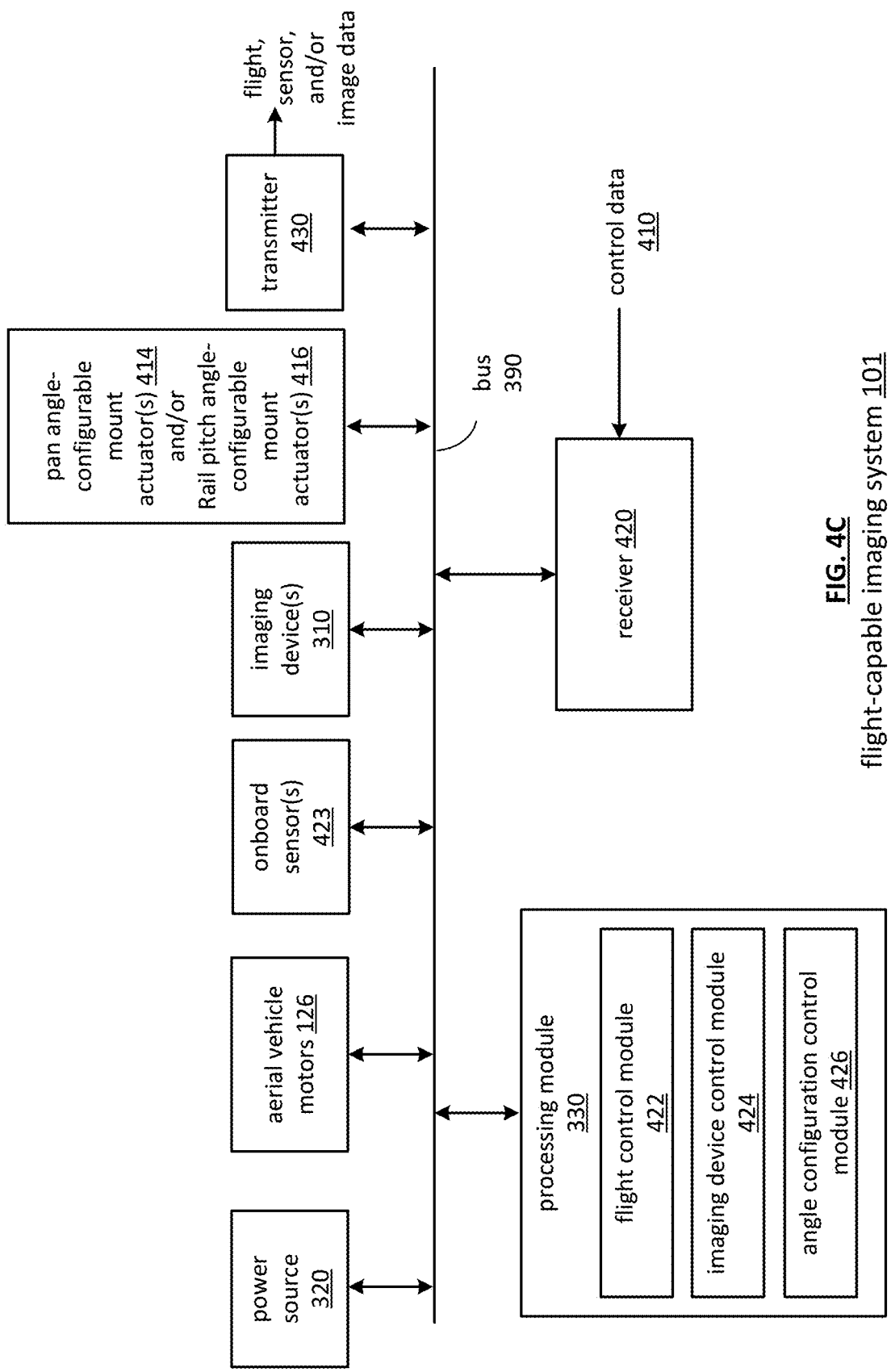
FIG. 4C is a schematic block diagram of a flight-capable imaging system that implements a pan angle configuration control module in accordance with various embodiments.

FIG. 4C illustrates an embodiment of flight-capable imaging system 101 that includes one or more pan angle-configurable mount actuators 414 and/or one or more rail pitch angle-configurable mount actuators 416. The one or more pan angle-configurable mount actuators 414 can be attached to, and/or can otherwise be implemented to control in-flight configuration of, the configuration of pan angle-configurable mount arms 347.1 and/or 347.2 to control the corresponding pan angle 345 and corresponding pan direction 344 about the pan rotation axis 342 as illustrated and discussed in conjunction with FIGS. 3C and 3D, and/or about and/or along one or more other axes. This can include facilitating clockwise rotation, counterclockwise rotation, and/or both. This can include facilitating the clockwise rotation and/or counterclockwise rotation at a fixed rotational velocity and/or at a configured and/or selected rotational velocity identified from a plurality of rotational velocity options.

Alternatively or in addition, one or more rail pitch angle-configurable mount actuators 416 can be attached to, and/or can otherwise be implemented to control in-flight configuration of, the configuration of rail pitch angle-configurable mount arms 947.1 and/or 947.2 to control the corresponding rail pitch angle 909 and corresponding rail axis 907 about the pitch angle rotation axis 942 and/or with respect to the vehicle axis 905 as illustrated and discussed in conjunction with FIGS. 9A-9E, and/or about and/or along one or more other axes. This can include facilitating clockwise rotation, counterclockwise rotation, and/or both. This can include facilitating the clockwise rotation and/or counterclockwise rotation at a fixed rotational velocity and/or at a configured and/or selected rotational velocity identified from a plurality of rotational velocity options.

The processing module 330 of flight-capable imaging system 101 can further implement one or more angle-configuration control modules 426 to control the more pan angle-configurable mount actuators 414 and/or to control the one or more rail pitch angle-configurable mount actuators 416. For example, the same or different control data 410 received via receiver 420 and/or predetermined angle-configuration control data can be utilized to control the one or more pan angle-configurable mount actuators 414 and/or the one or more rail pitch angle-configurable mount actuators 416. The angle-configuration control module 426 can utilize this information, and/or measurements collected via one or more onboard sensors 423, to generate and/or send control data to the angle-configurable mount actuators 414 and/or the rail pitch angle-configurable mount actuators 416, for example, during flight, to cause the pan angle-configurable mount actuators 414 to change the pan direction 344 of the imaging device 310 accordingly, and/or to cause the rail pitch angle-configurable mount actuators 416 to change the rail pitch angle 909 of the vehicle-mounted rail system 150 relative to the aerial vehicle accordingly. Thus, the pan direction 344 can be changed one or more times as a result of the control data, for example, during flight. Alternatively or in addition, the rail axis 907 can be changed one or more times relative to the vehicle axis 905 one or more times as a result of the control data, for example, during flight.

Some or all of processing module 330 utilized to implement angle-configuration control module 426 can be implemented via processing resources of pan angle-configurable mount actuator 414 and/or a portion of mount 142 mounting the imaging device 310 to rails 130, where some or all hardware of processing module 330 utilized to implement the implement angle-configuration control module 426 is integrated within pan angle-configurable mount actuators 414 and/or a portion of mount 142 mounting the imaging device 310 to rails 130. Some or all of processing module 330 utilized to implement angle-configuration control module 426 can be implemented via processing resources of rail pitch angle-configurable mount actuator 416 and/or a portion of mount 121 mounting the aerial vehicle 122 to rails 130, where some or all hardware of processing module 330 utilized to implement the implement angle-configuration control module 426 is integrated within angle-configurable mount actuators 416 and/or a portion of mount 121 mounting the aerial vehicle 122 to rails 130. Some or all of processing module 330 utilized to implement angle-configuration control module 426 can be implemented via processing resources of aerial vehicle 110, where some or all hardware of processing module 330 utilized to implement the angle-configuration control module 426 is integrated within the aerial vehicle body 122 and/or one or more aerial vehicle arms 124. Alternatively or in addition, some or all hardware of processing module 330 utilized to implement the angle-configuration control module 426 is mounted to at least one rail 130 and/or all rails 130 as one or more rail-mounted elements 155 and/or is attached to and/or integrated within other portions of the flight-capable imaging system 101. The hardware of processing module 330 utilized to implement angle-configuration control module 426 can be shared with and/or distinct from the processing module 330 utilized to implement the flight control module 422 and/or the imaging device control module 424.

Figure 4D:
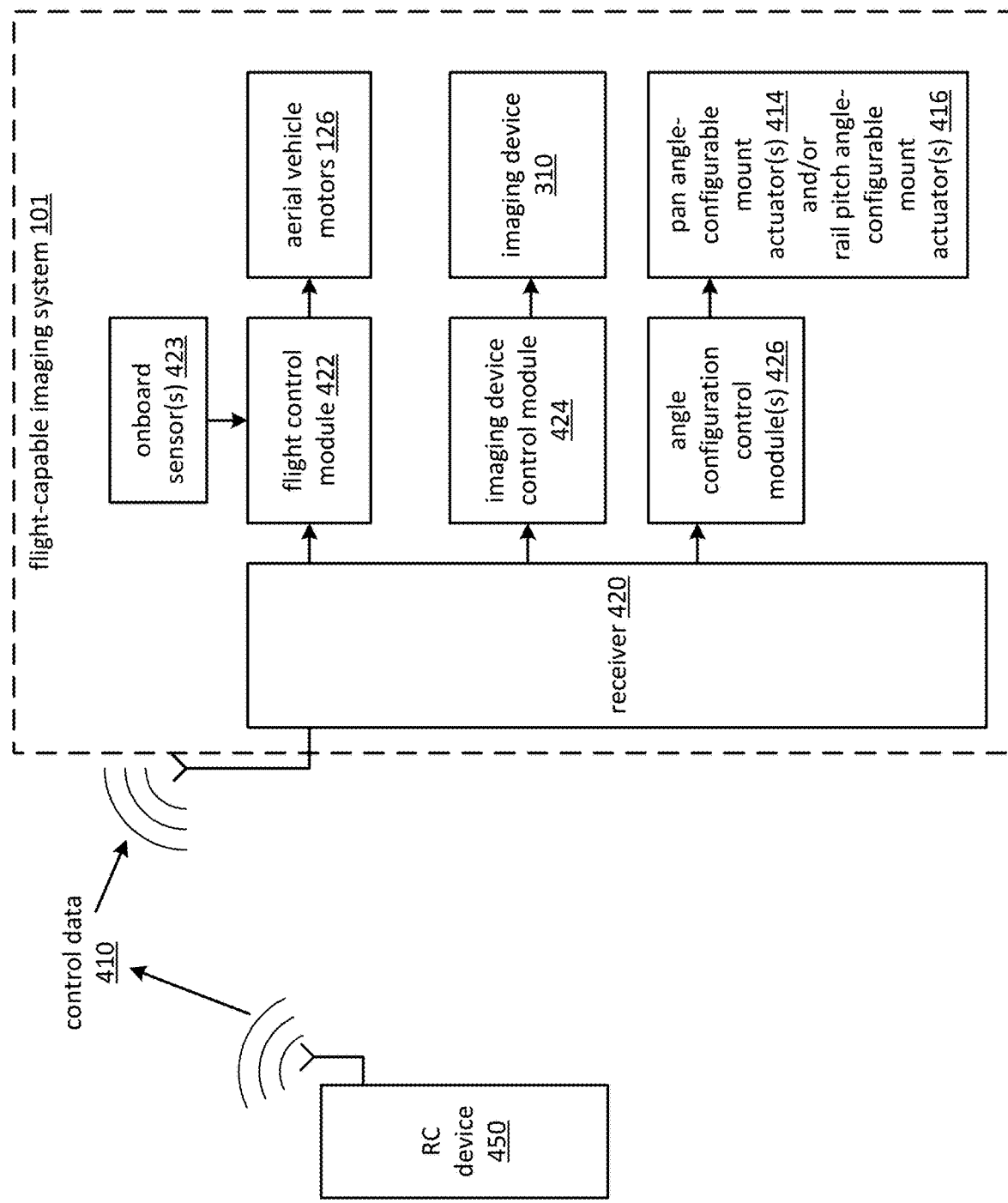
FIG. 4D is a schematic block diagram of a flight-capable imaging system that receives control data from a remote control device in accordance with various embodiments.

FIG. 4D illustrates a schematic block diagram of flight-capable imaging system 101 receiving and processing control data 410 generated and transmitted by at least one remote control (RC) device 450. The RC device 450 can be implemented as: a remote control device of the aerial vehicle 110; a handheld device; a personal client device such as a desktop computer, laptop, tablet, smart phone, and/or mobile device; a ground-based computing system; and/or any device operable to generate and transmit control data 410, for example, via processing resources and/or at least one transmitter of the RC device 450, based on user input to at least one input device of the RC device 450 by a user of RC device 450 during flight and/or based on predetermined instructions stored in memory of the RC device 450. The receiver 420 can receive the control data 410, which is processed by the flight control module 422; imaging device control module 424; and/or angle-configuration control module 426.

The flight control module 422 can process flight control instructions of control data 410 and/or measurements of onboard sensors 423 to generate control data utilized to control speed of aerial vehicle motors 126 accordingly. Alternatively or in addition, the imaging device control module 424 can process imaging device control instructions of control data 410 and/or measurements of onboard sensors 423 to generate control data utilized to control functionality of imaging device 310 during flight. Alternatively or in addition, one or more angle configuration control modules 426 can process pan angle configuration control instructions, rail pitch angle configuration control instructions of control data 410, and/or measurements of onboard sensors 423 to generate control data utilized to control one or more pan angle-configurable mount actuators 414 to configure orientation of imaging device 310, such as pan direction 344, during flight, and/or to generate control data utilized to control one or more rail pitch angle-configurable mount actuators 416 to configure orientation of vehicle-mounted rail system 150 relative to aerial vehicle 122.

In some embodiments, separate portions and/or types of control data 410 generated by RC device 450 indicate flight control instructions, imaging device control instructions, pan angle configuration control instructions, and/or rail pitch angle configuration control instructions, for example, via different portions of transmitted data packets, via different communication protocols, via different identifying header data, and/or via different transmitters at different frequencies. In some embodiments, different RC devices 450, used by a same or a set of different users, each generate and transmit their own control data to separately send their own control data 410, where one RC device transmits flight control instructions as control data 410, where the same or different RC device transmits imaging device control instructions as control data 410, and/or where the same or different RC device transmits pan angle configuration control instructions and/or rail pitch angle configuration control instructions as control data 410. For example, different users can be responsible for controlling flight vs. imaging device functionality and/or orientation via their own RC devices 450 to divide responsibility for these different controllable aspects of flight-capable imaging system 101.

In some embodiments, processing of control data 410 can include automatically determining, automatically computing, and/or automatically enforcing threshold speeds of motion, threshold heights of the aerial vehicle, threshold rotation amount and/or threshold rotation speed of the imaging device 310 via pan angle-configurable mount actuators 414, threshold rotation amount and/or threshold rotation speed of the vehicle-mounted rail system 150 via rail pitch angle-configurable mount actuators 416, and/or thresholds. These thresholds can be computed and/or enforced based on computed state data of the vehicle, such as its current speed, velocity, orientation, height, measured vibration, battery life, and/or other state data.

In some embodiments, these thresholds can be computed and/or enforced based on the center of mass of the flight-capable rail-based system 100, for example, induced by the current rotation of the vehicle-mounted rail system 150 via rail pitch angle-configurable mount actuators 416. For example, based on the mounting position and/or respective weight distribution of different rail mounted elements 155, and/or based on respective weight distribution of rails 130 themselves, the center of mass of the flight-capable rail-based system 100 can change as the vehicle-mounted rail system 150 is rotated about the rail pitch rotation axis 942. In some cases, restrictions on vehicle velocity 510, such as a maximum speed, acceleration, and/or other movement of the aerial vehicle flight-capable rail-based system 100, is automatically capped and/or altered as a function of the current pitch angle 909, the current pan angle 345, and/or as a function of measured and/or estimated changes to the center of mass. In some cases, restrictions on vehicle velocity 510 is automatically capped and/or altered as a function of the moment of inertia induced by rotation of the rails 130 and/or respective mounted elements 155 about rail pitch rotation axis 942, and/or the moment of inertia induced by rotation of the imaging device 310 about pan rotation axis 342. In some embodiments, a maximum and/or minimum pitch angle 909, maximum and/or minimum pitch angle 909, maximum and/or minimum pan angle 345, maximum velocity of the rotation of rails 130 via actuators 416, and/or maximum velocity of the rotation of imaging device 310 via actuators 414, is capped and/or altered as a function of vehicle velocity 510, for example, where rotation via actuators 416 is restricted and/or limited while the vehicle is flying with velocity and/or acceleration exceeding a threshold.

Figure 5:
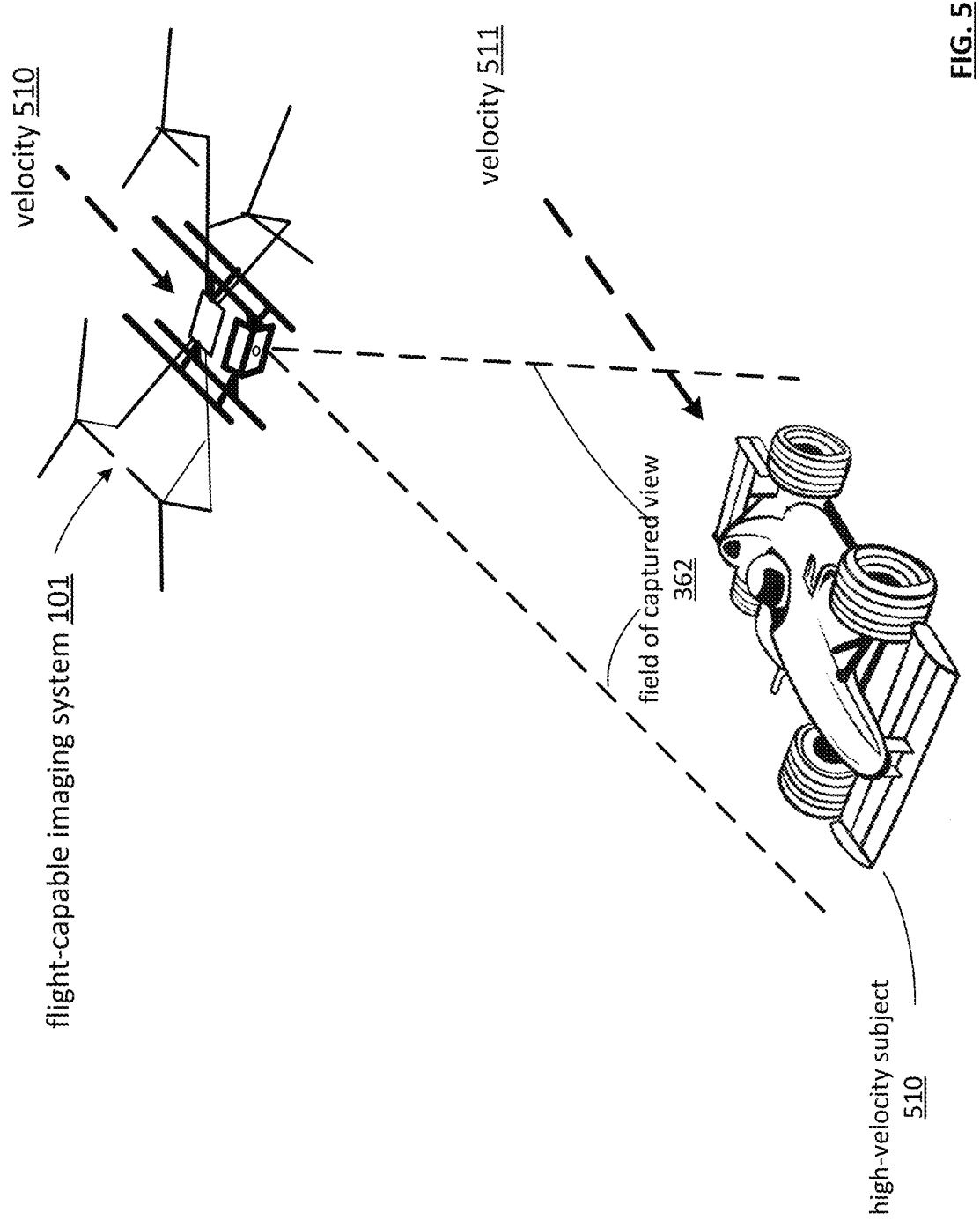
FIG. 5 is an illustration of an example flight-capable imaging system that captures image data of a high-velocity subject in accordance with various embodiments.

FIG. 5 is a pictorial illustration of a flight-capable imaging system 101 implemented to capture image data, such as video data, of a high-velocity subject, for example, in conjunction with filming of a motion picture and/or in conjunction with producing professional cinematic and/or photographic products. The flight-capable imaging system 101 can be configured to fly at high velocities with high maneuverability, for example, based on aerial vehicle 110 being implemented as and/or having comparable velocities and/or capabilities of a racing drone, where the flight-capable imaging system 101 is operable fly with a velocity 510 that can match and/or be substantially similar to the velocity 511 of one or more high-velocity subjects of the produced motion pictures or other image data, such as cars, boats, planes, and/or other vehicles or other subjects to be tracked and/or captured in the image data, that travel at high and/or highly dynamic speeds, accelerations, and/or with rapid changes in direction. For example, the flight-capable imaging system 101 is operable fly at speeds greater than and/or equal to 99 miles per hour, or other high speeds. The flight-capable imaging system 101 can further be highly maneuverable, capable of rapid and/or precise changes in acceleration, speed, direction, and/or orientation in directions with components in and/or opposite the x direction, y direction, and/or z direction.

The high velocities with high maneuverability of flight-capable imaging system 101 can alternatively or additionally be utilized to enable high speed maneuvering through a space with many obstacles while capturing image data, and/or to enable capture of video data corresponding to a first person view of traveling at high speeds and/or with complex maneuvers.

In embodiments where the flight-capable imaging system 101 is capable of capturing image data while traveling at high speeds with complex maneuvering, the mounting of imaging device 310 via the vehicle-mounted rail system can be favorable in enabling stability of the imaging device 310 during flight while maintaining a secure attachment to the imaging device 310 during flight, which can render more stable, less shaky, and/or less blurred videos and/or photographs due to the stability of the imaging device 310 despite the high speeds and/or various dramatic changes in direction, speed, orientation and/or acceleration during complex maneuvers in flight, for example, as required and/or desired in capturing video data and/or photograph data while tracking the motions of a high-velocity subject. Similar speeds and maneuvers performed by other aerial vehicles with cameras simply mounted atop and/or beneath their aerial vehicle body via direct attachment to the aerial vehicle body via a gimble or fixed mount can render much shakier, more blurred, and/or less smooth photograph and/or video data, and/or can cause the camera to become detached from and/or to fall from the aerial vehicle during flight due to these high speeds and/or maneuvers. The secure and stable mounting of imaging device 310 by flight-capable imaging system 101 can thus be particularly desirable in capturing high quality image data, for example, as desired when producing a professional motion picture, while flying at high speeds and/or via complex maneuvers to better track and capture high velocity subjects, to better maneuver quickly through spaces with tight and/or complex obstacles, and/or to otherwise capture image data via these high speeds and/or complex maneuvers.

FIGS. 6A-6H illustrate embodiments of various types of mounts utilized to attach various rail-mounted elements 155 to rails 130. Some or all features and/or functionality of the mounting illustrated in and/or described in conjunction with FIGS. 6A-6H can be utilized to implement mounting of rail-mounted elements 155 to rails 130 of the vehicle-mounted rail system 150 of FIGS. 2A-2F and/or any other embodiment of the vehicle-mounted rail system 150 of any flight-capable rail-based system 100 and/or flight-capable imaging system 101 described herein. Other types of mounting not illustrated in the examples of 6A-6H can be utilized to mount some or all rail-mounted elements 155 to rails 130 in other embodiments.

Figure 6A:
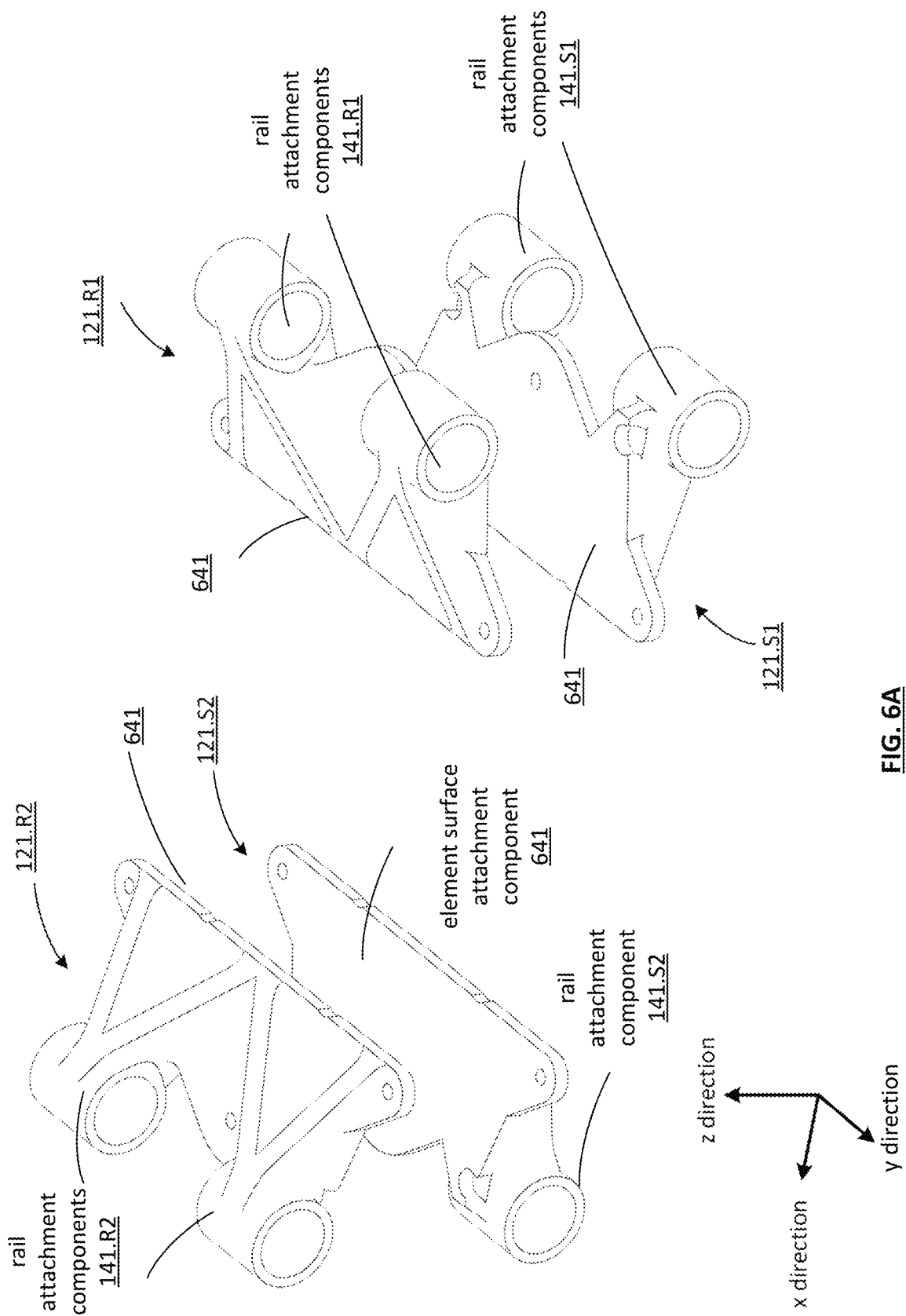
FIG. 6A is a three-dimensional illustration of example mounts of a vehicle-mounted rail system.

FIG. 6A illustrates an embodiment of a type of mounting utilized to mount a rail-mounted elements 155 that implements a set of mounts 121. Each mount 121 can be utilized to mount a corresponding rail-mounted element 155 to a corresponding one of the set of rails 130, for example, based upon the corresponding rail sliding through each cylindrical opening of the rail attachment components 141 of the corresponding mount 121. Each mount 121 can attach to the corresponding rail-mounted element 155 via element surface attachment components 641, where top surfaces of the rail-mounted element 155 are attached to the underside surface of element surface attachment components 641 of each of the top mounts 121, and/or where bottom surfaces of the rail-mounted element 155 are attached to the topside surface of element surface attachment components 641 of each of the bottom mounts 121.

Figure 6B:
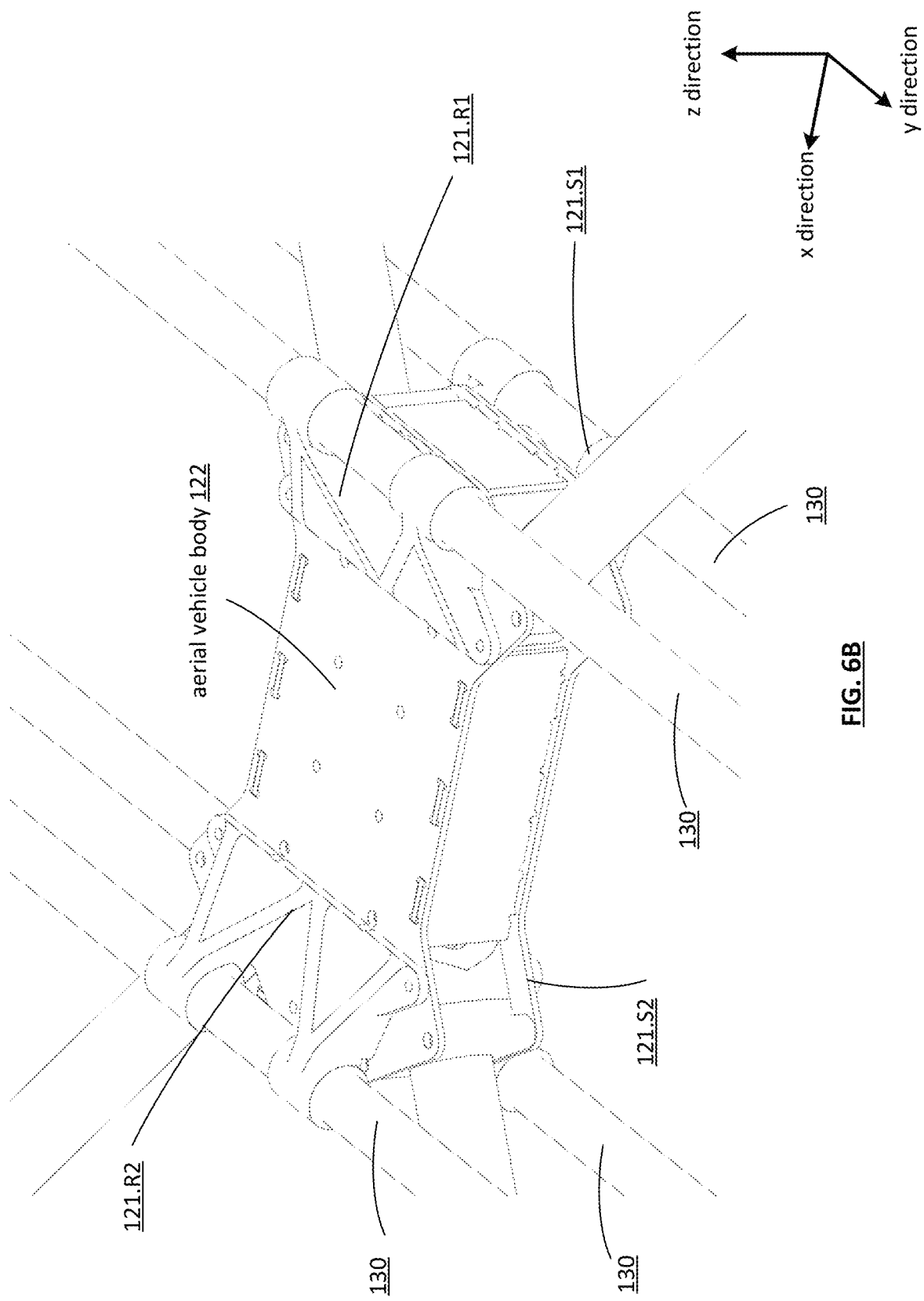
FIG. 6B is a three-dimensional illustration of a rail-mounted element attached to example mounts of a vehicle-mounted rail system.

FIG. 6B illustrates an embodiment of mounting of a rail-mounted element 155 to rails 130 of a vehicle-mounted rail system 150 via the set of mounts 121 of FIG. 6A. In particular, as illustrated in FIG. 6B, the set of mounts 121 of FIG. 6A can be configured to attach an aerial vehicle body 122, such as the aerial vehicle body 122 of the aerial vehicle of FIGS. 1A-1D to the vehicle-mounted rail system 150. Other types of rail-mounted elements 155 can optionally be attached to the vehicle-mounted rail system 150 via mounts that are the same as and/or similar to the mounts 121 of FIGS. 6A and 6B.

The set of mounts 121 of FIGS. 6A and 6B, or another type of mount 121 configured to attach vehicle body 122 to vehicle-mounted rail system 150, can made of a rubber material, a Thermoplastic Polyurethane (TPU) material, and/or any other vibration absorbing material, for example, to dampen vibrations imposed upon the aerial vehicle 110 while in flight and/or to aid in isolating other rail-mounted elements 155 from vibrations imposed upon aerial vehicle 110 while in flight. This can be ideal in helping dampen vibrations imposed upon one or more imaging devices 310 mounted upon vehicle-mounted rail system 150 as rail-mounted element 155 to improve the stability of imaging data captured by imaging devices 310, for example, to render smoother, less shaky, and/or less blurred videos and/or photographs captured by imaging device 310 of flight-capable imaging system 101, particularly when flying at high velocities and/or via complex maneuvers.

A rail-mounted element 155 of FIG. 6B mounted via the set of mounts 121 can optionally be detachable from rail-mounted element 155 based on detaching the rail-mounted element 155, such as a given aerial vehicle body of a given aerial vehicle, from the element surface attachment components 641 and/or based on sliding the rail attachment components 141 off of the rails of the vehicle-mounted rail system 150. The vehicle-mounted rail system 150 can be configurable based on adding, removing, and/or changing position of the rail-mounted element 155 upon vehicle-mounted rail system 150. For example, different types of aerial vehicles can be attached to and/or detached from the vehicle-mounted rail system 150 to enable different corresponding types of flight, battery life, altitude, speed, and/or maneuverability. As another example, different vehicle-mounted rail system 150 having different sets of and/or configurations of rail-mounted elements 155 can be attached to and/or detached from a given aerial vehicle body 122 to enable different functionality of the corresponding flight-capable rail-based system 100, such as different functionality due to different types imaging devices 310, different types of power sources 320, and/or different types of sensors or other mounted elements.

Figure 6C:
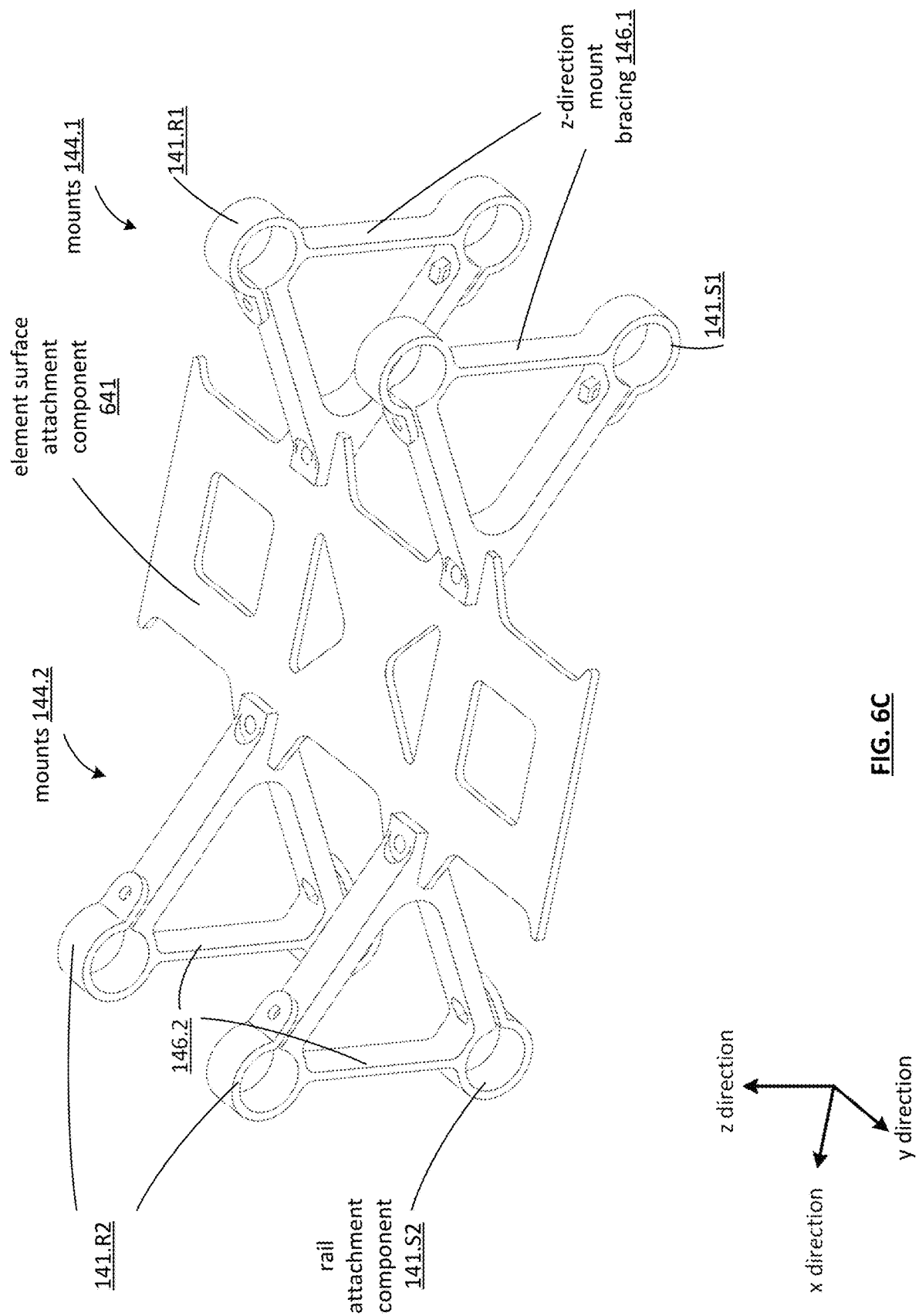
FIG. 6C is a three-dimensional illustration of example mounts of a vehicle-mounted rail system.

FIG. 6C illustrates an embodiment of another type of mounting utilized to mount a rail-mounted elements 155 that implements a set of mounts 144. Each mount 144 can be utilized to mount a corresponding rail-mounted element 155 to a top and bottom one of the set of rails 130, for example, based upon the pair of corresponding rails each sliding through each cylindrical opening of the rail attachment components 141 of the corresponding mount 144. Each mount 144 can attach to sides of an element surface attachment components 641, where the corresponding rail-mounted element 155 is attached to the rails 130 via its attachment to element surface attachment components 641. The rail-mounted element 155 can optionally include two portions, where a top portion of the rail-mounted element 155 is attached to a top surface of element surface attachment components 641 and/or where a bottom portion of the rail-mounted element 155 is attached to a bottom surface of element surface attachment components 641. The set of mounts 144 can optionally be implemented as the same and/or similar set of mounts 144 of FIGS. 2A-2F.

Figure 6D:
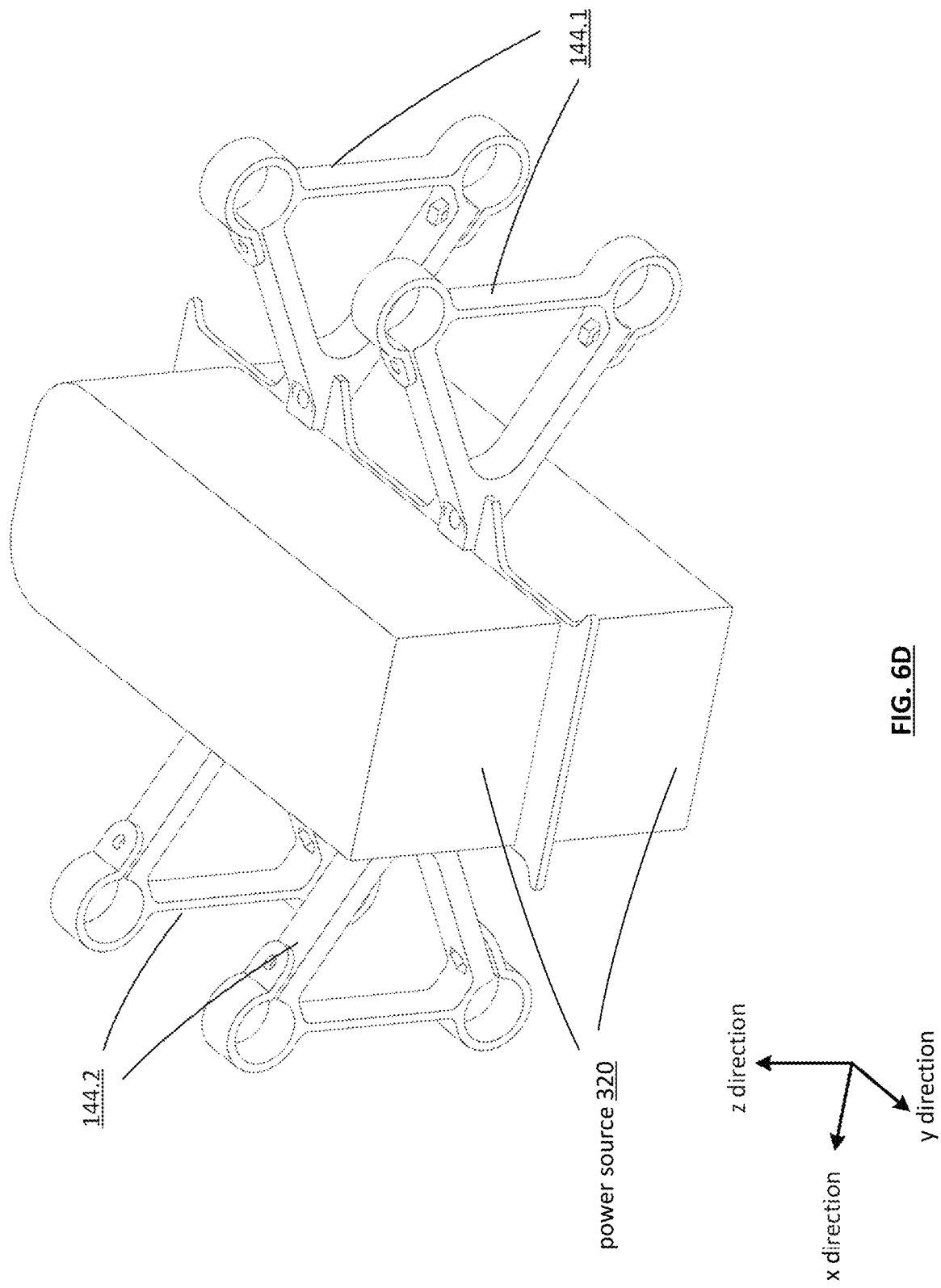
FIG. 6D is a three-dimensional illustration of a rail-mounted element attached to example mounts of a vehicle-mounted rail system.

FIG. 6D illustrates an embodiment of mounting of a rail-mounted element 155 to rails 130 of a vehicle-mounted rail system 150 via the set of mounts 144 of FIG. 6C. In particular, as illustrated in FIG. 6D, the set of mounts 144 of FIG. 6C can be configured to attach a power source 320, such as the power source 320 of the flight-capable imaging system 101 of FIGS. 3A-3F, to the vehicle-mounted rail system 150. Other types of rail-mounted elements 155 can optionally be attached to the vehicle-mounted rail system 150 via mounts that are the same as and/or similar to the mounts 144 of FIGS. 6C and 6D.

The set of mounts 144 of FIGS. 6C and 6D, or another type of mount 144 configured to attach power source 320 to vehicle-mounted rail system 150, can made of an aluminum material, a magnesium material, or another type of material. The mounts 144 configured to attach power source 320 to vehicle-mounted rail system 150 can be the same or different material as the mounts 121 configured to attach aerial vehicle body 122 to the vehicle-mounted rail system 150.

A rail-mounted element 155 of FIG. 6D mounted via the set of mounts 144 can optionally be detachable from rail-mounted element 155 based on detaching the rail-mounted element 155, such as a given power source 320, from the element surface attachment components 641 and/or based on sliding the rail attachment components 141 off of the rails of the vehicle-mounted rail system 150. The vehicle-mounted rail system 150 can be configurable based on adding, removing, and/or changing position of the rail-mounted element 155 upon vehicle-mounted rail system 150. For example, different types of power sources 320 can be attached to and/or detached from the vehicle-mounted rail system 150 to enable different corresponding battery life, power consumption, and/or weights. As another example, power sources 320 can be replaced easily between flights, where a drained power source 320 is removed and replaced by another fully charged power source 320 to enable continued flight of the aerial vehicle without needing to wait for the drained power source to recharge.

Figure 6E:
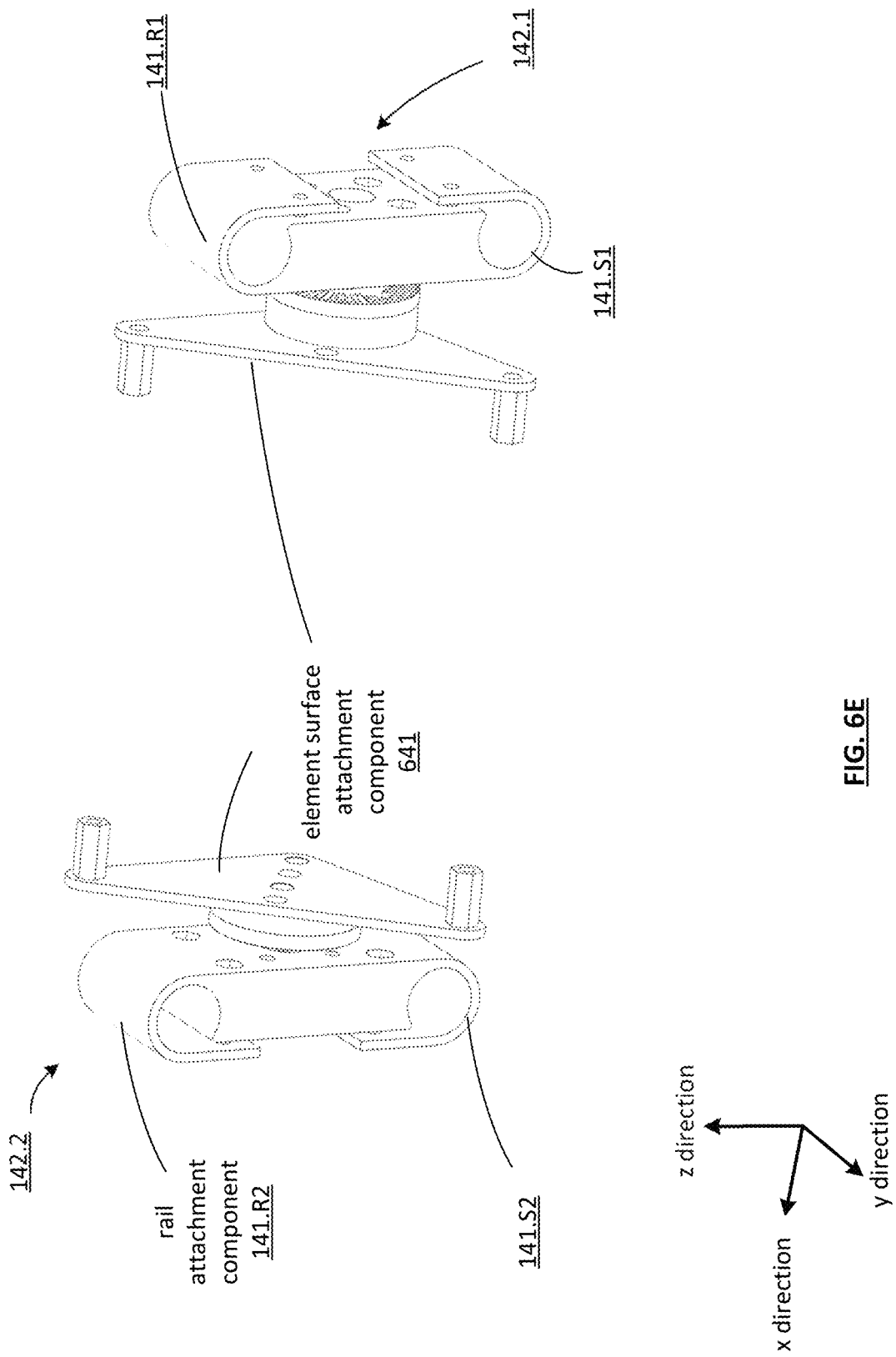
FIG. 6E is a three-dimensional illustration of example mounts of a vehicle-mounted rail system.

FIG. 6E illustrates an embodiment of another type of mounting utilized to mount a rail-mounted elements 155 that implements a set of mounts 142. Each mount 142 can be utilized to mount a corresponding rail-mounted element 155 to a top and bottom one of the set of rails 130, for example, based upon the pair of corresponding rails each sliding through each cylindrical opening of the rail attachment components 141 of the corresponding mount 144. Each mount 142 can attach to sides of an element surface attachment components 641, where the corresponding rail-mounted element 155 is attached to the rails 130 via its attachment to element surface attachment components 641. A left surface of the rail-mounted element 155 can be attached to a right facing surface of element surface attachment component 641 of one mount 142 and/or a right surface of the rail-mounted element 155 can be attached to a left facing surface of element surface attachment component 641 of the other mount 142. The set of mounts 142 can optionally be implemented as the same and/or similar set of mounts 142 of FIGS. 2A-2F.

Some or all features and/or functionality of the set of mounts 142 of FIG. 6E can be configured to mount any rail-mounted elements 155 operable to rotate about a pitch axis, for example, relative to the set of parallel rails. Some or all features and/or functionality of the set of mounts 142 of FIG. 6E can be utilized to implement mounts 121 attaching the vehicle body to the set of parallel rails, for example, to enable rotation of the vehicle mounted rail system 150 as a whole about a pitch axis relative to a vehicle axis of the aerial vehicle body, such as an axis from the front to back of the aerial vehicle body. Such embodiments where pitch rotation of the vehicle mounted rail system 150 as a whole is facilitate is discussed in further detail in conjunction with FIGS. 9A-9E.

Figure 6F:
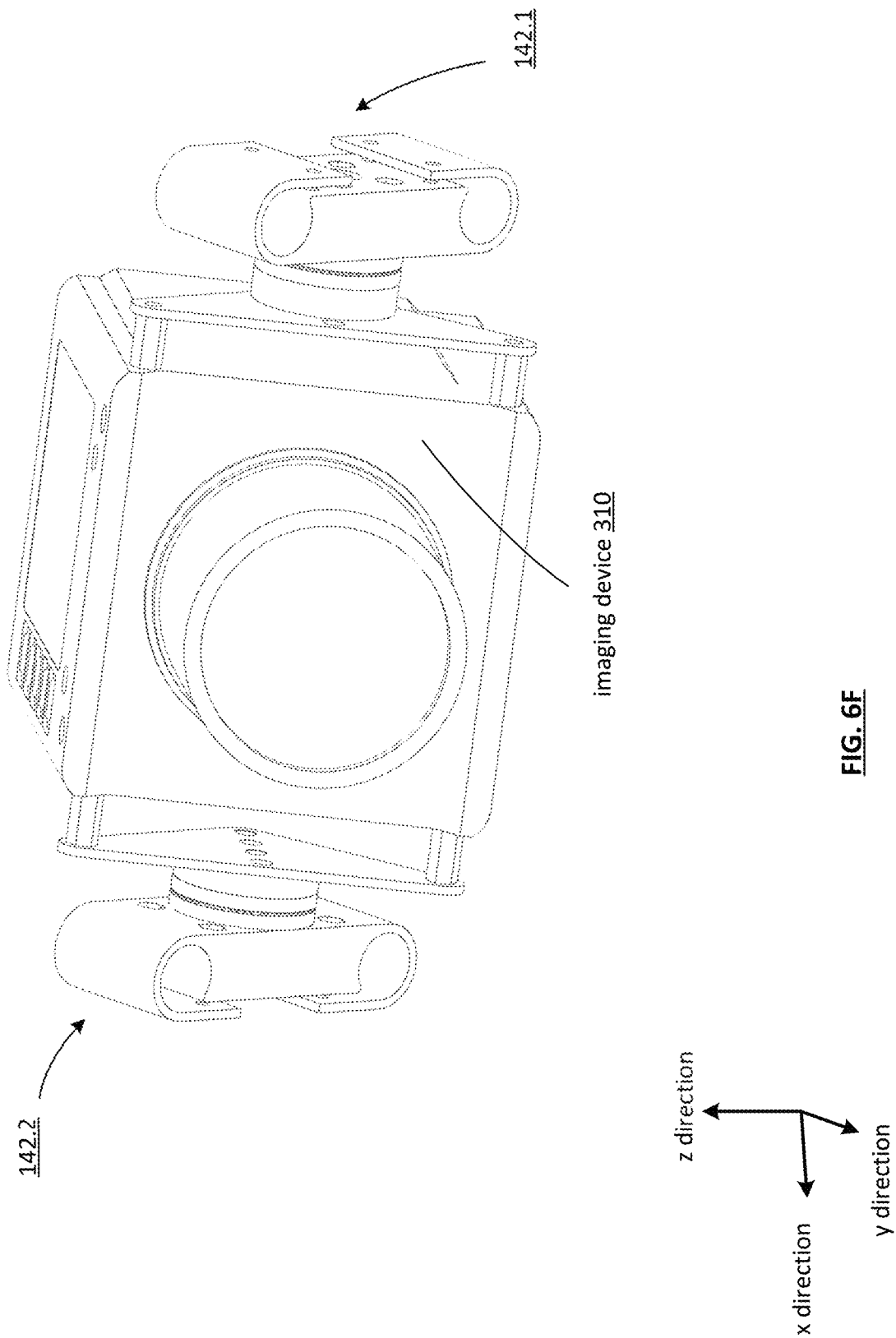
FIG. 6F is a three-dimensional illustration of a rail-mounted element attached to example mounts of a vehicle-mounted rail system.

FIG. 6F illustrates an embodiment of mounting of a rail-mounted element 155 to rails 130 of a vehicle-mounted rail system 150 via the set of mounts 142 of FIG. 6E. In particular, as illustrated in FIG. 6F, the set of mounts 142 of FIG. 6E can be configured to attach an imaging device 310, such as the imaging device 310 of the flight-capable imaging system 101 of FIGS. 3A-3F, to the vehicle-mounted rail system 150. Other types of rail-mounted elements 155 can optionally be attached to the vehicle-mounted rail system 150 via mounts that are the same as and/or similar to the mounts 142 of FIGS. 6E and 6F.

Figure 6G:
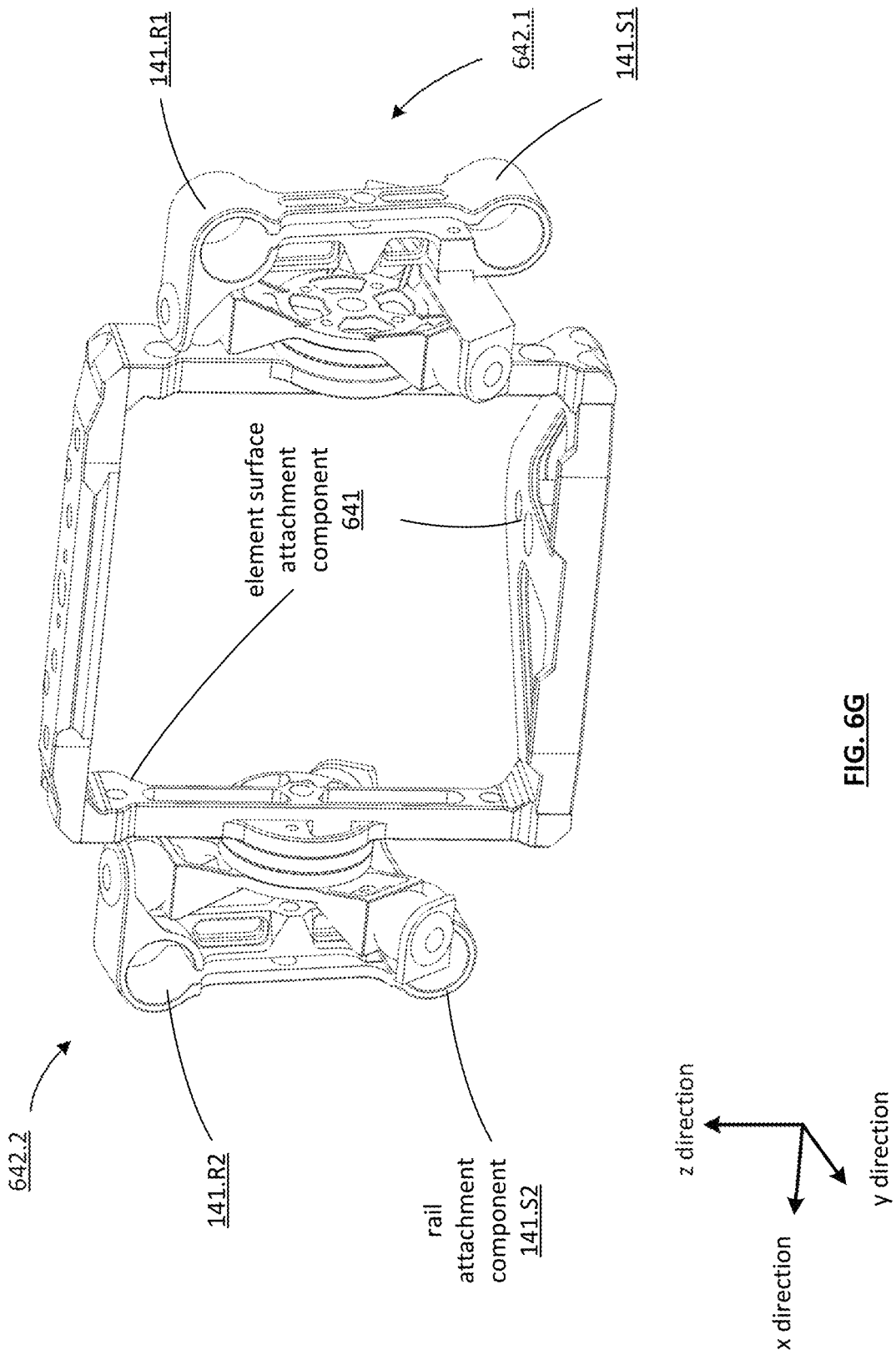
FIG. 6G is a three-dimensional illustration of example mounts of a vehicle-mounted rail system.

FIG. 6G illustrates an embodiment of another type of mounting utilized to mount a rail-mounted elements 155 that implements a set of mounts 642. Each mount 642 can be utilized to mount a corresponding rail-mounted element 155 to a top and bottom one of the set of rails 130, for example, based upon the pair of corresponding rails each sliding through each cylindrical opening of the rail attachment components 141 of the corresponding mount 144. Each mount 642 can attach to sides of an element surface attachment components 641, where the corresponding rail-mounted element 155 is attached to the rails 130 via its attachment to element surface attachment components 641. A top, bottom, left, and/or right surface of the rail-mounted element 155 can be attached to four corresponding surfaces of the element surface attachment component 641. The mounts 642 of FIG. 6G can implement integrated vibration dampening technology and/or can be operable to better absorb vibrations than the mounts 142 of FIGS. 6E and 6F.

Figure 6H:
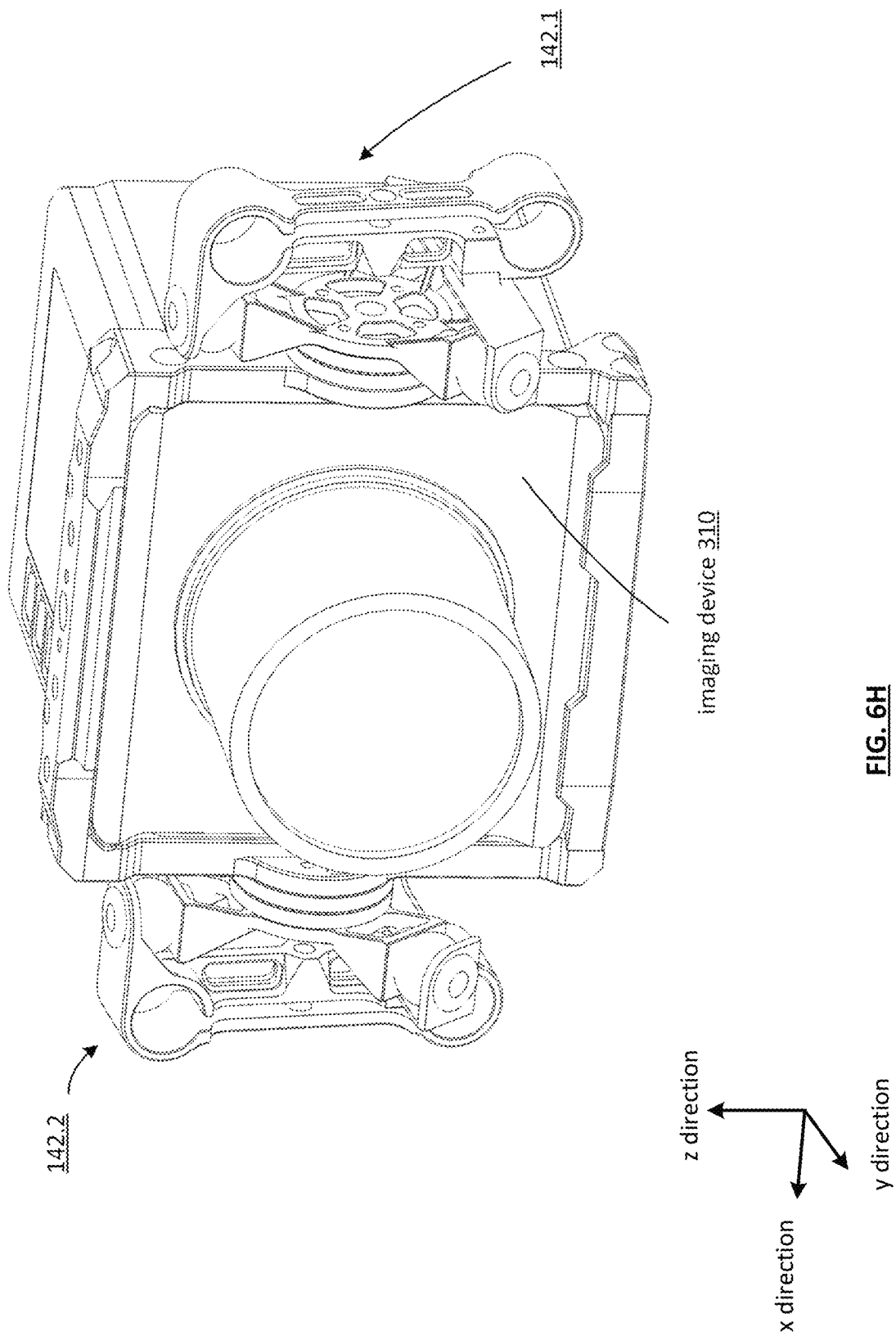
FIG. 6H is a three-dimensional illustration of a rail-mounted element attached to example mounts of a vehicle-mounted rail system.

FIG. 6H illustrates an embodiment of mounting of a rail-mounted element 155 to rails 130 of a vehicle-mounted rail system 150 via the set of mounts 142 of FIG. 6G. In particular, as illustrated in FIG. 6H, the set of mounts 142 of FIG. 6G can be configured to attach an imaging device 310, such as the imaging device 310 of the flight-capable imaging system 101 of FIGS. 3A-3F, to the vehicle-mounted rail system 150. For example, the mounts 642 of FIGS. 6G and 6H can optionally be utilized instead of mounts 142 to attach imaging device 310 of FIGS. 3A-3F to the vehicle-mounted rail system 150, for example, based on the integrated vibration dampening being favorable in better stabilizing imaging device 310 during flight. Other types of rail-mounted elements 155 can optionally be attached to the vehicle-mounted rail system 150 via mounts that are the same as and/or similar to the mounts 142 of FIGS. 6E and 6F.

The set of mounts 142 of FIGS. 6E and 6F, mounts 642 of FIGS. 6G and 6H, or another type of mount configured to attach imaging device 310 to vehicle-mounted rail system 150, can made of an aluminum material, a magnesium material, or another type of material. The mounts 142 and/or 642 configured to attach imaging device 310 to vehicle-mounted rail system 150 can be the same or different material as the mounts 121 configured to attach aerial vehicle body 122 to the vehicle-mounted rail system 150 and/or can be the same or different material as the mounts 144 configured to attach the power source 320 to the vehicle-mounted rail system 150.

In some embodiments, redundant vibration dampening to the imaging device 310 is implemented, for example, based on mounts 121 attaching aerial vehicle body 122 to the vehicle-mounted rail system 150 being composed of a first vibration absorbing material, and based on mounts 142 and/or 642 attaching imaging device 310 to the vehicle-mounted rail system 150 being composed of a second material that is different from the first material. For example, the first material includes is a first vibration absorbing material and/or technology, and/or the second material includes a second vibration absorbing material and/or technology. The first material can be operable to dampen vibrations at a first set of frequencies, and/or the second material can be operable to dampen vibrations at a second set of frequencies that are different from the first set of frequencies. The first material and/or second material can otherwise be operable to absorb different types of vibrations, which can be ideal in further isolating the attaching imaging device 310 from both different types of vibrations imposed upon other portions of the flight-capable imaging system 101 to better stabilize the imaging device 310 during flight, particularly during filming when the vehicle is traveling at high velocity and/or via complex maneuvers.

A rail-mounted element 155 of FIG. 6F and/or FIG. 6H mounted via the set of mounts 142 can optionally be detachable from rail-mounted element 155 based on detaching the rail-mounted element 155, such as a given power source 320, from the element surface attachment components 641 and/or based on sliding the rail attachment components 141 off of the rails of the vehicle-mounted rail system 150. The vehicle-mounted rail system 150 can be configurable based on adding, removing, and/or changing position of the rail-mounted element 155 upon vehicle-mounted rail system 150. For example, different types of cameras and/or cameras with different attached accessories can be attached to and/or detached from the vehicle-mounted rail system 150 to enable different corresponding imaging capabilities, having different lenses with different zoom and/or fields of view, and/or other differences.

As another example, imaging devices 310 can be moved to different portions of the vehicle, such as from the front-end of the vehicle-mounted rail system 150 to the back-end of the vehicle mounted rail system. In particular, in some types of filming it can be preferred to be front facing at the front of the vehicle-mounted rail system 150 as illustrated in FIGS. 3A-3F, where the lens has a pan direction 344 with a component in a same direction as forward travel of the flight-capable imaging system 101. In such cases, the flight-capable imaging system 101 can follow behind a moving subject, such as a high-velocity subset of FIG. 5, to film the moving subject from behind. In other types of filming it can be preferred to instead be rear facing at the back of the vehicle-mounted rail system 150, where the lens has a pan direction 344 with a component in a direction opposite forward travel of the flight-capable imaging system 101. In such cases, the flight-capable imaging system 101 can fly in front of a moving subject, such as a high-velocity subset of FIG. 5, to film the moving subset from the front. In such cases where the imaging device is configured in a back, rear facing position, the power source can be detached and moved to a front position to maintain counterbalance of the flight-capable imaging system 101.

FIGS. 7A-7E present embodiments of a flight-capable rail based system 100 that implements a through-arm dampening system 600 in some or all aerial vehicle arms 124 to improve vibration dampening of the flight-capable rail-based system 100 and/or to reduce vibrations imparted upon rail-mounted elements 155. In particular, in embodiments where a rail-mounted element 155 is implemented as an imaging device 310 capturing image data as discussed previously, the vibration dampening induced via through-arm dampening system 600 can be favorable in enabling further stabilization of the imaging device 310 to render smoother videos and/or photographs that are less shaky and/or less blurred. As another example, in embodiments where flight-capable rail-based system 100 is implemented to fly at high speeds with high maneuverability as discussed previously, the vibration dampening induced via through-arm dampening system 600 can be favorable in enabling further stability of the aerial vehicle 110 and/or the flight-capable rail based system 100 as a whole when flying at high speeds and/or via complex maneuvers. Some or all features and/or functionality of the flight-capable rail-based system 100 illustrated in and/or discussed in conjunction with FIGS. 7A-7E can be utilized to implement the flight-capable rail-based system 100 of FIGS. 1A-1D and/or any other embodiment of the flight-capable rail based system 100 and/or the flight-capable imaging system 101 described herein.

Figure 7A:
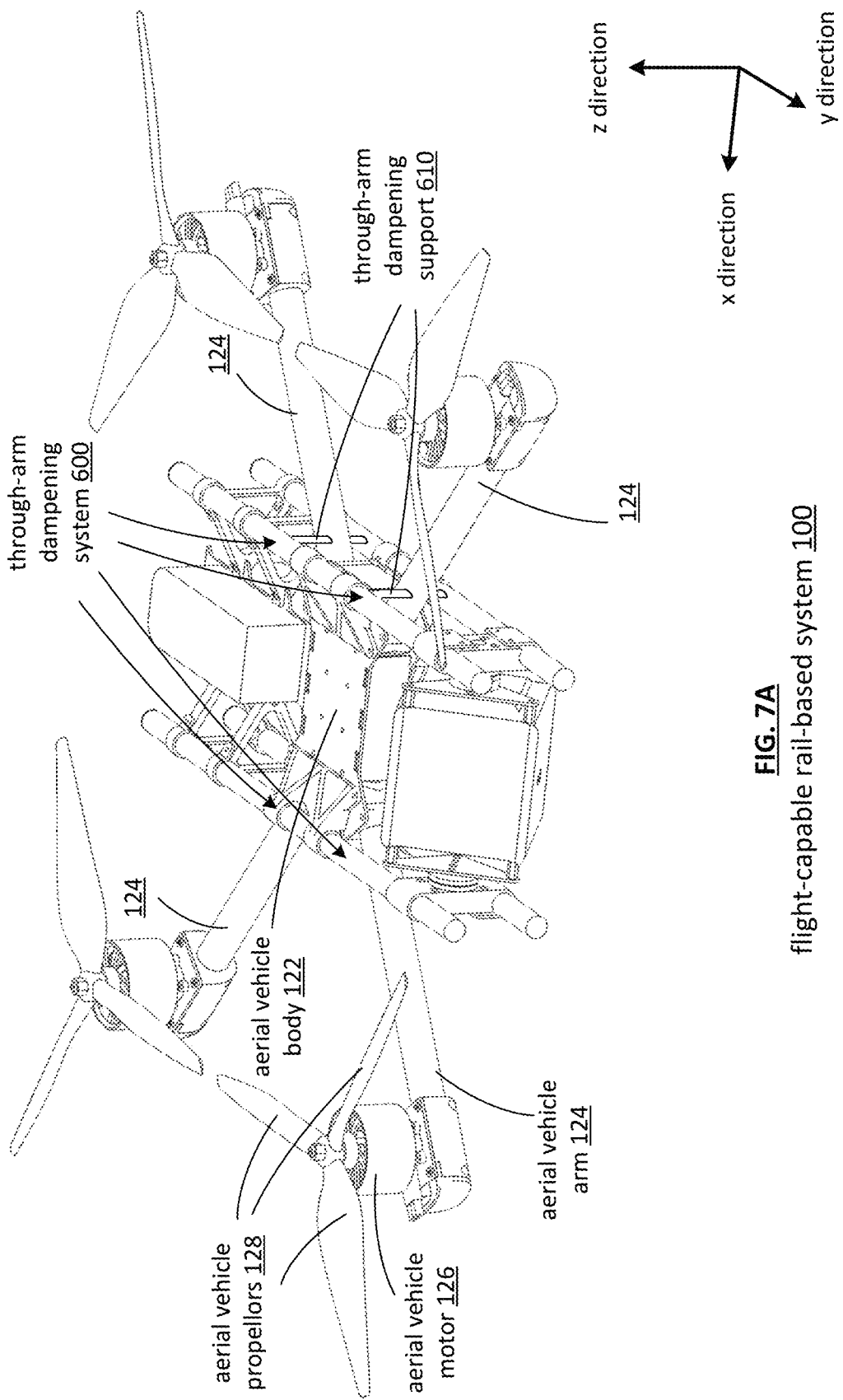
FIG. 7A is a three-dimensional illustration of a flight-capable rail-based system that implements a through-arm dampening system in accordance with various embodiments.

FIG. 7A presents a top side three-dimensional view of a flight-capable rail-based system 100 that is implemented to include a through-arm dampening system 600 in each aerial vehicle arm 124. The through-arm dampening system 600 can include a through-arm dampening support 610 piercing through each aerial vehicle arm 124 in the z direction. One end of each given through-arm dampening support 610 can connect to the top rail on the corresponding side, and the other end of each given through-arm dampening support 610 can connect to the bottom rail on the corresponding side. While not depicted the through-arm dampening support 610 can be mounted on either end to the two respective rails 130 via rail attachment components 141 that partially or fully surround the cylindrical exterior of the rails 130, and/or via other attachment to rails 130.

Figure 7B:
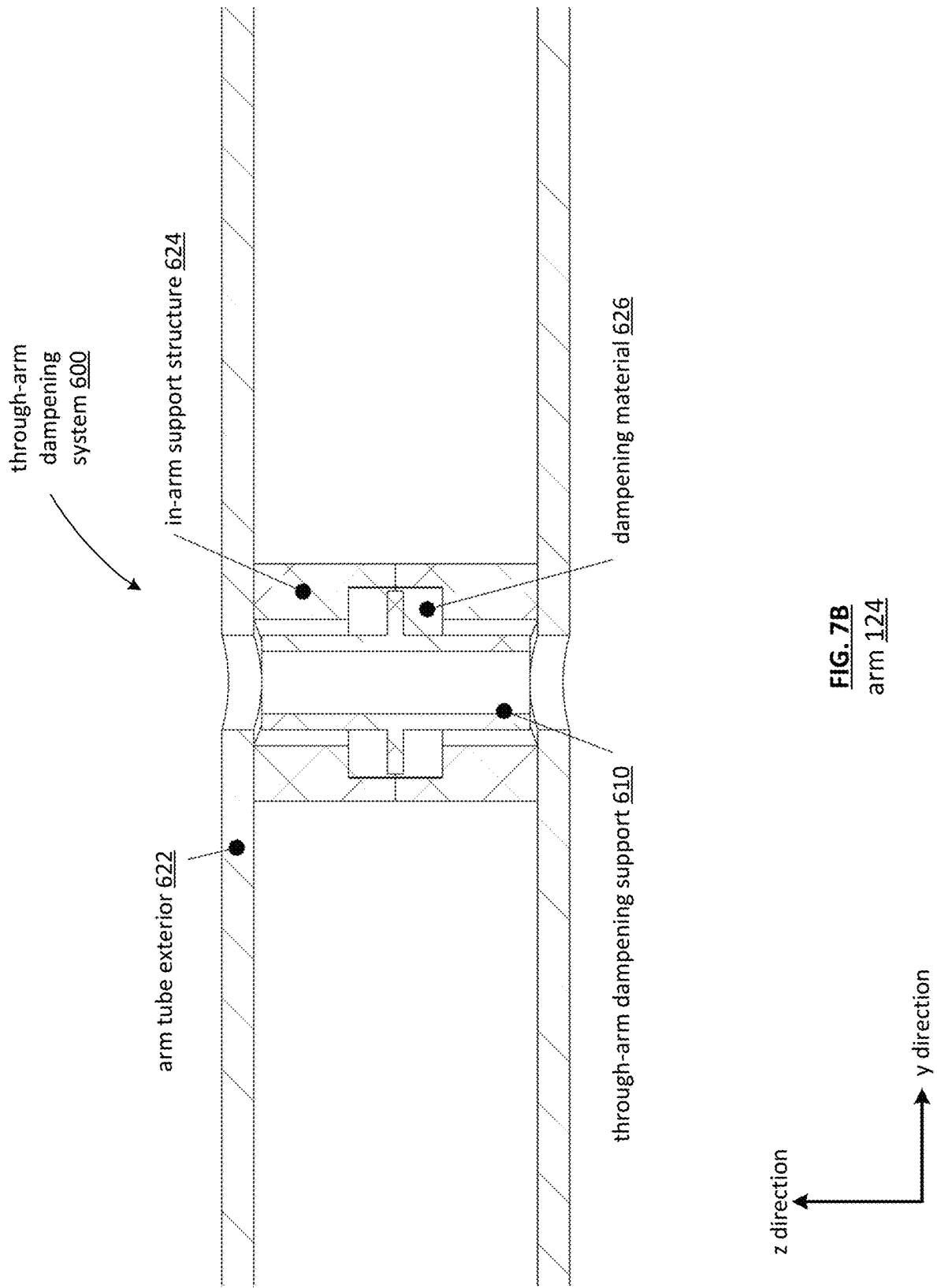
FIG. 7B is a two-dimensional cross-sectional illustration of an arm of a flight-capable rail-based system implementing a through-arm dampening system in accordance with various embodiments.

FIG. 7B illustrates a cross-sectional two-dimensional view of an aerial vehicle arm 124 implementing an embodiment of the through-arm dampening system 600 of FIG. 7A.

Figure 7E:
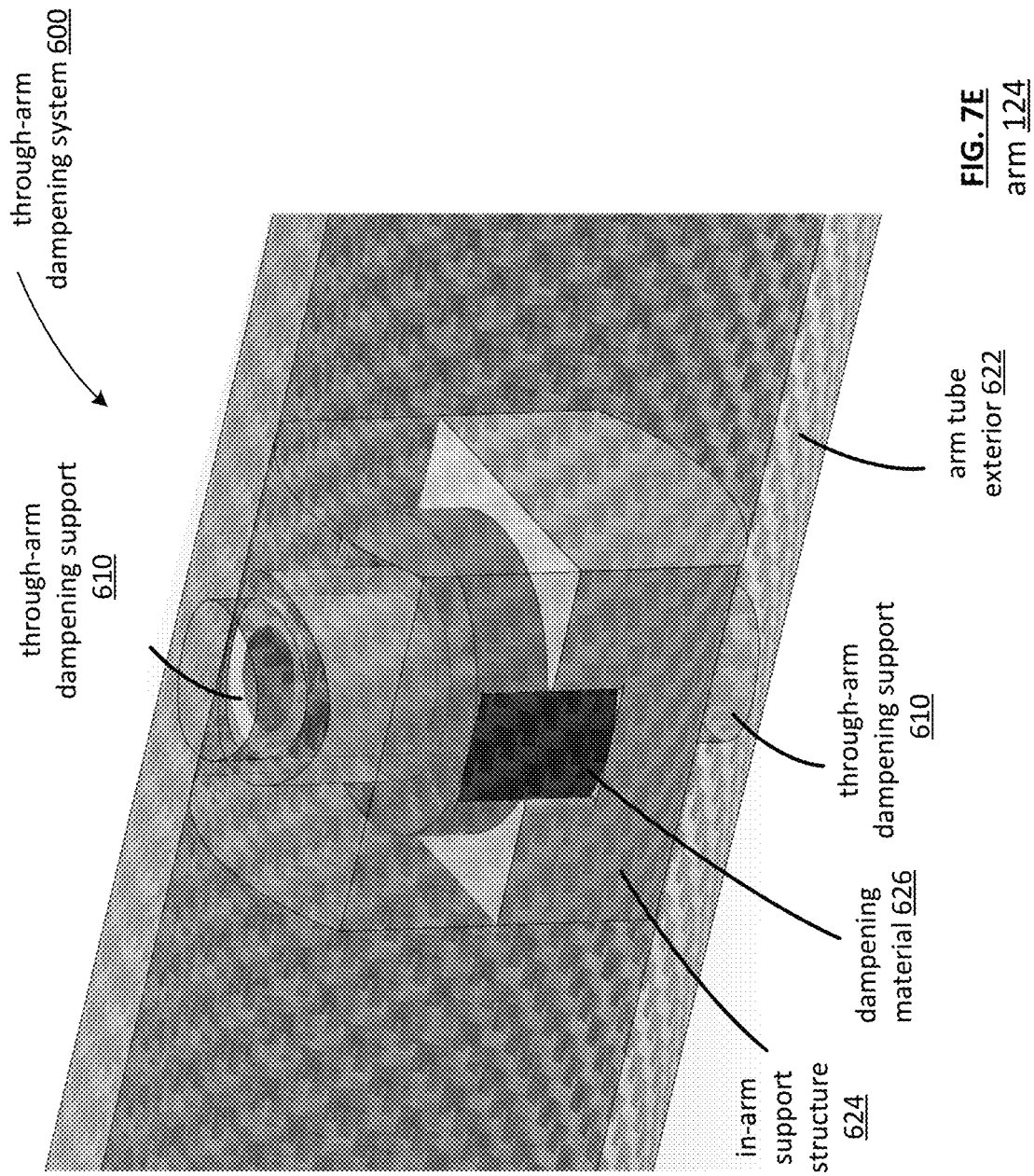
FIG. 7E is a three-dimensional illustration of the interior of an in-arm support structure of an arm of a flight-capable rail-based system implementing a through-arm dampening system in accordance with various embodiments.

FIG. 7C illustrates a shaded cross-sectional two-dimensional view of an aerial vehicle arm 124 implementing the embodiment of the through-arm dampening system 600 of FIG. 7B. FIG. 7D illustrates a shaded three-dimensional view of the interior of an aerial vehicle arm 124 implementing the embodiment of the through-arm dampening system 600 of FIG. 7C. FIG. 7E illustrates a shaded three-dimensional view of the interior of an aerial vehicle arm 124, implementing the embodiment of the through-arm dampening system 600 of FIG. 7D, three-dimensionally illustrating interior elements within an in-arm support structure of the through-arm dampening system 600.

The aerial vehicle arm 124 can be implemented via a hollow and/or solid cylindrical arm tube, and/or another shaped arm tube. An arm tube exterior 622 can be implemented as an exterior cylindrical of the aerial vehicle arm 124 and/or can extend inwards towards the center of the aerial vehicle arm 124 in accordance with a thickness of the arm tube exterior 622 until a hollow portion of the aerial vehicle arm 124 is reached. The aerial vehicle arm 124 can be implemented via a carbon fiber material or other material, where the arm tube exterior 622 is composed of the carbon fiber material or other material.

The through-arm dampening support 610 extending through the aerial vehicle arm 124 in the z direction can be implemented as a cylindrical tube that is hollow or solid. The through-arm dampening support 610 can be implemented via an aluminum material or other material that is the same as or different from the material of the arm tube exterior 622.

Dampening material 626 can partially and/or fully surround the cylindrical surface of the through-arm dampening support 610 in a portion of the z direction. Dampening material 626 can be implemented as a rubber material, Thermoplastic Polyurethane (TPU) material, or any other vibration dampening material that is different from, less rigid than, and/or more vibration dampening than the material of the arm tube exterior 622 and/or the material of the through-arm dampening support 610.

An in-arm support structure 624 can partially and/or fully surround the dampening material 626, and/or can partially and/or fully surround the cylindrical surface of the through-arm dampening support 610 itself in portions of the aerial vehicle arm along the z direction not surrounded via dampening material 626. The in-arm support structure 624 can extend a full portion of the diameter of the aerial vehicle arm that is hollow, from one end of the arm tube exterior 622 to another end of the arm tube exterior 622 in the z direction. In-arm support structure 624 can be implemented via a plastic material or other material that is the same as or different from the material of the arm tube exterior 622, the material of the through-arm dampening support 610, and/or the dampening material 626. The in-arm support structure is optionally implemented via a material that is more rigid than and/or less vibration dampening than the dampening material 626.

Figure 8A:
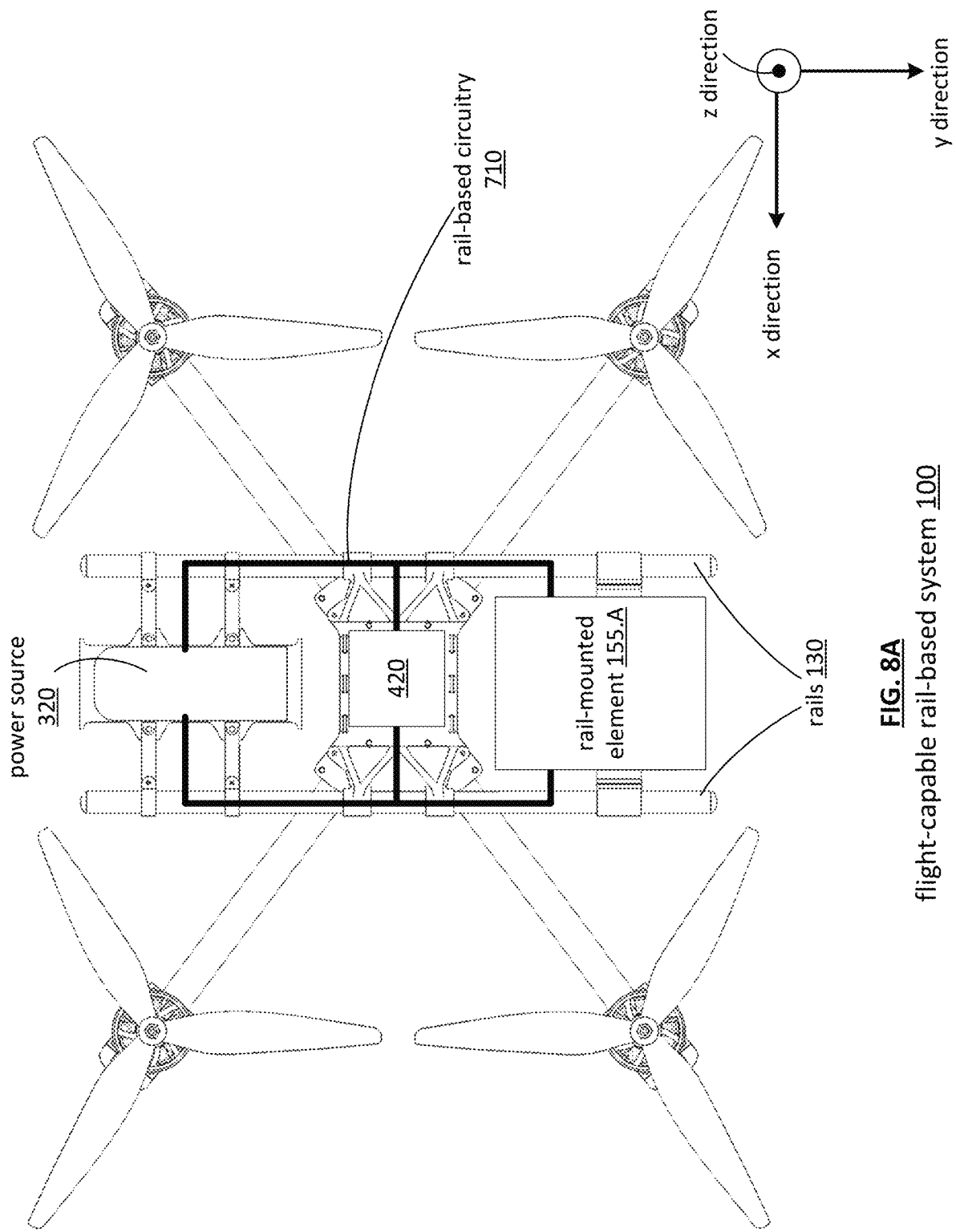
FIG. 8A is a top view illustration of a flight-capable rail-based system implementing rail-based circuitry in accordance with various embodiments.
Figure 8B:
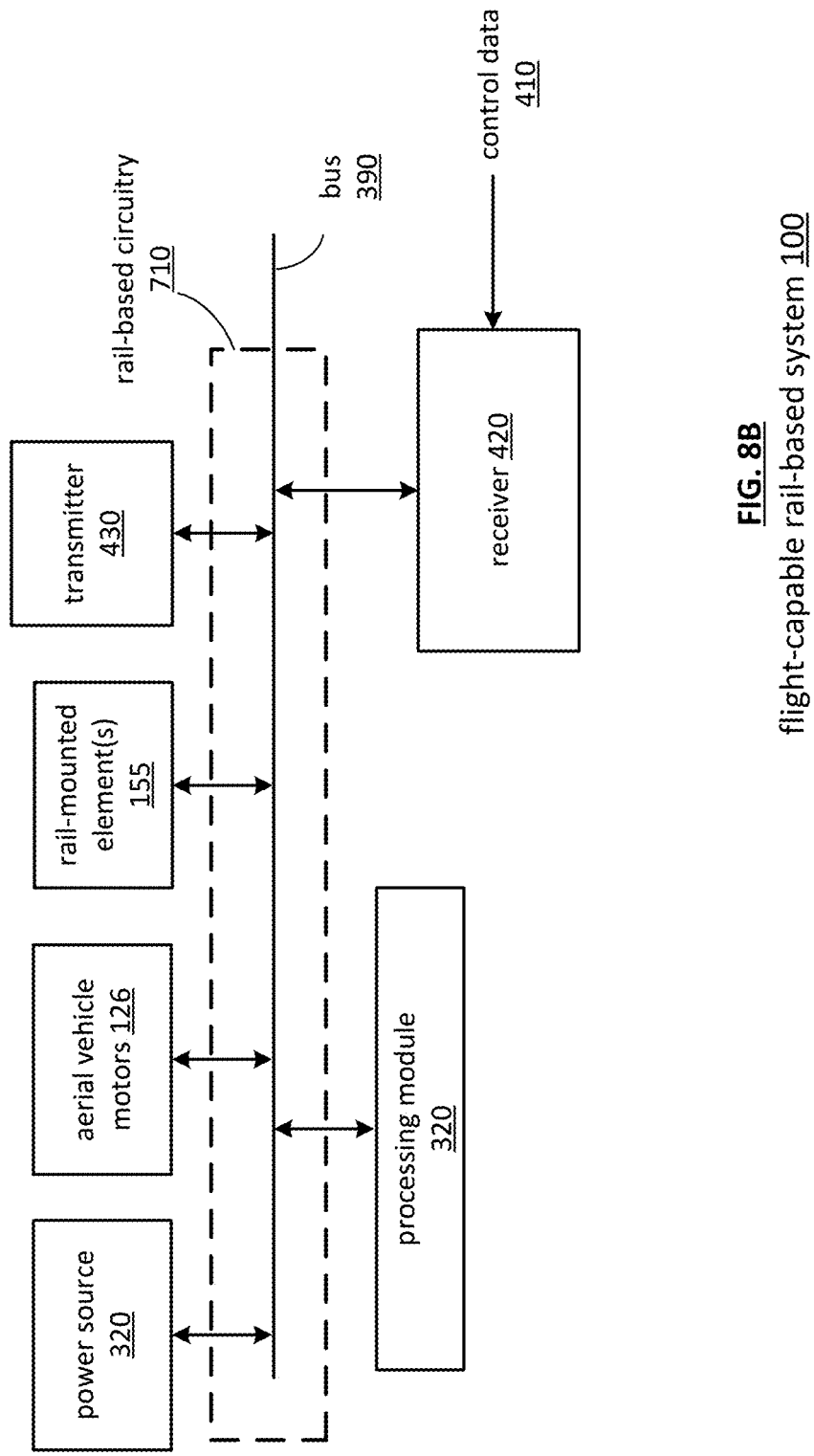
FIG. 8B is a schematic block diagram of a flight-capable rail-based system implementing rail-based circuitry in accordance with various embodiments.

FIGS. 8A and 8B illustrate embodiment of a flight-capable rail-based system 100 that implements rail-based circuitry to deliver electric current through some or all of its rails 130 to deliver power to and/or to send data signals between some or all of its components. In particular, the rails 130 of the vehicle-mounted rail system 150 can be leveraged to implementing some or all circuitry utilized to power and/or transfer data between various elements, in addition to structurally enabling stable attachment of rail-mounted elements 155 as described previously and in addition to structurally enabling stable attachment to aerial vehicle body 122 as described previously.

Some or all features and/or functionality of a flight-capable rail-based system 100 illustrated in and/or described in conjunction with FIGS. 8A and/or 8B can be utilized to implement the flight-capable rail-based system 100 of FIGS. 1A-1C, the flight-capable rail-based system 100 of FIGS. 4A-4D, and/or any other embodiment of the flight-capable rail-based system 100 and/or the flight-capable imaging system 101 described herein.

FIG. 8A presents a top view of an embodiment of flight-capable rail-based system 100, illustrating example physical locations of electrical connections of rail-based circuitry 710 that includes some or all portions of some or all rails 130 for implementing circuitry to deliver power and/or data signals to various components of the flight-capable rail-based system 100 as described herein. FIG. 8B presents a schematic diagram of an embodiment of flight-capable rail-based system 100, illustrating the power and/or communications connections of various components of flight-capable rail-based system 100, for example, where some or all of a bus 390, such as bus 390 of FIGS. 4A-4C, is implemented via rail-based circuitry 710.

In some embodiments of a flight-capable rail-based system 100 implementing rail-based circuitry, some or all rails 130 can be electrically charged to enable the rails 130 to be integrated within circuitry of the flight-capable rail-based system 100 as rail-based circuitry 710. For example, some or all structural components of rails 130 that structurally support mounting of rail-mounted elements 155, such as a tube exterior of rails 130 and/or solid tube of rails 130 can be composed of an electrically conductive material to enable these structural components of rails 130 to be electrically charged, for example, via delivery of electric current from power source 320, where electric current runs along the conductive material of these rails 130 in and/or opposite the y direction. The electrically charged structure of rails 130 can be connected to various components of the flight-capable rail-based system 100 via wires and/or additional conductive materials enable delivery of power to, and/or to enable transfer data signals between, these various components of the flight-capable rail-based system 100.

Alternatively or in addition, in some embodiments of a flight-capable rail-based system 100 implementing rail-based circuitry, some or all rails 130 can be hollow, where wires, conductive mediums, and/or other circuitry implemented to deliver power and/or data signals to other components of the flight-capable rail-based system 100 run through the hollow portions of some or all of these hollow rails 130 in and/or opposite the y direction to deliver power to, and/or to transfer data signals between, various components of the flight-capable rail-based system 100.

In some embodiments of a flight-capable rail-based system 100 implementing rail-based circuitry, power is delivered from power source 320, via at least wired connection with at least a portion of one or more rails 130 utilized to implement rail-based circuitry 710, to: some or all portions of processing module 330 and/or other components of FIGS. 4A-4D, such as hardware portions integrated within and/or mounted upon the aerial vehicle body as illustrated in FIG. 8A and/or hardware portions integrated within and/or mounted as rail-mounted elements 155; some or all portions of aerial vehicle 110, such as aerial vehicle motors 126, their ESC circuitry, and/or processing resources of aerial vehicle 110; one or more rail-mounted elements 155 such as rail-mounted element 155.A as illustrated in FIG. 8A, such as imaging device 310; and/or other components mounted as rail-mounted elements 155, integrated within the aerial vehicle body 122, and/or otherwise attached to flight-capable rail-based system 100 such as one or more onboard sensors 423, one or more receivers 420, one or more transmitters 430, one or more pan angle-configurable mount actuators 414, and/or one or more other components that is operable to perform its functionality based on being powered via electric current delivered via rail-based circuitry 710 integrated within one or more rails 130.

Alternatively or in addition, in some embodiments of a flight-capable rail-based system 100 implementing rail-based circuitry, data signals are transferred, via at least one wired connection with at least a portion of one or more rails 130 utilized to implement rail-based circuitry 710, to and/or from: some or all portions of processing module 330 and/or other components of FIGS. 4A-4D, such as hardware portions integrated within and/or mounted upon the aerial vehicle body as illustrated in FIG. 8A and/or hardware portions integrated within and/or mounted as rail-mounted elements 155; some or all portions of aerial vehicle 110, such as aerial vehicle motors 126, their ESC circuitry, and/or processing resources of aerial vehicle 110; one or more rail-mounted elements 155 such as rail-mounted element 155.A as illustrated in FIG. 8A, such as imaging device 310; and/or other components mounted as rail-mounted elements 155, integrated within the aerial vehicle body 122, and/or otherwise attached to flight-capable rail-based system 100 such as one or more onboard sensors 423, one or more receivers 420, one or more transmitters 430, one or more pan angle-configurable mount actuators 414, and/or one or more other components that is operable to perform its functionality based on being powered via electric current delivered via rail-based circuitry 710 integrated within one or more rails 130.

FIGS. 9A-9E illustrate embodiments of a flight-capable rail-based system 100 that enables movement of the set of parallel rails of vehicle-mounted rail-based system 150 independently from movement of the corresponding aerial vehicle 110. Some or all features and/or functionality of the flight-capable rail-based system 100 illustrated in and/or described in conjunction with FIGS. 9A-9E can be utilized to implement the flight-capable rail-based system 100 of FIGS. 1A-1C and/or any other embodiment of the flight-capable rail-based system 100 and/or the flight-capable imaging system 101 described herein.

As illustrated in FIG. 9A, the orientation of the parallel set of rails 130.R1, 130.S1, 130.R2, and 130.S2 can be defined via a rail coordinate system 908, while the orientation of the aerial vehicle body can be defined via a vehicle coordinate system 906. In this example, the coordinate systems match, for example, where a vehicle axis 905 denoting a direction of the vehicle from back to front can be parallel with a rail axis 907 parallel with all of the rails 130. Other illustrations and/or discussion of coordinate system herein can correspond to the rail coordinate system 908, the vehicle coordinate system 906, or both.

A rail pitch rotation axis 942 can dictate change in orientation of the rails 130 of vehicle mounted rail system 150 relative to the aerial vehicle body 122 about rail pitch axis, which can be centered within aerial vehicle body or can correspond to another axis that is perpendicular with the rail axis 907 and/or the set of rails themselves. The illustration of FIG. 9A can correspond to a configuration where a corresponding pitch angle is zero degrees, based on the rail axis being parallel with the vehicle axis 905. This orientation can optionally correspond to a default configuration of the flight-capable rail-based system 100, for example, where other illustrations and/or embodiments of the flight-capable rail-based system 100 illustrated and/or discussed herein correspond to this default configuration.

FIG. 9B illustrates the flight-capable rail based system 100 of FIG. 9A in a second configuration where a corresponding pitch angle, illustrated as pitch angle 909, is non-zero based on a rotation of the rails about rail pitch rotation axis 942 from the configuration of FIG. 9A. This results in the rail coordinate system 908 being different from the vehicle coordinate system 906.

In this example, the rail axis 907 is configured to have a downwards direction based on the rail axis 907 having a non-zero negative component in the z1 direction and a non-zero positive component in the y direction. The downward-forward view can be further configured via corresponding changes in magnitude to a non-zero negative component in the z direction and/or the non-zero positive component in the y direction induced by changed in rail pitch angle 909. In other cases, the pan direction can be configured via pan angle-configurable mount arms 347 to have a non-zero positive component in the z direction and a non-zero positive component in the y direction.

In other embodiments, the rails 130 of vehicle mounted rail system 150 can be rotated relative to the aerial vehicle body 122 about one or more other axes, for example, corresponding to yaw and/or roll rotations relative to vehicle axis 905 and/or other rotations. In other embodiments, the rails 130 of vehicle mounted rail system 150 can be translated relative to the aerial vehicle body 122 about one or more other axis, for example, with components in the x1, y1, and/or z1 axis of the vehicle coordinate system 906.

Note that while other rail mounted elements 155 are not depicted in the illustrations of FIGS. 9A and 9B, any rail mounted elements 155 described herein can be mounted to the vehicle-mounted rail system 150 as discussed previously, and can thus all rotate about the rail pitch rotation axis 942 and/or otherwise rotate relative to aerial vehicle body as the rails 130 rotate, based on being mounted to the rails. In some embodiments, the rail mounted elements 155 can further rotate themselves, independently of this rotation of the rails 130 as a whole. For example, the imaging device 310 can rotate relative to the rails based on being mounted to the rails 130 as discussed in conjunction with FIGS. 3C-3F, in addition to the position of the imaging device 310 moving with the rails as illustrated in FIGS. 9A and 9B. Alternatively, the pan angle of imaging device 310 relative to the aerial vehicle body 122, and/or relative to the vehicle velocity 510 of the aerial vehicle, is accomplished via the pitch rotation of the rails 130 as illustrated in FIGS. 9A and 9B, where the imaging device 310 is optionally fixed with respect to the vehicle-mounted rail system and/or otherwise cannot rotate and/or translate independently from the rails 130.

While not depicted in FIG. 9B, the rail pitch angle 909 can optionally be configured to correspond to any angle from 0-360 degrees between vehicle axis 905 and rail axis 907. Alternatively a maximum and/or minimum rail pitch angle 909 change from the default configuration is enforced and/or is implemented when configuring the rail pitch angle 909. As a particular example, in embodiments where aerial vehicle arms 124 protrude between rails on the right and left, the maximum magnitude in change in pitch angle from a default pitch angle of zero degrees, for example, in either direction, can be configured such that the rails 130 do not collide with and/or extend past the aerial vehicle arms 124 while enabling aerial vehicle arms 124 to remain protruding between rails 130, where this maximum magnitude in change in pitch angle is configured as a function of the z-direction spacing 161 between rails 130, the diameter and/or thickness of the rails 130 themselves, the angle of the arms 124 relative to the vehicle direction 905 in the x direction and/or opposite the x direction, the diameter and/or thickness of the arms 124, the offset of the rail pitch rotation axis from a center of the aerial vehicle body 122 with respect to the y-axis and/or z-axis, and/or from a center point between motors 126 with respect to the y-axis and/or z-axis, and/or other parameters. Such maximums can be imposed while in flight, for example, in cases where the rail pitch angle 909 is controlled via a corresponding one or more actuators 416 to change during flight. In other embodiments, the angle can be increased past this maximum based on removing the arms 124 and/or vehicle-mounted rail system 150 from aerial vehicle body 122 and/or reattaching the arms 124 and/or vehicle-mounted rail system 150 from aerial vehicle body 122 such that the arms 124 no longer protrude between the rails 130 due to the magnitude of rail pitch angle 909 from the default zero degrees being large enough such that both rails are above and/or below both arms.

FIG. 9C illustrates an embodiment of a pair of rail system to vehicle mounts 121 that each implement a rail pitch angle configurable mount arm 947 to enable different rotations of the rails about rail pitch rotation axis 942 to render the different configurations of rail pitch angle 909. The aerial vehicle body 122 can be configured to be attached to the pair of rail system to vehicle mounts 121 via vehicle body surface attachment components 941, for example, where the vehicle body surface attachment components 941 of rail system to vehicle mounts 121.1 attaches to the left side of the aerial vehicle body 122 and/or where the vehicle body surface attachment components 941 of rail system to vehicle mounts 121.2 attaches to the right side of the aerial vehicle body 122.

While not illustrated in FIGS. 9A and 9B, the pair of rail system to vehicle mounts 121 can be implemented to enable some or all features and/or functionality of the flight-capable rail based system 100 of FIGS. 9A and 9B. Some or all features and/or functionality of the rail system to vehicle mounts 121 of FIG. 9C can implement any embodiment of rail system to vehicle mounts 121 utilized to attach the aerial vehicle to the vehicle-mounted rail system 150.

In some embodiments, the rail system to vehicle mounts 121 of FIG. 9C and/or other types of rail system to vehicle mounts 121 having rail pitch angle configurable mount arms 947 are implemented instead of the of rail system to vehicle mounts 121 of FIG. 6A to enable the configuration of different rail pitch angles 909. In some embodiments, the rail system to vehicle mounts 121 of FIG. 6A are adapted to enable the configuration of different rail pitch angles 909, for example, based on rail system to vehicle mounts 121.R1 and 121.S1 being attached to and/or being rotatable via a first corresponding pitch angle configurable mount arm 947.1 and/or based on rail system to vehicle mounts 121.R2 and 121.S2 being attached to and/or being rotatable via a second corresponding pitch angle configurable mount arm 947.2.

Some or all features and/or functionality of the rail system to vehicle mounts 121 of FIG. 9C can optionally be implemented in a same or similar fashion as the set of mounts 142 of FIG. 6E utilized to attach the imaging device 310 to the vehicle-mounted rail system 150, where rail pitch rotation of vehicle-mounted rail system 150 relative to the vehicle body 122 is enabled in a same or similar fashion as enabling of pan rotation of imaging device 310 relative to the rails 130 discussed previously.

In some embodiments, the rail pitch angle configurable mount arms 947 can be configured by hand and/or one or more tools, for example, prior to flight, where the imaging device 310 assumes a fixed angle while in flight in accordance with a pre-flight configuration of the rail pitch angle configurable mount arms 947. Alternatively or in addition, the rail pitch angle configurable mount arms 947 can be configured for control during flight via an actuator to changes the corresponding pan angle during flight, such as one or more rail pitch angle-configurable mount actuators 416, for example, controlled via angle configuration control module 426 as discussed previously.

FIGS. 9D and 9E illustrate a two dimensional view of an embodiment of a flight-capable imaging system 101 having its field of captured view 362 configurable based on rotation of the rails 130 relative aerial vehicle body 122 as discussed in FIGS. 9A and 9B. While not illustrated, the field of captured view 362 can be captured by imaging device 310 mounted to vehicle-mounted rail system 150 as discussed previously. Some or all features and/or functionality of FIGS. 9D and/or 9E can implement the flight-capable imaging system 101 of FIG. 5 and/or any other embodiment of flight-capable imaging system 101 described herein.

The configuration of pitch angle 909 inducing the field of captured view 362 of FIG. 9D can be based on the configuration with zero-angled pitch angle 909 of FIG. 9A. Alternatively of in addition, the configuration of pitch angle 909 inducing the field of captured view 362 of FIG. 9E can be based on the configuration with non-zero-angled pitch angle 909 of FIG. 9B.

The change in pitch angle 909 between FIGS. 9D and 9E inducing a corresponding change in field of captured view 362 relative to vehicle velocity 510 can occur during a same flight. Alternatively, the pitch angle 909 is fixed during a given flight, where FIGS. 9D and 9E depict changes in field of captured view 362 relative to vehicle velocity 510 for different flights.

While not depicted in FIGS. 9D and 9E, the velocity 510 can further change during flight based on the direction and/or speed of the aerial vehicle 122 changing as it flies and/or as it is controlled. The velocity 510 can correspond to any non-zero speed of the flight-capable imaging system 101 while flying off the ground, and/or while otherwise in motion.

Some or all of the angle corresponding to the field of captured view 362 can be based on the velocity 510 and the pitch angle 909, for example, where the rails 130 have a configurable pitch angle 909 during flight, and/or where imaging device 310 is fixed and/or has a fixed pan angle 345 during flight. Some or all of the angle corresponding to the field of captured view 362 can be based on the velocity 510, the pitch angle 909, and the pan angle 345, for example, w where the imaging device 310 has a configurable pan angle 345 during flight in addition to the rails 130 having a configurable pitch angle 909 during flight.

In various embodiments, a flight-capable rail-based system, such as flight-capable rail-based system 100, includes a set of parallel rails parallel to a first axis. The set of parallel rails can include: a first rail; a second rail having a first spacing from the first rail along a second axis orthogonal to the first axis; a third rail having a second spacing from the first rail along a third axis orthogonal to the first axis and the second axis; and/or a fourth rail having the first spacing from the third rail along a fourth axis parallel to the second axis, and having the second spacing from the second rail along a fifth axis parallel to the third axis. The flight-capable rail-based system can further include, and/or can be configured for attachment to, an aerial vehicle attached to each of the set of parallel rails. The flight-capable rail-based system can be further attached to, and/or can further be configured for attachment to, at least one additional mountable element, such as one or more rail-mounted elements 155, via attachment of the at least one additional mountable element to each of the set of parallel rails via a set of mounts, for example, each in accordance with the first spacing and/or the second spacing.

In various embodiments, a rail-based imaging system, such as a vehicle-mounted rail system 150 prior to attachment to a vehicle and/or detached from a vehicle, includes: a set of parallel rails parallel to a first axis. The set of parallel rails can include a first rail; a second rail having a first spacing from the first rail along a second axis orthogonal to the first axis; a third rail having a second spacing from the first rail along a third axis orthogonal to the first axis and the second axis; and/or a fourth rail having the first spacing from the third rail along a fourth axis parallel to the second axis, and having the second spacing from the second rail along a fifth axis parallel to the third axis. The rail-based imaging system can further include, and/or can be configured for attachment to, an imaging device attached to each of the set of parallel rails. The rail-based imaging system can be attached to, and/or can be configured for attachment, to a vehicle such as aerial vehicle 110, via of attachment of at least two of the set of parallel rails to the vehicle via at least one mount, for example, in accordance with the first spacing and/or the second spacing.

In various embodiments, a flight-capable imaging system, such as flight-capable imaging system 101, includes a set of parallel rails in parallel with a first axis. The set of parallel rails can include a first rail; a second rail having a first spacing from the first rail along a second axis orthogonal to the first axis; a third rail having a second spacing from the first rail along a third axis orthogonal to the first axis and the second axis; and/or a fourth rail having the first spacing from the third rail along a fourth axis parallel to the second axis, and having the second spacing from the second rail along a fifth axis parallel to the third axis. The flight-capable imaging system can further include: a power source, such as power source 320, mounted to the set of parallel rails; an imaging device, such as imaging device 310, mounted to the set of parallel rails; an aerial vehicle body, such as aerial vehicle body 122 mounted to the set of parallel rails; and/or a set of aerial vehicle arms, each having a first end and a second end, where the first end of each of the set of aerial vehicle arms are attached to the aerial vehicle body. For example, the aerial vehicle body and the aerial vehicle arms are parts of an aerial vehicle 110. The second end of each of the set of aerial vehicle arms can include a set of propellers and/or a motor configured to turn the set of propellers to enable flight of the flight-capable imaging system. The flight-capable imaging system can further include at least one processing module, such as processing module 330, configured to control the flight of the of the flight-capable imaging system based on controlling a motor speed of the motor of each of the set of aerial vehicle arms.

In various embodiments, a first subset of the set of aerial vehicle arms each extend from their first end to their second end by intersecting a first plane defined by the first axis and the second axis at a region in between the first rail and the second rail. A second subset of the set of aerial vehicle arms each extend from their first end to their second end by intersecting a second plane defined by the first axis and the fourth axis at a region in between the third rail and the fourth rail. The first plane can be is parallel to the second plane.

In various embodiments, the set of aerial vehicle arms includes exactly four arms. The first subset of the set of aerial vehicle arms can include a first two arms of the set of aerial vehicle arms, and the second subset of the set of aerial vehicle arms can include a second two arms of the set of aerial vehicle arms that is distinct from the first two arms.

In various embodiments, the power source is mounted to the set of parallel rails via a first set of mounts connected to the set of parallel rails. Each of a first subset of the first set of mounts can be connected to at least one of: the first rail or the second rail, and/or each of a second subset of the first set of mounts is connected to at least one of: the third rail or the fourth rail. In various embodiments, each of the set of parallel rails can be attached to at least one of the first set of mounts.

In various embodiments, the imaging device is mounted to the set of parallel rails via a second set of mounts connected to the set of parallel rails. Each of a first subset of the second set of mounts can be connected to at least one of: the first rail or the second rail, and/or each of a second subset of the second set of mounts can be connected to at least one of: the third rail or the fourth rail. In various embodiments, each of the set of parallel rails can be attached to at least one of the second set of mounts.

In various embodiments, the aerial vehicle body is mounted to the set of parallel rails via a third set of mounts connected to the set of parallel rails. Each of a first subset of the third set of mounts can be connected to at least one of: the first rail or the second rail, and/or each of a second subset of the third set of mounts is connected to at least one of: the third rail or the fourth rail. In various embodiments, each of the set of parallel rails can be attached to at least one of the third set of mounts.

In various embodiments, a front arm of the first subset of the set of aerial vehicle arms intersects the first plane between the first subset of the second set of mounts and the first subset of the third set of mounts. In various embodiments, a front arm of the second subset of the set of aerial vehicle arms intersects the second plane between the second subset of the second set of mounts and the second subset of the third set of mounts. In various embodiments, a back arm of the first subset of the set of aerial vehicle arms intersects the first plane between the first subset of the second set of mounts and the first subset of the third set of mounts. In various embodiments, a back arm of the second subset of the set of aerial vehicle arms intersects the second plane between the second subset of the second set of mounts and the second subset of the third set of mounts.

In various embodiments, each of the set of aerial vehicle arms each extend from their first end to their second end along a corresponding arm axis orthogonal to the second axis and the fourth axis. The flight-capable imaging system and/or the flight-capable rail-based system can further include a set of through-arm dampening supports, where each one of the set of through-arm dampening supports has a first end and a second end. In various embodiments, each of a first subset of the set of through-arm dampening supports can be attached to the first rail at its first end and/or can be attached to the second rail at its second end, where each of the first subset of the set of through-arm dampening supports penetrate through a portion of a corresponding one of the first subset of the set of aerial vehicle arms in a direction orthogonal to the corresponding arm axis of the corresponding one of the one of the first subset of the set of aerial vehicle arms. In various embodiments, each of a second subset of the set of through-arm dampening supports can be attached to the third rail at its first end and/or can be attached to the fourth rail at its second end. Each of the second subset of the set of through-arm dampening supports can penetrates through a portion of a corresponding one of the second subset of the set of aerial vehicle arms in a direction orthogonal to the corresponding arm axis of the corresponding one of the one of the second subset of the set of aerial vehicle arms. In various embodiments, each of the set of aerial vehicle arms comprises dampening material surrounding a portion of a corresponding one of the set of through-arm dampening supports.

In various embodiments, each of the set of parallel rails includes a rail mid-point, a front rail end, and a back rail end. The power source can be mounted to the set of parallel rails via a first set of mounts connected to the set of parallel rails between the rail mid-point and the back rail end of each of the set of parallel rails. The imaging device can be mounted to the set of parallel rails via a second set of mounts connected to the set of parallel rails between the rail mid-point and the front rail end of each of the set of parallel rails. The aerial vehicle can be is mounted to the set of parallel rails via a third set of mounts connected to the set of parallel rails between the first set of mounts and the second set of mounts.

In various embodiments, the flight-capable imaging system, the flight-capable rail-based system and/or the rail-based imaging system is configurable via a set of imaging device placement configurations, for example, based on the first set of mounts and the second set of mounts being configured as detachable mounts. In various embodiments, in a first configuration of the set of imaging device placement configurations, the power source is mounted to the set of parallel rails based on attaching the first set of mounts to the set of parallel rails between the rail mid-point and the back rail end of each of the set of parallel rails, and/or the imaging device is mounted to the set of parallel rails based on attaching the second set of mounts to the set of parallel rails between the rail mid-point and the front rail end of each of the set of parallel rails. In various embodiments, in a second configuration of the set of imaging device placement configurations, the power source is mounted to the set of parallel rails based on attaching the first set of mounts to the set of parallel rails between the rail mid-point and the front rail end of each of the set of parallel rails, and/or the imaging device is mounted to the set of parallel rails based on attaching the second set of mounts to the set of parallel rails between the rail mid-point and the back rail end of each of the set of parallel rails.

In various embodiments, a direction of forward motion of the flight-capable imaging system, the flight-capable rail-based system and/or the rail-based imaging system further is in a direction corresponding to the front rail end of the set of parallel rails. In various embodiments, a direction of vertical motion of the flight-capable imaging system is in a direction parallel to the second axis. The flight-capable imaging system can be operable to capture video data of a moving subject based on following motion of the moving subject from a dynamically changing position that is behind the moving subject relative to a direction of motion of the moving subject, for example, based on being in the first configuration of the set of imaging device placement configurations. Alternatively or in addition, the flight-capable imaging system can be operable to capture video data of the moving subject based on following motion of the moving subject from a dynamically changing position that is in front of the moving subject relative to the direction of motion of the moving subject, for example, based on being in the second configuration of the set of imaging device placement configurations.

In various embodiments, the first spacing and the second spacing are in accordance with a 15 mm Light Weight Support rod standard. In various embodiments, a diameter of each of the set of parallel rails is in accordance with the 15 mm Light Weight Support rod standard. In various embodiments, the imaging device is a cinema camera having dimensions and/or an optical center based on and/or in accordance with the 15 mm Light Weight Support rod standard.

In various embodiments, the flight-capable imaging system, the flight-capable rail-based system and/or the rail-based imaging system further comprises a pair of imaging device mounts. A first one of the pair of imaging device mounts can attach to a first side of the imaging device and/or can further attaches to the first rail and/or the second rail. A second one of the pair of imaging device mounts can attach to a second side of the imaging device that is opposite the first side and/or can further attaches to the third rail and/or the fourth rail. Each of the pair of imaging device mounts can include a pan configurable mount arm that rotates about a pan rotation axis parallel to the third axis to configure a pan direction of a lens of the imaging device. A first configuration of the pan configurable mount arms of the pair of imaging device mounts can renders a first pan direction of the lens orthogonal to the pan rotation axis, and a second configuration of the pan configurable mount arms of the pair of imaging device mounts can renders a second pan direction of the lens orthogonal to the pan rotation axis, and different from the first pan direction. A discrete and/or continuous set of configuration options for different pan directions orthogonal to the pan rotation axis can be assumed via the pan configurable mount arms, and can include any discrete number of configuration options and/or an infinite number of configuration options.

In various embodiments, the flight-capable imaging system, the flight-capable rail-based system and/or the rail-based imaging system can further include at least one actuator operable to change a configuration of the pan configurable mount arms during flight based on actuator control data generated by the processing module. In various embodiments, the flight-capable imaging system, the flight-capable rail-based system and/or the rail-based imaging system further comprises at least one receiver operable to receive wireless signaling transmitted by a remote control device for processing by the processing module. The wireless signaling can include flight control data and/or pan direction control data. The at least one processing module can process the flight control data to control the flight of the of the flight-capable imaging system, and/or the at least one processing module can process the pan direction control data to generate the actuator control data utilized to change the configuration of the pan configurable mount arms during the flight of the flight-capable imaging system, for example, to change the a pan angle of the imaging device relative to the set of parallel rails one or more times during flight.

In various embodiments, the flight-capable imaging system, the flight-capable rail-based system and/or the rail-based imaging system can further include a first rail attachment component operable to mount the first rail and the second rail to the aerial vehicle body and/or a second rail attachment component operable to mount the third rail and the fourth rail to the aerial vehicle body. The first rail attachment component can comprise a first rail pitch configurable mount arm, and/or the second rail attachment component can comprise a second rail pitch configurable mount arm. The first rail pitch configurable mount arm and second rail pitch configurable mount arm can be configured to rotate about a rail pitch rotation axis parallel to the third axis to configure a rail pitch direction of the set of parallel rails relative to a vehicle axis from a front of the aerial vehicle body to a back of the aerial vehicle body.

In various embodiments, the flight-capable imaging system, the flight-capable rail-based system and/or the rail-based imaging system can further include at least one actuator associated with the first rail attachment component and the second rail attachment component, operable to change a configuration of the rail pitch configurable mount arms during flight based on actuator control data generated by the processing module. In various embodiments, the flight-capable imaging system, the flight-capable rail-based system and/or the rail-based imaging system further comprises at least one receiver operable to receive wireless signaling transmitted by a remote control device for processing by the processing module. The wireless signaling can include flight control data and/or rail pitch direction control data. The at least one processing module can process the flight control data to control the flight of the of the flight-capable imaging system, and/or the at least one processing module can process the rail pitch direction control data to generate the actuator control data utilized to change the configuration of the first and second rail pitch configurable mount arms during the flight of the flight-capable imaging system, for example, to change a rail pitch angle of the set of parallel rails relative to the vehicle axis one or more times during flight.

In various embodiments, the power source delivers power to the motor of each one of the set of aerial vehicle arms, the processing module, and the imaging device. The flight-capable imaging system, the flight-capable rail-based system and/or the rail-based imaging system can further include rail-based circuitry configured to facilitate passage of electric current, generated via the power source, via at least one of the set of parallel rails. The power source can deliver power via the rail-based circuitry to at least one of: the motor of each one of the set of aerial vehicle arms; the processing module, or the imaging device. In various embodiments, at least one of the set of parallel rails includes a hollow center, and the passage of the electric current is facilitated along at least one of the set of parallel rails via at least one wired component of the rail-based circuitry included within the hollow center of the at least one of the set of parallel rails. In various embodiments, a structural component of at least one of the set of parallel rails comprises a conductive material, where the passage of the electric current is facilitated along at least one of the set of parallel rails via the structural component of the at least one of the set of parallel rails, and/or where the power source, the imaging device, and the aerial vehicle body are attached to the set of parallel rails based on mounting secured via the structural component of the at least one of the set of parallel rails.

In various embodiments, the imaging device is mounted to the set of parallel rails via a first set of mounts implemented via a first vibration dampening material configured to dampen vibration induced upon the flight-capable imaging system at a first set of frequencies. In various embodiments, the aerial vehicle body mounted to the set of parallel rails via a second vibration dampening material that is different from the first vibration dampening material and that is configured to dampen vibration induced upon the flight-capable imaging system at a second set of frequencies that is different from the first set of frequencies.

In various embodiments, the flight-capable imaging system, the flight-capable rail-based system and/or the rail-based imaging system is configurable via a plurality of configuration options. In various embodiments, the plurality of configuration options, which can include a set of aerial arm type configuration options, a set of aerial vehicle configuration options, a set of transportation options, a set of imaging device accessory configuration options, a set of mounted element configuration options, and/or other configuration options.

In various embodiments, changing from a first one of the set of aerial arm type configuration options to a second one of the set of aerial arm type configuration options includes detaching a first set of aerial vehicle arms from a first set of mounting points of the aerial vehicle body, and further includes attaching a second set of aerial vehicle arms to the first set of mounting points of the aerial vehicle body. Different ones of the set of aerial arm type configuration options can be based on having at least one of: different aerial arm lengths, different type of motors, or different types of propellers.

In various embodiments, changing from a first one of the set of aerial vehicle configuration options to a second one of the set of aerial vehicle configuration options includes detaching a first aerial body of a first aerial vehicle from the set of parallel rails, and further includes attaching a second aerial body of a second aerial vehicle from the set of parallel rails. Different ones of the set of aerial vehicle configuration options can be based on different aerial vehicles enabling at least one of: different ranges of speed, different ranges of altitude, different stability, or different rates of power consumption;

In various embodiments, changing from a first one of the set of transportation options to a second one of the set of aerial vehicle configuration options includes detaching the aerial vehicle body from the set of parallel rails, and further includes attaching an attachable element of a ground vehicle, water-based vehicle, or other type of vehicle and/or other object capable of motion to the set of parallel rails.

In various embodiments, changing from a first one of the set of imaging device accessory configuration options to a second one of the set of imaging device accessory configuration options can include at least one of: attaching at least one imaging device accessory to the set of parallel rails in front of a lens of the imaging device, or detaching at least one imaging device accessory from the set of parallel rails. Different ones of the set of imaging device accessory configuration options can be based on at least one of: different numbers of imaging device accessories mounted to the set of parallel rails, different types of imaging device accessories mounted to the set of parallel rails, inducing different types of filtering of light for capture by the imaging device, or inducing different types of zooming by the imaging device.

In various embodiments, changing from a first one of the set of mounted element configuration options to a second one of the set of mounted element configuration options includes at least one of: detaching a first imaging device from the set of parallel rails and attaching a second imaging device that is different from the first imaging device to the set of parallel rails; detaching a first power source from the set of parallel rails and attaching a second power source that is different from the power source to the set of parallel rails; or detaching a first set of parallel rails having a first set of mounted elements from the aerial vehicle body and attaching a second set of parallel rails having a second set of mounted elements to the aerial vehicle body.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/ or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a non-transitory computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:
1. A flight-capable imaging system comprising:
a set of parallel rails in parallel with a first axis, the set of parallel rails comprising:
a first rail;
a second rail having a first spacing from the first rail along a second axis orthogonal to the first axis;
a third rail having a second spacing from the first rail along a third axis orthogonal to the first axis and the second axis;
a fourth rail having the first spacing from the third rail along a fourth axis parallel to the second axis, and having the second spacing from the second rail along a fifth axis parallel to the third axis;
a power source mounted to the set of parallel rails;
an imaging device mounted to the set of parallel rails;
an aerial vehicle body mounted to the set of parallel rails;
a set of aerial vehicle arms, each having a first end and a second end, wherein the first end of each of the set of aerial vehicle arms are attached to the aerial vehicle body, and wherein the second end of each of the set of aerial vehicle arms comprises:
a set of propellers; and
a motor configured to turn the set of propellers to enable flight of the flight-capable imaging system; and;
at least one processing module configured to control the flight of the of the flight-capable imaging system based on controlling a motor speed of the motor of each of the set of aerial vehicle arms;
wherein the power source delivers power to the motor of each one of the set of aerial vehicle arms, the processing module, and the imaging device, further comprising rail-based circuitry configured to facilitate passage of electric current, generated via the power source, via at least one of the set of parallel rails, wherein the power source delivers power via the rail-based circuitry to at least one of: the motor of each one of the set of aerial vehicle arms; the processing module, or the imaging device; and
wherein at least one of the set of parallel rails includes a hollow center, and wherein the passage of the electric current is facilitated along at least one of the set of parallel rails via at least one wired component of the rail-based circuitry included within the hollow center of the at least one of the set of parallel rails.

2. The flight-capable imaging system of claim 1, wherein a first subset of the set of aerial vehicle arms each extend from their first end to their second end by intersecting a first plane defined by the first axis and the second axis at a region in between the first rail and the second rail, wherein a second subset of the set of aerial vehicle arms each extend from their first end to their second end by intersecting a second plane defined by the first axis and the fourth axis at a region in between the third rail and the fourth rail, and wherein the first plane is parallel to the second plane.

3. The flight-capable imaging system of claim 2, wherein the set of aerial vehicle arms includes exactly four arms, wherein the first subset includes a first two arms of the set of aerial vehicle arms, and wherein the second subset includes a second two arms of the set of aerial vehicle arms that is distinct from the first two arms.

4. The flight-capable imaging system of claim 3,
wherein the power source is mounted to the set of parallel rails via a first set of mounts connected to the set of parallel rails, wherein each of a first subset of the first set of mounts is connected to at least one of: the first rail or the second rail, and wherein each of a second subset of the first set of mounts is connected to at least one of: the third rail or the fourth rail;
wherein the imaging device is mounted to the set of parallel rails via a second set of mounts connected to the set of parallel rails, wherein each of a first subset of the second set of mounts is connected to at least one of: the first rail or the second rail, and wherein each of a second subset of the second set of mounts is connected to at least one of: the third rail or the fourth rail;
wherein the aerial vehicle body is mounted to the set of parallel rails via a third set of mounts connected to the set of parallel rails, wherein each of a first subset of the third set of mounts is connected to at least one of: the first rail or the second rail, and wherein each of a second subset of the third set of mounts is connected to at least one of: the third rail or the fourth rail;
wherein a front arm of the first subset of the set of aerial vehicle arms intersects the first plane between the first subset of the second set of mounts and the first subset of the third set of mounts;
wherein a front arm of the second subset of the set of aerial vehicle arms intersects the second plane between the second subset of the second set of mounts and the second subset of the third set of mounts;
wherein back arm of the first subset of the set of aerial vehicle arms intersects the first plane between the first subset of the second set of mounts and the first subset of the third set of mounts; and
wherein a back arm of the second subset of the set of aerial vehicle arms intersects the second plane between the second subset of the second set of mounts and the second subset of the third set of mounts.

5. The flight-capable imaging system of claim 2, wherein each of the set of aerial vehicle arms each extend from their first end to their second end along a corresponding arm axis orthogonal to the second axis and the fourth axis, further comprising:
a set of through-arm dampening supports, wherein each one of the set of through-arm dampening supports has a first end and a second end;
wherein each of a first subset of the set of through-arm dampening supports is attached to the first rail at its first end and is attached to the second rail at its second end, and wherein the each of the first subset of the set of through-arm dampening supports penetrates through a portion of a corresponding one of the first subset of the set of aerial vehicle arms orthogonal to the corresponding arm axis of the corresponding one of the one of the first subset of the set of aerial vehicle arms; and
wherein each of a second subset of the set of through-arm dampening supports is attached to the third rail at its first end and is attached to the fourth rail at its second end, and wherein the each of the second subset of the set of through-arm dampening supports penetrates through a portion of a corresponding one of the second subset of the set of aerial vehicle arms orthogonal to the corresponding arm axis of the corresponding one of the one of the second subset of the set of aerial vehicle arms.

6. The flight-capable imaging system of claim 1, wherein each of the set of parallel rails includes a rail mid-point, a front rail end, and a back rail end, wherein the power source is mounted to the set of parallel rails via a first set of mounts connected to the set of parallel rails between the rail mid-point and the back rail end of each of the set of parallel rails; wherein the imaging device is mounted to the set of parallel rails via a second set of mounts connected to the set of parallel rails between the rail mid-point and the front rail end of each of the set of parallel rails; and wherein the aerial vehicle body is mounted to the set of parallel rails via a third set of mounts connected to the set of parallel rails between the first set of mounts and the second set of mounts.

7. The flight-capable imaging system of claim 6, wherein the flight-capable imaging system is configurable via a set of imaging device placement configurations based on the first set of mounts and the second set of mounts being configured as detachable mounts,
wherein, in a first configuration of the set of imaging device placement configurations, the power source is mounted to the set of parallel rails based on attaching the first set of mounts to the set of parallel rails between the rail mid-point and the back rail end of each of the set of parallel rails, and the imaging device is mounted to the set of parallel rails based on attaching the second set of mounts to the set of parallel rails between the rail mid-point and the front rail end of each of the set of parallel rails;
wherein, in a second configuration of the set of imaging device placement configurations, the power source is mounted to the set of parallel rails based on attaching the first set of mounts to the set of parallel rails between the rail mid-point and the front rail end of each of the set of parallel rails, and the imaging device is mounted to the set of parallel rails based on attaching the second set of mounts to the set of parallel rails between the rail mid-point and the back rail end of each of the set of parallel rails.

8. The flight-capable imaging system of claim 7,
wherein a direction of forward motion of the flight-capable imaging system is in a direction corresponding to the front rail end of the set of parallel rails;
wherein the flight-capable imaging system is operable to, when in the first configuration of the set of imaging device placement configurations, capture video data of a moving subject based on following motion of the moving subject from a dynamically changing position that is behind the moving subject relative to a direction of motion of the moving subject; and
wherein the flight-capable imaging system is further operable to, when in the second configuration of the set of imaging device placement configurations, capture video data of the moving subject based on following motion of the moving subject from a dynamically changing position that is in front of the moving subject relative to the direction of motion of the moving subject.

9. The flight-capable imaging system of claim 1, wherein the first spacing and the second spacing are in accordance with a 15 mm Light Weight Support rod standard, and wherein a diameter of each of the set of parallel rails is in accordance with the 15 mm Light Weight Support rod standard.

10. The flight-capable imaging system of claim 9, wherein the imaging device is a cinema camera having dimensions based on the 15 mm Light Weight Support rod standard.

11. The flight-capable imaging system of claim 1, further comprising a pair of imaging device mounts and at least one actuator associated with the pair of imaging device mounts;
wherein a first one of the pair of imaging device mounts attaches to a first side of the imaging device and further attaches to the first rail and the second rail; and wherein a second one of the pair of imaging device mounts attaches to a second side of the imaging device that is opposite the first side and further attaches to the third rail and the fourth rail;
wherein each of the pair of imaging device mounts includes a pan configurable mount arm that rotates about a pan rotation axis parallel to the third axis to configure a pan direction of a lens of the imaging device, wherein a first configuration of the pan configurable mount arms of the pair of imaging device mounts renders a first pan direction of the lens orthogonal to the pan rotation axis, and wherein a second configuration of the pan configurable mount arms of the pair of imaging device mounts renders a second pan direction of the lens orthogonal to the pan rotation axis, and different from the first pan direction;
wherein the at least one actuator is operable to change a configuration of the pan configurable mount arms during flight based on actuator control data generated by the processing module.

12. The flight-capable imaging system of claim 11, further comprising at least one receiver operable to receive wireless signaling transmitted by a remote control device for processing by the processing module, wherein the wireless signaling includes flight control data and pan direction control data, wherein the at least one processing module processes the flight control data to control the flight of the of the flight-capable imaging system, and wherein the at least one processing module processes the pan direction control data to generate the actuator control data utilized to change the configuration of the pan configurable mount arms during the flight of the flight-capable imaging system.

13. The flight-capable imaging system of claim 1, further comprising:
a first rail attachment component operable to mount the first rail and the second rail to the aerial vehicle body
a second rail attachment component operable to mount the third rail and the fourth rail to the aerial vehicle body;
wherein the first rail attachment component comprises a first rail pitch configurable mount arm, wherein the second rail attachment component comprises a second rail pitch configurable mount arm, and wherein the first rail pitch configurable mount arm and second rail pitch configurable mount arm are configured to rotate about a rail pitch rotation axis parallel to the third axis to configure a rail pitch direction of the set of parallel rails relative to a vehicle axis from a front of the aerial vehicle body to a back of the aerial vehicle body, the flight-capable imaging system further comprising:
at least one actuator associated with the first rail attachment component and the second rail attachment component, operable to change a configuration of the first rail pitch configurable mount arm and the second rail pitch configurable mount arm during flight based on actuator control data generated by the processing module.

14. The flight-capable imaging system of claim 1, wherein the imaging device is mounted to the set of parallel rails via a first set of mounts implemented via a first vibration dampening material configured to dampen vibration induced upon the flight-capable imaging system at a first set of frequencies, and wherein the aerial vehicle body mounted to the set of parallel rails via a second vibration dampening material that is different from the first vibration dampening material and that is configured to dampen vibration induced upon the flight-capable imaging system at a second set of frequencies that is different from the first set of frequencies.

15. The flight-capable imaging system of claim 1, wherein the flight-capable imaging system is configurable via a plurality of configuration options that includes at least one of:
- a set of aerial arm type configuration options, wherein changing from a first one of the set of aerial arm type configuration options to a second one of the set of aerial arm type configuration options includes detaching a first set of aerial vehicle arms from a first set of mounting points of the aerial vehicle body, and further includes attaching a second set of aerial vehicle arms to the first set of mounting points of the aerial vehicle body, and wherein different ones of the set of aerial arm type configuration options are based on having at least one of: different aerial arm lengths, different type of motors, or different types of propellers;
- a set of aerial vehicle configuration options, wherein changing from a first one of the set of aerial vehicle configuration options to a second one of the set of aerial vehicle configuration options includes detaching a first aerial body of a first aerial vehicle from the set of parallel rails, and further includes attaching a second aerial body of a second aerial vehicle to the set of parallel rails, wherein different ones of the set of aerial vehicle configuration options are based on enabling at least one of: different ranges of speed, different ranges of altitude, different stability, or different rates of power consumption;
- a set of transportation options, wherein changing from a first one of the set of transportation options to a second one of the set of aerial vehicle configuration options includes detaching the aerial vehicle body from the set of parallel rails, and further includes attaching an attachable element of a ground vehicle to the set of parallel rails;
- a set of imaging device accessory configuration options, wherein changing from a first one of the set of imaging device accessory configuration options to a second one of the set of imaging device accessory configuration options includes at least one of: attaching at least one imaging device accessory to the set of parallel rails in front of a lens of the imaging device, or detaching at least one imaging device accessory from the set of parallel rails, wherein different ones of the set of imaging device accessory configuration options are based on at least one of: different numbers of imaging device accessories mounted to the set of parallel rails, different types of imaging device accessories mounted to the set of parallel rails, inducing different types of filtering of light for capture by the imaging device, or inducing different types of zooming by the imaging device; or
- a set of mounted element configuration options, wherein changing from a first one of the set of mounted element configuration options to a second one of the set of mounted element configuration options includes at least one of: detaching a first imaging device from the set of parallel rails and attaching a second imaging device that is different from the first imaging device to the set of parallel rails; detaching a first power source from the set of parallel rails and attaching a second power source that is different from the power source to the set of parallel rails; or detaching a first set of parallel rails having a first set of mounted elements from the aerial vehicle body and attaching a second set of parallel rails having a second set of mounted elements to the aerial vehicle body.

16. A flight-capable rail-based system comprising:
- a set of parallel rails parallel to a first axis, the set of parallel rails comprising:
  - a first rail;
  - a second rail having a first spacing from the first rail along a second axis orthogonal to the first axis;
  - a third rail having a second spacing from the first rail along a third axis orthogonal to the first axis and the second axis;
  - a fourth rail having the first spacing from the third rail along a fourth axis parallel to the second axis, and having the second spacing from the second rail along a fifth axis parallel to the third axis; and
- and
- an aerial vehicle attached to each of the set of parallel rails;
- wherein the flight-capable rail-based system is configured for attachment to at least one additional mountable element via attachment of the at least one additional mountable element to each of the set of parallel rails via a set of mounts each in accordance with at least one of: the first spacing or the second spacing;
- wherein a power source delivers power to a motor of each one of the set of aerial vehicle arms, a processing module, and an imaging device, wherein the flight-capable rail-based system further comprises rail-based circuitry configured to facilitate passage of electric current, generated via the power source, via at least one of the set of parallel rails, wherein the power source delivers power via the rail-based circuitry to at least one of: the motor of each one of the set of aerial vehicle arms; the processing module, or the imaging device; and
- wherein at least one of the set of parallel rails includes a hollow center, and wherein the passage of the electric current is facilitated along at least one of the set of parallel rails via at least one wired component of the rail-based circuitry included within the hollow center of the at least one of the set of parallel rails.

17. A rail-based imaging system comprising:
- a set of parallel rails parallel to a first axis that includes;
  - a first rail;
  - a second rail having a first spacing from the first rail along a second axis orthogonal to the first axis;
  - a third rail having a second spacing from the first rail along a third axis orthogonal to the first axis and the second axis;
  - a fourth rail having the first spacing from the third rail along a fourth axis parallel to the second axis, and having the second spacing from the second rail along a fifth axis parallel to the third axis;
- and
  - an imaging device attached to each of the set of parallel rails;
- wherein the rail-based imaging system is configured for attachment to a vehicle via of attachment of at least two of the set of parallel rails to the vehicle via at least one mount in accordance with the at least one of: the first spacing or the second spacing;
- wherein a power source delivers power to a motor of each one of the set of aerial vehicle arms, a processing module, and an imaging device, wherein the rail-based imaging system further comprises rail-based circuitry configured to facilitate passage of electric current, generated via the power source, via at least one of the set of parallel rails, wherein the power source delivers power via the rail-based circuitry to at least one of: the motor of each one of the set of aerial vehicle arms; the processing module, or the imaging device; and wherein at least one of the set of parallel rails includes a hollow center, and wherein the passage of the electric current is facilitated along at least one of the set of parallel rails via at least one wired component of the rail-based circuitry included within the hollow center of the at least one of the set of parallel rails.

\* \* \* \* \*